US012650106B2

(12) United States Patent
Foege et al.

(10) Patent No.: US 12,650,106 B2
(45) Date of Patent: Jun. 9, 2026

(54) PORT ASSEMBLY FOR 2-STROKE DIESEL ENGINE

(71) Applicant: DeltaHawk Engines, Inc., Racine, WI (US)

(72) Inventors: Aaron Gamache Foege, Kansasville, WI (US); Louis Francis Funk, Homewood, IL (US); Dana Marie Merkitch, Mount Pleasant, WI (US); Paul Victor Olesen, Shell Lake, WI (US)

(73) Assignee: DeltaHawk Engines, Inc., Racine, WI (US)

( * ) Notice: Subject to any disclaimer, the term of this patent is extended or adjusted under 35 U.S.C. 154(b) by 0 days.

(21) Appl. No.: 18/924,706

(22) Filed: Oct. 23, 2024

(65) Prior Publication Data

US 2025/0122852 A1 Apr. 17, 2025

Related U.S. Application Data

(63) Continuation of application No. PCT/US2022/028291, filed on May 9, 2022.

(51) Int. Cl.

*F02M 39/00* (2006.01)
*F02B 33/04* (2006.01)

(Continued)

(52) U.S. Cl.

CPC ........... *F02M 39/005* (2013.01); *F02B 33/40* (2013.01); *F02B 37/00* (2013.01); *F02F 1/4285* (2013.01); *F02F 3/0023* (2013.01)

(58) Field of Classification Search

CPC ....... F02M 39/005; F02B 33/04; F02B 37/00; F02B 23/0672; F02B 3/06; F02B 25/04;

(Continued)

(56) References Cited

U.S. PATENT DOCUMENTS 1,781,194 A * 11/1930 Riehm .................... F02B 25/00 123/61 R
4,480,601 A * 11/1984 Skatsche .................. F02F 1/22 123/41.74

(Continued)

FOREIGN PATENT DOCUMENTS

WO WO87-02417 4/1987
WO WO-2004033869 A2 * 4/2004 .............. F02B 33/04

OTHER PUBLICATIONS

International Search Report and Written Opinion for International Application No. PCT/US2022/028291, dated Feb. 8, 2023, 15 pages.

*Primary Examiner* — Grant Moubry
(74) *Attorney, Agent, or Firm* — Reinhart Boerner Van Deuren s.c.

(57) ABSTRACT

An engine is provided with various enhanced features. For example, a 2-stroke diesel engine has a porting design that enhances the efficiency of a scavenging event. In specific embodiments, a four-piece piston is positioned in each cylinder of the engine. The four-piece piston includes a bowl, a ring retainer, a skirt, and a wrist-pin bearing. In various embodiments, fuel pumps are coupled to fuel channels or high-pressure lines to provide a constant and equal high-pressure fuel supply to engine cylinders. In more specific embodiments, the length of each of the high-pressure lines is the same. In certain specific embodiments, complimentary screws form a supercharger that further improves engine efficiency by providing high-pressure intake air to the porting process.

12 Claims, 56 Drawing Sheets

(51) Int. Cl.

| | |
|---|---|
| ***F02B 33/40*** | (2006.01) |
| ***F02B 37/00*** | (2006.01) |
| ***F02F 1/42*** | (2006.01) |
| ***F02F 3/00*** | (2006.01) |

(58) Field of Classification Search

CPC ....... F02B 75/02; F02B 2075/025; F02F 1/42; F02F 1/4285; F02F 3/0023

See application file for complete search history.

(56) References Cited

U.S. PATENT DOCUMENTS

| | | | | |
|---|---|---|---|---|
| 6,460,407 | B1 | 10/2002 | Kato | |
| 9,074,520 | B2 * | 7/2015 | Bandyopadhyay | F02B 25/04 |
| 9,121,330 | B2 * | 9/2015 | Straub | F02B 37/18 |
| 2005/0274332 | A1 * | 12/2005 | Lemke | F02B 75/282 123/41.35 |
| 2009/0139485 | A1 * | 6/2009 | Pontoppidan | F02B 23/104 123/305 |
| 2013/0037011 | A1 | 2/2013 | Otsuji et al. | |
| 2014/0331981 | A1 | 11/2014 | Chrisman et al. | |
| 2016/0201598 | A1 * | 7/2016 | Yasutomi | F02F 7/0085 123/193.2 |
| 2018/0045135 | A1 * | 2/2018 | Callahan | F02F 1/22 |
| 2018/0202346 | A1 | 7/2018 | Mackenzie | |

* cited by examiner

| SLEEVE PORTING ANGLES | | | | | |
|---|---|---|---|---|---|
| **Port Name** | **Location 1** | **Location 2** | **Location 3** | **Location 4** | **Location 5** |
| **LE Positional Angle α** | 9° to 19° | 19° to 29° | 60° to 70° | 105° to 115° | 155° to 165° |
| **TE Positional Angle β** | -9° to -19° | 47° to 57° | 98° to 108° | 151° to 161° | 171° to 181° |
| **LE Directional Angle γ** | -5° to 5° | -5° to 5° | 34° to 44° | 72° to 82° | 185° to 195° |
| **TE Directional Angle δ** | -5° to 5° | -5° to 5° | 49° to 59° | 100° to 110° | 180° to 190° |
| **Axial Roof Angle λ** | 20° to 30° | 20° to 30° | 5° to 15° | 30° to 40° | 43° to 53° |
| **Axial Floor Angle θ** | 25° to 35° | 25° to 35° | 15° to 25° | 26° to 36° | 55° to 65° |

FIG. 18

PORT ASSEMBLY FOR 2-STROKE DIESEL ENGINE

CROSS-REFERENCE TO RELATED PATENT APPLICATION

The present application is a continuation of International Application No. PCT/US2022/028291 filed on May 9, 2022, which is incorporated herein by reference in its entirety.

BACKGROUND OF THE INVENTION

The present invention relates generally to the field of engines. The present invention relates specifically to a two-stroke diesel engine.

SUMMARY OF THE INVENTION

One embodiment of the invention relates to a two-stroke, diesel engine that includes an engine block. The engine block has a cylinder that includes a plurality of first inlet ports. Each of the first inlet ports has a first area, and the first areas are similar to each other. The cylinder further includes a plurality of second inlet ports. Each of the second inlet ports have a second area, and the second areas are similar to each other. The cylinder further includes a plurality of third inlet ports. Each of the third inlet ports has a third area, and the third areas are similar to each other. Additionally, the cylinder includes a plurality of exhaust ports. Each of the exhaust ports has a fourth area, and the fourth areas are similar to each other. The summation of the first areas is between 15% to 25% of the summation of the fourth areas, and the summation of the second areas plus the third areas is between 75% and 85% of the summation of the fourth areas.

Another embodiment of the invention relates to a two-stroke diesel engine. The engine has an engine block and a cylinder. The cylinder has three exhaust ports, each having a height between 1.0 in and 1.5 in and a width between 0.75 in and 1.25 in, two first inlet ports, each having a height between 0.5 in and 0.75 in and a width between 0.5 in and 0.75 in, two second inlet ports each having a height between 0.5 and 0.75 in and a width between 1.0 in and 1.5 in, and two third inlet ports, each having a height between 0.5 and 0.75 in and a width between 1.0 in and 1.5 in. A piston is positioned inside the cylinder such that the piston is allowed to translate within the cylinder. The piston includes a threaded piston bowl, a skirt coupled to the threaded piston bowl and extending axially through the cylinder, a threaded piston ring retainer that provides a compressive force on the skirt and on the threaded piston bowl, and a bronze wrist-pin bearing that extends transversely through an opening formed in the skirt. The wrist-pin bearing is configured to support a wrist pin such that the wrist pin is rotatable with respect to the wrist-pin bearing. Additionally, each height is measured in the axial direction of the cylinder, and each width is measured in the circumferential direction of the cylinder.

Another embodiment of the invention relates to a two-cycle diesel engine with an air inlet and a supercharger coupled to the air inlet. The supercharger includes a housing coupled to a power source and to an intake manifold of the engine. A first screw is coupled to the power source, such that the power source rotates the first screw in a first direction. Further, a second screw is enmeshed with the first screw, such that the rotation of the first screw in the first direction rotates the second screw in a second direction that is complementary to the first direction. When the power source rotates the first and second screws, air is forced through the first and second screws into the intake manifold of the engine to increase an internal operating pressure of the engine.

Alternative exemplary embodiments relate to other features and combinations of features as may be generally recited in the claims.

BRIEF DESCRIPTION OF THE DRAWINGS

This application will become more fully understood from the following detailed description, taken in conjunction with the accompanying figures, wherein like reference numerals refer to like elements in which:

FIG. 3B is another perspective cross-sectional view of the engine block shown in FIG. 3A, taken on the opposite side of the plane from which FIG. 3A is cut, according to an exemplary embodiment.

FIG. 18 is a table of angles and dimensions related to the inlet flow channels and exhaust flow channels, according to an exemplary embodiment.

DETAILED DESCRIPTION

Figure 1:
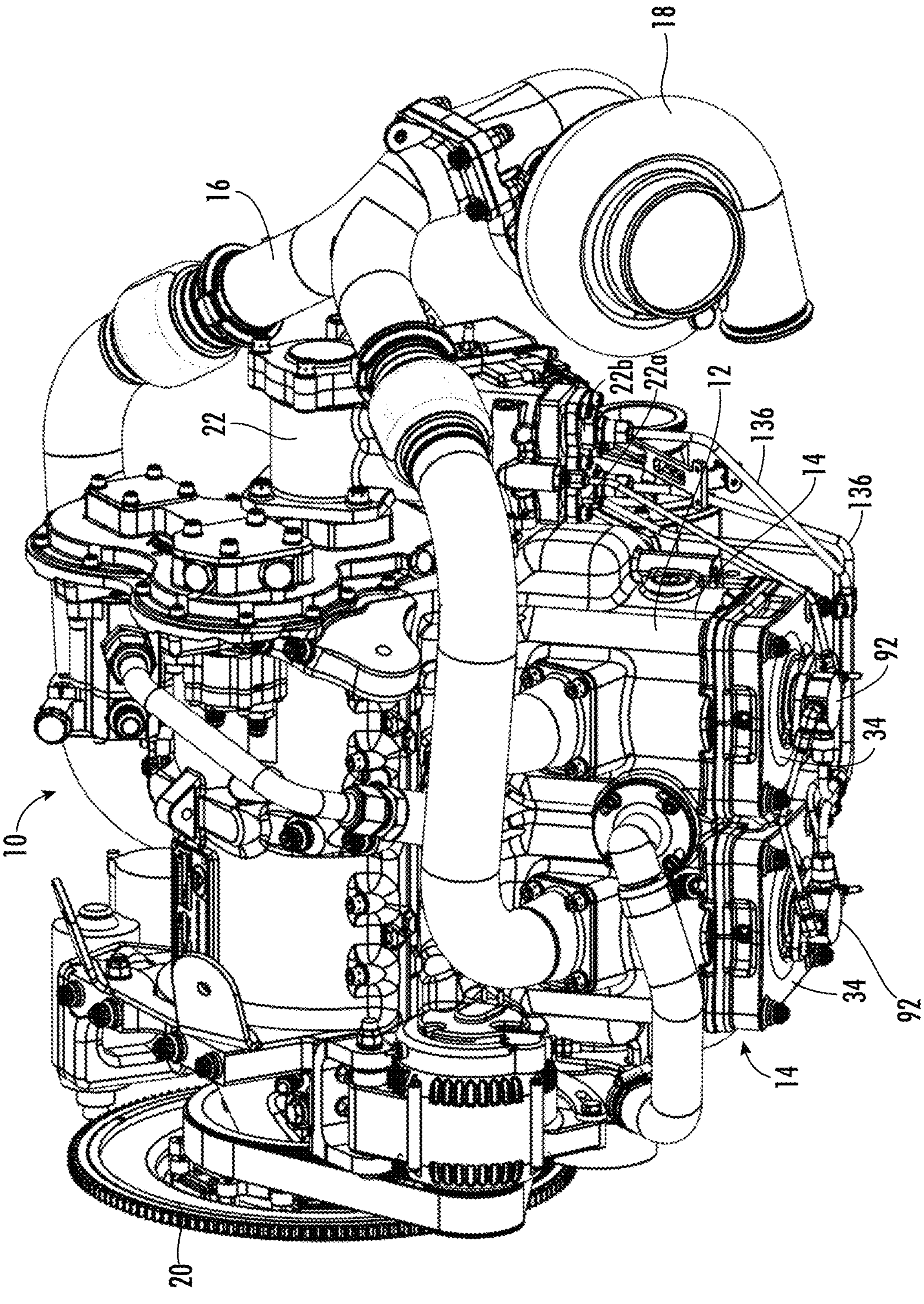
FIG. 1 is a perspective view from above of a two-stroke diesel engine, according to an exemplary embodiment.

FIG. 1 shows a perspective view of a two-stroke diesel engine 10. Engine 10 has an engine block 12 with four cylinders 14, though other cylinder configurations are contemplated (e.g., 2, 4, 6, 8, 10, 12, 14 cylinders, etc.). The number of cylinders is modified to change aspects of engine performance, and specifically the output torque and/or horsepower based on engine revolutions per minute (RPM). More cylinders (e.g., 6, 8, 10 cylinders etc.) enhance transitions in horsepower and/or torque, whereas fewer cylinders generally reduce engine weight. As illustrated, engine 10 includes engine block 12, an exhaust manifold 16, a turbocharger 18, a flywheel 20, a fuel pump assembly 22, cylinders 14, and a supercharger 24 (see FIG. 2), according to an exemplary embodiment. In specific embodiments, fuel pump assembly 22 includes multiple fuel pumps, such as fuel pumps 22*a* and 22*b* (shown in the top perspective of FIG. 1) and fuel pumps 22*c* and 22*d* (shown in the bottom perspective view of FIG. 53).

Figure 1A:
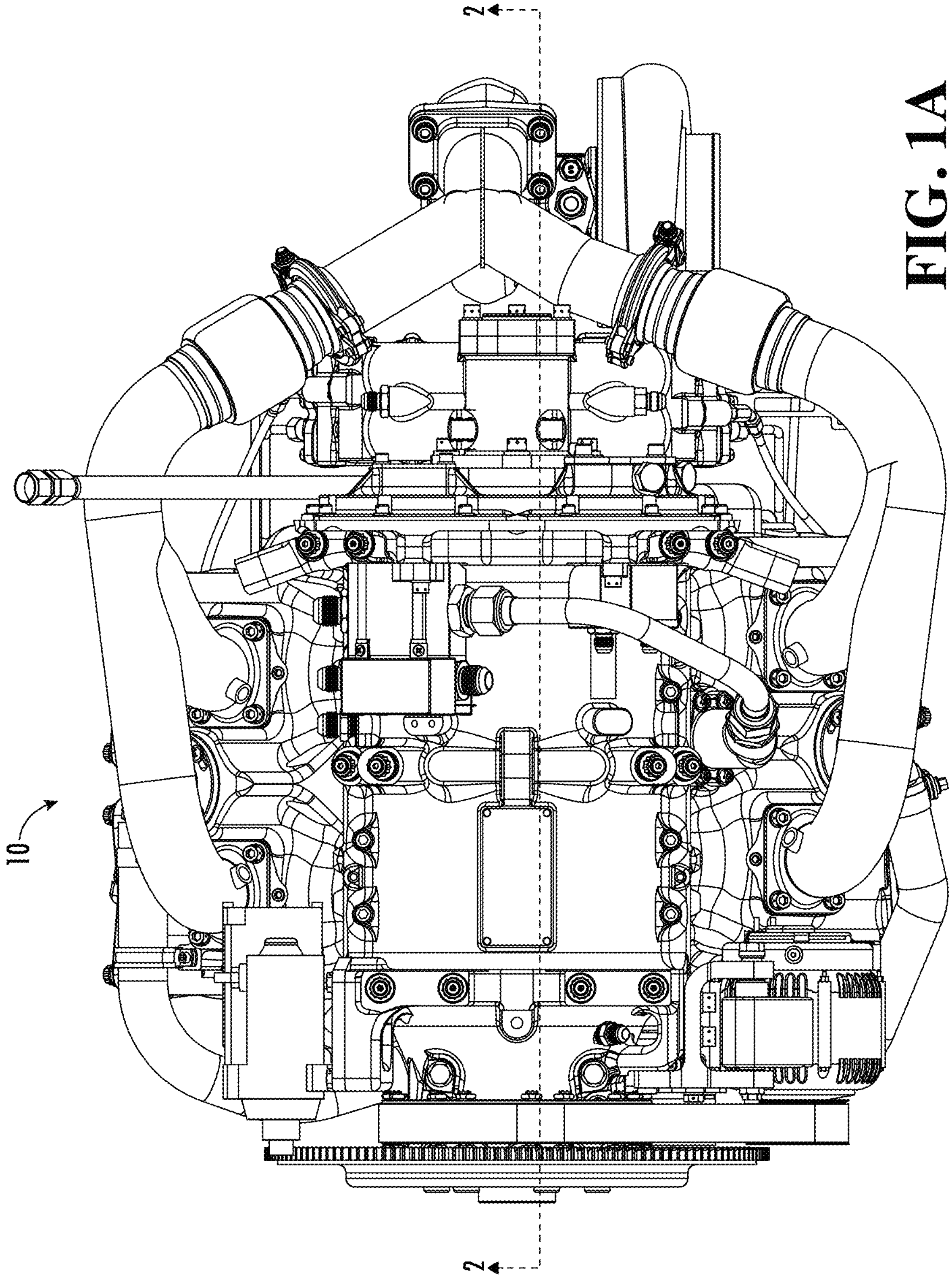
FIG. 1A is a top view of the engine shown in FIG. 1, according to an exemplary embodiment.
Figure 2:
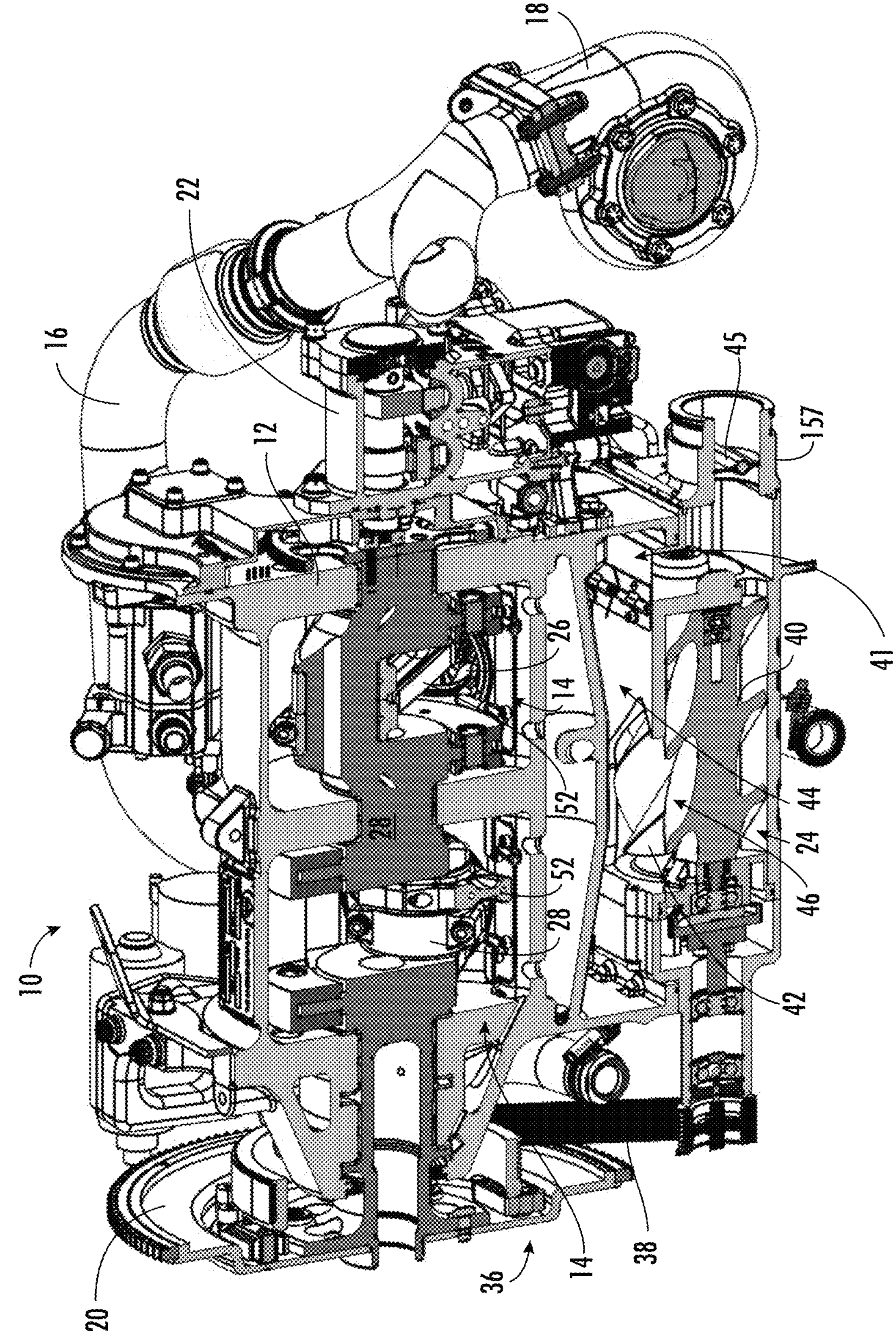
FIG. 2 is a perspective cross-sectional view of the engine shown in FIG. 1, taken along lines 2-2 in FIG. 1A, according to an exemplary embodiment.

FIG. 2 is a perspective cross-sectional view of engine 10, taken along line 2-2, shown in FIG. 1A. As shown, line 2-2 is near a midsection of the engine, but slightly off-center to better illustrate aspects of cylinders 14, pistons 26, camshafts or crankshafts 28, and supercharger 24. Note, as shown in FIGS. 1-2, and 53-54, engine 10 is oriented in an A-block configuration, which is an inverted V-block. Conventional V-block engine configurations include cylinders 14 on an upper or top side of the engine. In contrast to a conventional V-block engine, the A-block engine 10 shown has inverted cylinders 14, such that the cylinders 14 are on a lower or bottom side of engine 10. In other words, in the A-block configuration, a head or cylinder cap 34 of each cylinder 14 and piston 26 is located near the bottom of engine 10, and cylinders 14 extend in a generally downward direction. Applicant has found that this orientation has improved visibility effects, for example, when the A-block engine 10 is mounted with a propeller in an aircraft. In this example, the pilot is better able to see around engine 10, since cylinders 14 that would otherwise obstruct visibility are located further away from the pilot. Also, the orientation of A-block engine 10 is such that engine 10 is narrowest in the pilot's line of sight. Note, where individual engine components are illustrated in the figures, for example, the cylinder and related components illustrated in FIGS. 3A-21, the piston and related components illustrated in FIGS. 22-46, and the fuel pump assembly and housing illustrated in FIGS. 47-52, etc., the component parts are oriented in a non-inverted, V-block orientation. When applied to an engine with an A-block configuration, such as engine 10, shown in FIGS. 1-2 and 53-54, such components would likewise be generally vertically inverted from the orientations shown.

As will be discussed in greater detail below, various features of supercharger 24 are visible in FIG. 2. For example, supercharger 24 couples to a power source 36 (e.g., flywheel 20 that captures momentum from engine 10) via a belt 38. Power source 36 could be any external driver, but in the specific embodiment illustrated in FIGS. 1-2, energy is taken from engine 10 to turn a thin-blade screw 40. The thin-blade screw 40 enmeshes with a thick-blade screw 42 via a gearset, which cooperates to force air into an intake manifold 44 of engine 10. As shown, an opening 46 of supercharger 24 communicates air from an inlet port or air inlet 157, i.e. an intake port, through screws 40 and 42 that force the air through opening 46 and into intake manifold 44. In specific embodiments, the air inlet 157 includes a butterfly valve 45. Butterfly valve 45 serves as an emergency air shutoff to shutdown the engine 10 in the event of a problem. In various embodiments, the supercharger 24 also includes a bypass door 41. In the event of a rotor seizure, the air pressure differential between the air inlet 157 and the intake manifold 44 causes bypass door 41 to open.

In specific embodiments, within a given cylinder 14, crankshaft 28 is positioned on top of rod 52 that couples to piston 26. As shown in FIG. 2, rod 52 and piston 26 are oriented in a downward configuration, consistent with the A-block engine 10 design.

Figure 3A:
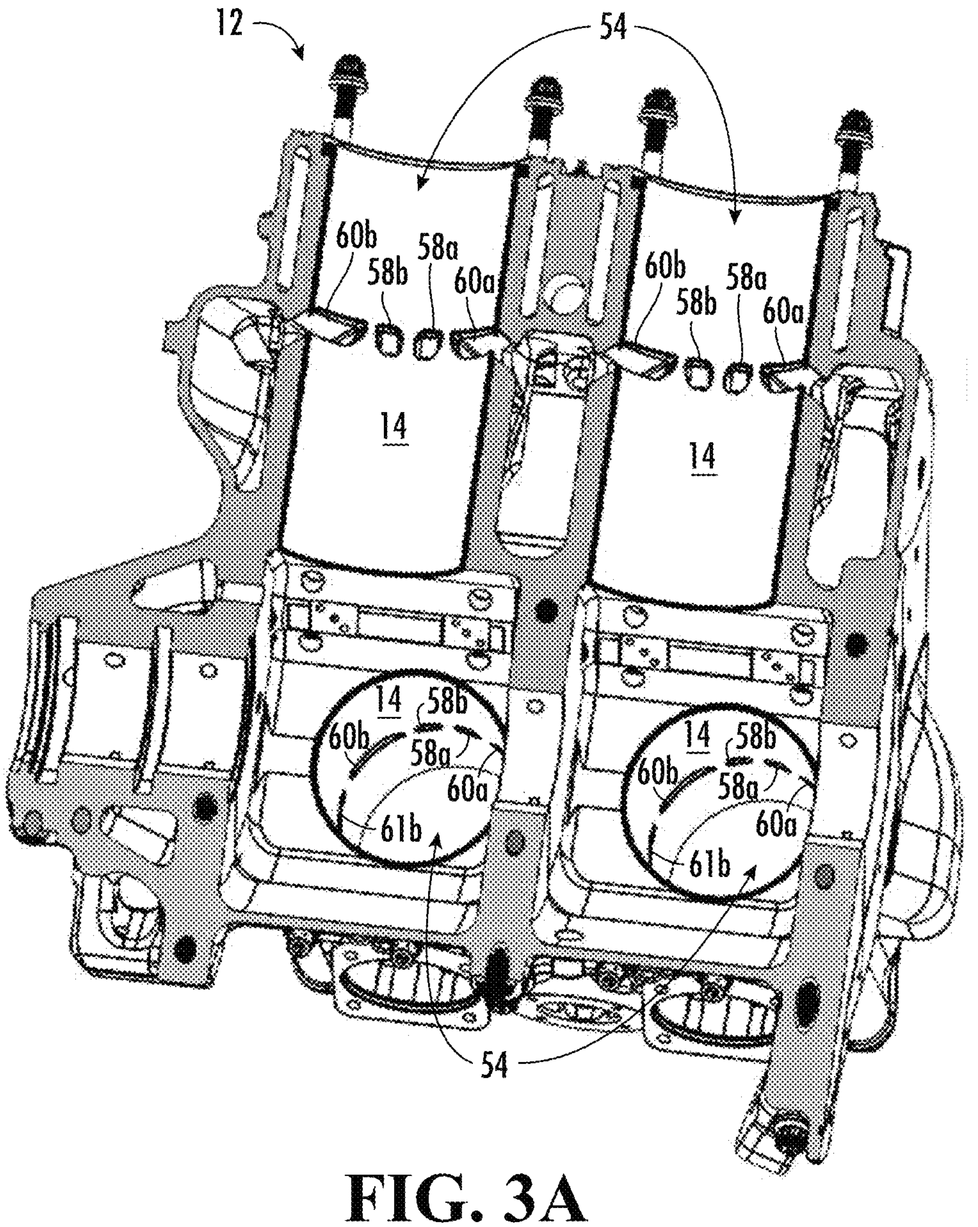
FIG. 3A is a perspective cross-sectional view of an engine block, according to an exemplary embodiment.
Figure 3B:
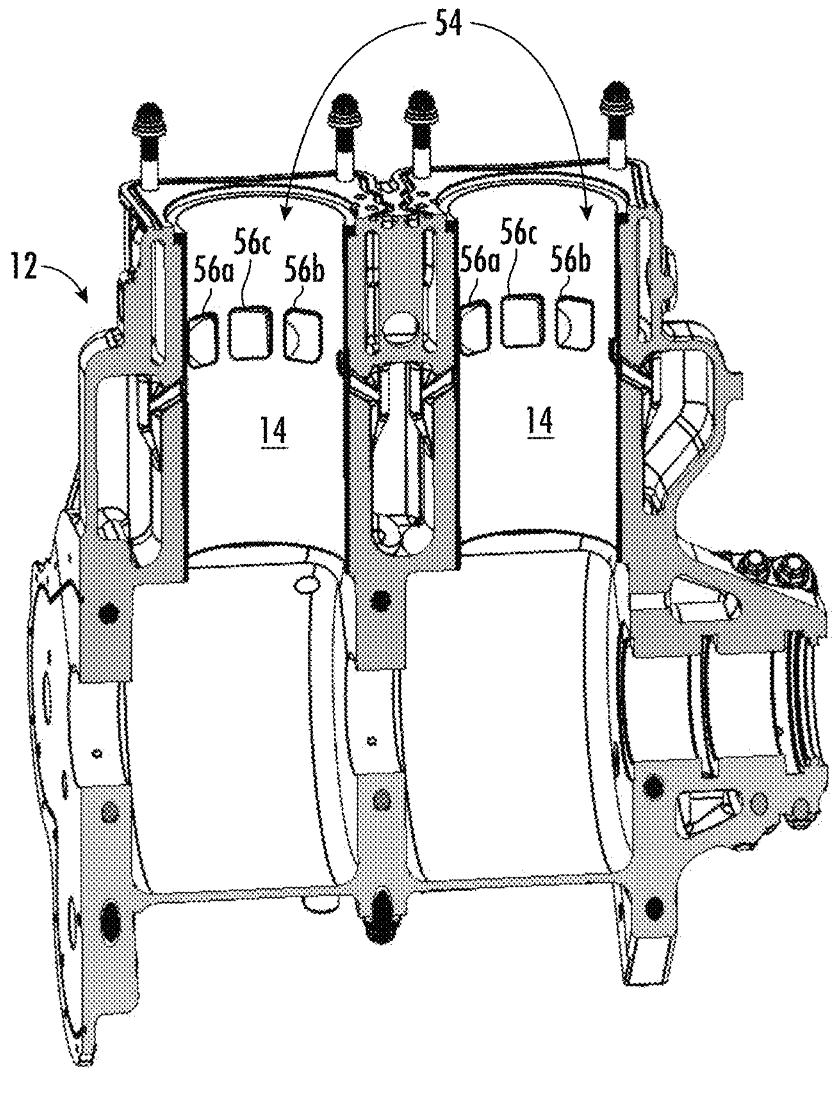
Figure 3C:
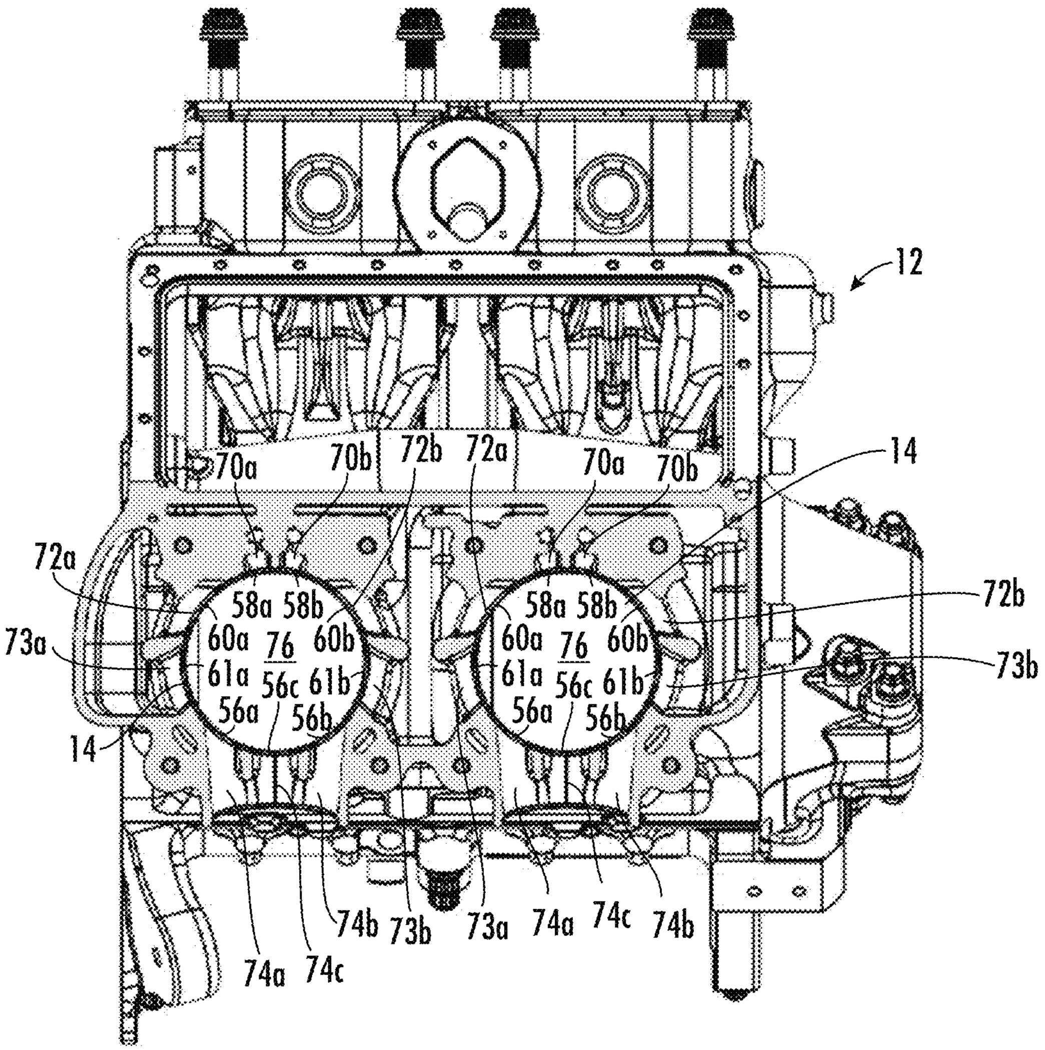
FIG. 3C is another perspective cross-sectional view of the engine block shown in 3A, cut along a plane parallel to the piston bowl surface of a piston of the engine block, according to an exemplary embodiment.

FIGS. 3A-3C show multiple cross-sectional views of engine block 12, which includes cylinders 14. In the embodiment shown in FIGS. 3A-3C, engine block 12 includes four cylinders 14, specifically two pairs of cylinders 14. Each cylinder 14 forms a respective volume or chamber 54 within engine block 12. FIG. 3A shows engine block 12 oriented along a cross-section taken at the crankshaft such that at least a portion of each of the four cylinders 14 is visible. FIG. 3B shows the remainder of engine block 12, specifically the opposite cross-section of engine block 12 from FIG. 3A. In other words, FIGS. 3A and 3B are cut by the same plane and comprise opposite views into engine block 12 from opposite sides of the plane.

In specific embodiments, the cylindrical surface of each cylinder 14 defines a plurality of exhaust ports 56 and pluralities of first, second, and third inlets or inlet ports 58, 60, 61, also known as intake ports. As illustrated in FIGS. 3A-22, the plurality of exhaust ports 56 includes exhaust ports 56*a*, 56*b*, and 56*c*, the plurality of first inlet ports 58 include first inlet ports 58*a* and 58*b*, the plurality of second inlet ports 60 includes second inlet ports 60*a* and 60*b*, and the plurality of third inlet ports 61 includes third inlet ports 61*a* and 61*b*. As shown in FIG. 3B, exhaust ports 56*a*, 56*b*, and 56*c* are grouped together and positioned generally opposite from first inlet ports 58*a* and 58*b* (shown in the opposite view of FIG. 3A).

After exhaust is removed from chamber 54, it enters into exhaust manifold 16 (see FIGS. 1 and 2) and/or the environment. In specific embodiments, there is always positive air pressure on the inlet side of the engine 10 relative to the exhaust side. When there is positive air pressure on the inlet side of the engine 10 relative to the exhaust side, the influx of fresh air through the pluralities of first, second, and third inlet ports 58, 60, and 61 of a given cylinder 14 forces the exhaust out of chamber 54 through the plurality of exhaust ports 56 of the cylinder 14. The influx of fresh air and discharge of exhaust is known as a scavenging event and occurs with every cycle of piston 26 (see FIG. 2) in two-stroke engine 10.

FIG. 3C is another cross-sectional view of engine block 12. The cross section shown in FIG. 3C is cut along a plane parallel to the surface of the piston crown 76 of two of the pistons 26 positioned respectively within two of the cylinders 14 of engine block 12. This view shows two first inlet flow channels 70*a*, 70*b* leading respectively to the two first inlet ports 58*a*, 58*b*, two second inlet flow channels 72*a*, 72*b* leading respectively to the two second inlet ports 60*a*, 60*b*, two third inlet flow channels 73*a*, 73*b* leading respectively to the two third inlet ports 61*a*, 61*b*, and three exhaust flow channels 74*a*, 74*b*, 74*c* leading respectively from the three exhaust ports 56*a*, 56*b*, 56*c*. The three exhaust flow channels 74*a*, 74*b*, 74*c* ultimately lead to exhaust manifold 16 (see FIGS. 1 and 2).

Figure 4:
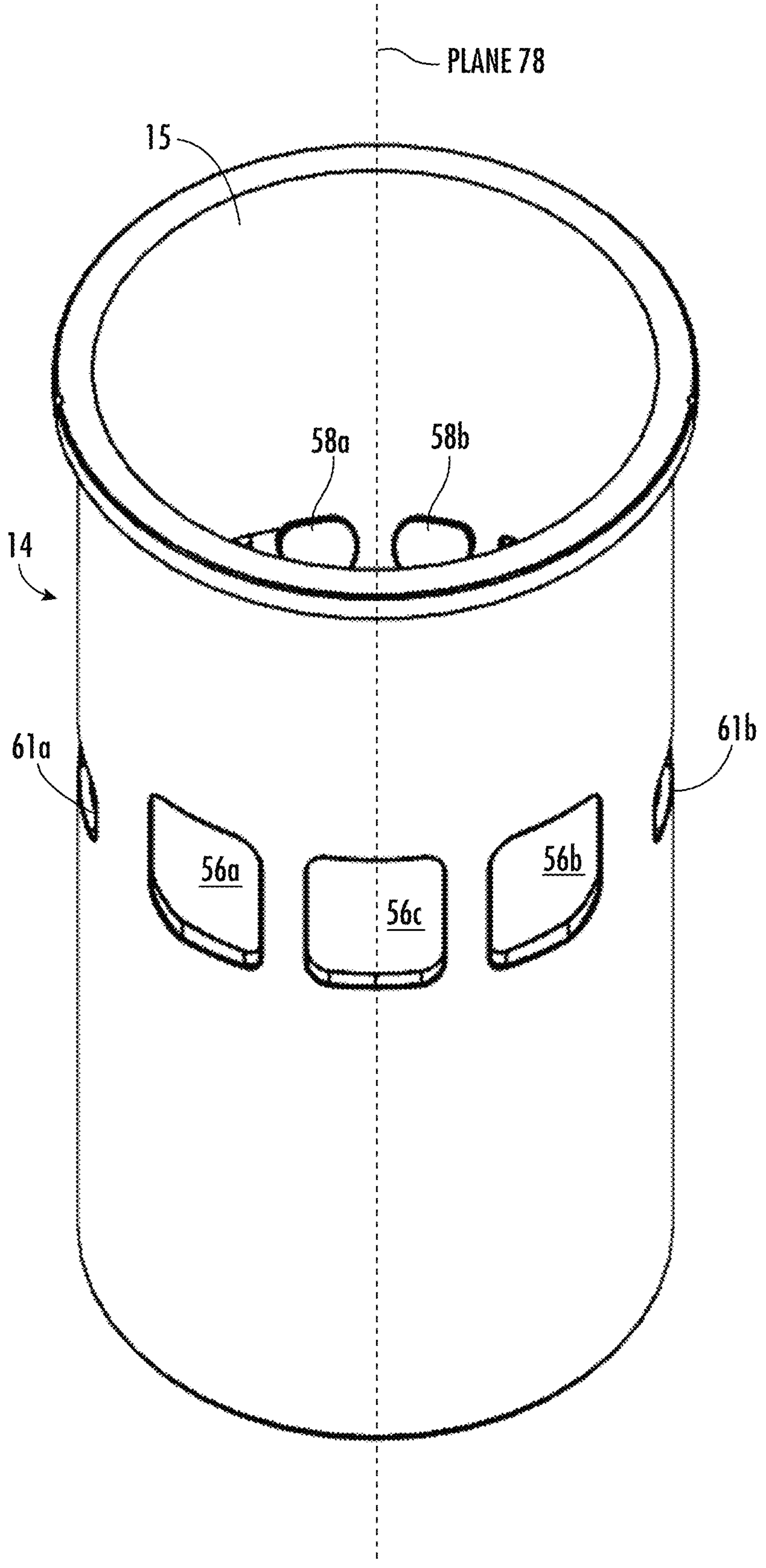
FIG. 4 is a perspective view of an engine block cylinder, according to an exemplary embodiment.

FIGS. 4-7 show various views of a single cylinder 14 of engine block 12, according to an exemplary embodiment. In specific embodiments, a central plane 78 extends along cylinder 14 in the axial direction (e.g., along a primary longitudinal axis of cylinder 14), bisecting cylinder 14 in an orientation such that central plane 78 bisects exhaust port 56*c* and passes between first inlet ports 58*a* and 58*b*. In more specific embodiments, central plane 78 passes between first inlet ports 58*a* and 58*b*, such that first inlet port 58*a* is symmetrically oriented with respect to first inlet port 58*b* about central plane 78. As shown in FIG. 4, first inlet ports 58*a* and 58*b* are positioned on a rear side of cylinder 14, and exhaust port 56*c* is positioned on a front side of cylinder 14, generally opposite from the rear side of cylinder 14 on which first inlet ports 58*a* and 58*b* are positioned. Exhaust port 56*c* is centered on, i.e., bisected by, central plane 78 and is positioned circumferentially between exhaust ports 56*a* and 56*b*. Exhaust port 56*a* is oriented symmetrically with respect to exhaust port 56*b* about central plane 78 in the circumferential direction. Circumferentially adjacent to exhaust port 56*a* is third inlet port 61*a*, and circumferentially adjacent to exhaust port 56*b* is third inlet port 61*b*. Third inlet port 61*a* is symmetrically oriented with respect to third inlet port 61*b* about central plane 78 in the circumferential direction. In specific embodiments, the liner or sleeve forming cylinder 14 is made of cast iron and provides a wear surface 15 for piston 26 to run against.

Figure 5:
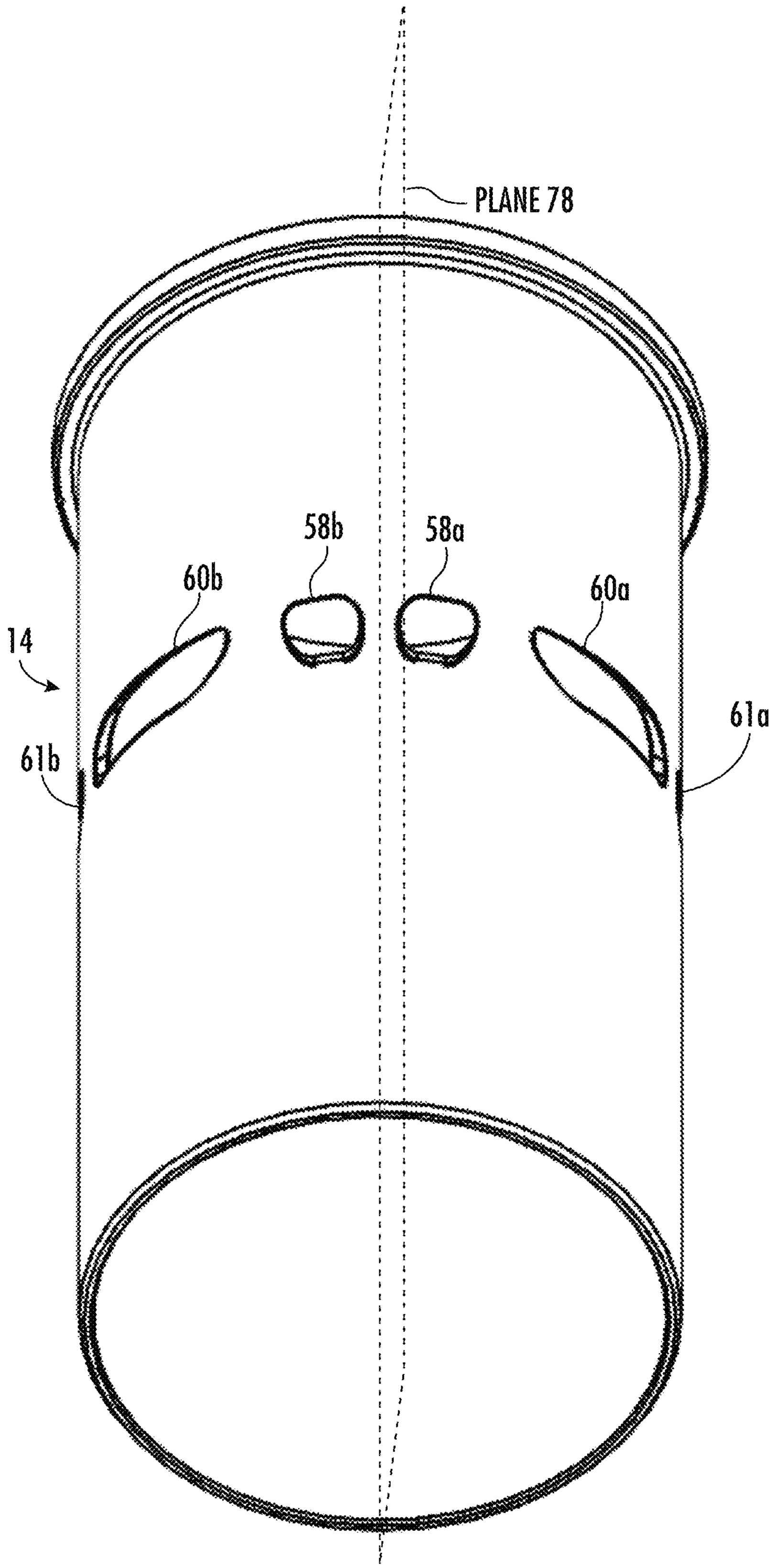
FIG. 5 is a perspective view of an opposite side of the cylinder shown in FIG. 4, according to an exemplary embodiment.

Referring to FIG. 5, first inlet ports 58*a* and 58*b* are again shown positioned circumferentially adjacent to one another and positioned symmetrically about central plane 78 in the circumferential direction. Circumferentially adjacent to first inlet port 58*a*, opposite from first inlet port 58*b*, is second inlet port 60*a*. Similarly, circumferentially adjacent to first inlet port 58*b*, opposite from first inlet port 58*a*, is second inlet port 60*b*. Second inlet port 60*a* is oriented symmetrically with respect to second inlet port 60*b* about central plane 78 in the circumferential direction. Circumferentially adjacent to second inlet port 60*a*, opposite from first inlet port 58*a*, is third inlet port 61*a*. Similarly, circumferentially adjacent to second inlet port 60*b*, opposite from first inlet port 58*b*, is third inlet port 61*b*. Third inlet port 61*a* is oriented symmetrically with respect to third inlet port 61*b* about central plane 78 in the circumferential direction.

Figure 6A:
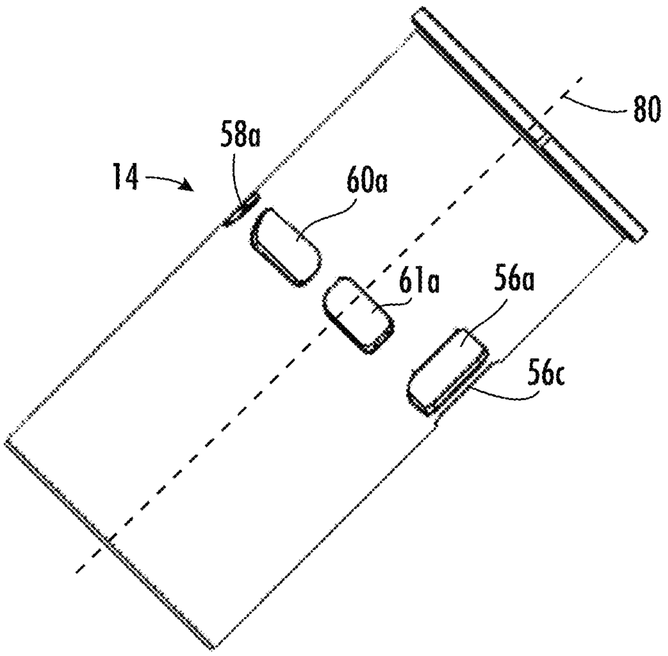
FIG. 6A is a side view of the cylinder shown in FIG. 4, according to an exemplary embodiment.
Figure 6B:
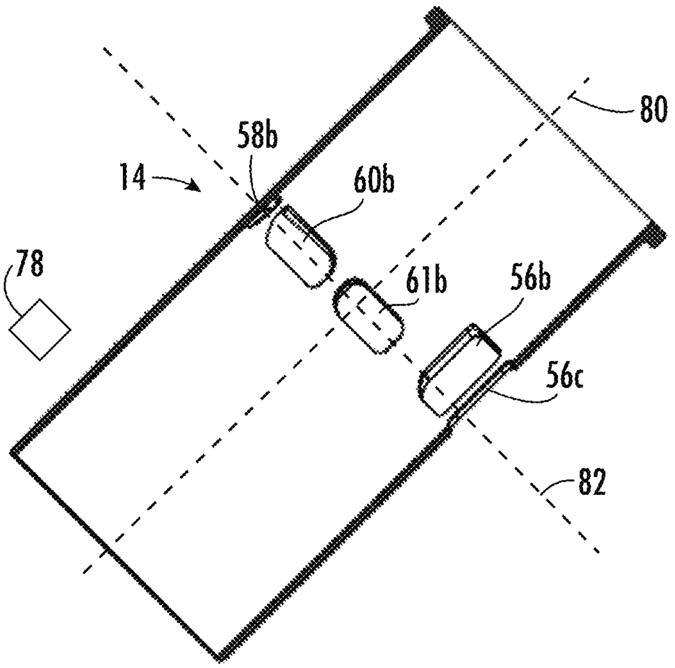
FIG. 6B is a cross-sectional view of the cylinder shown in FIG. 6A, according to an exemplary embodiment.

Referring to FIGS. 6A-6B, a cylinder 14 is shown with a central axis 80 that is aligned with the longitudinal axis of cylinder 14. FIG. 6B is a cross-section of cylinder 14 taken along bisecting central plane 78, a small portion of which is shown within FIG. 6B for orientational reference. As discussed above, in various embodiments the ports within each of the plurality of exhaust ports 56, the plurality of first inlet ports 58, the plurality of second inlet ports 60, and the plurality of third inlet ports 61 are oriented symmetrically with respect to one another about central plane 78 in the circumferential direction (shown in greater detail in FIG. 7). FIGS. 6A-6B highlight the symmetry, specifically with respect to second inlet ports 60*a* and 60*b*, third inlet ports 61*a* and 61*b*, and two of the exhaust ports 56*a* and 56*b*. As shown in FIG. 6A-6B, second inlet port 60*a* substantially aligns with second inlet port 60*b* with respect to plane 78, third inlet port 61*a* substantially aligns with third inlet port 61*b* with respect to plane 78, and exhaust port 56*a* substantially aligns with exhaust port 56*b* with respect to plane 78. FIG. 6B also shows a transverse axis 82 that is perpendicular to central axis 80.

Figure 7:
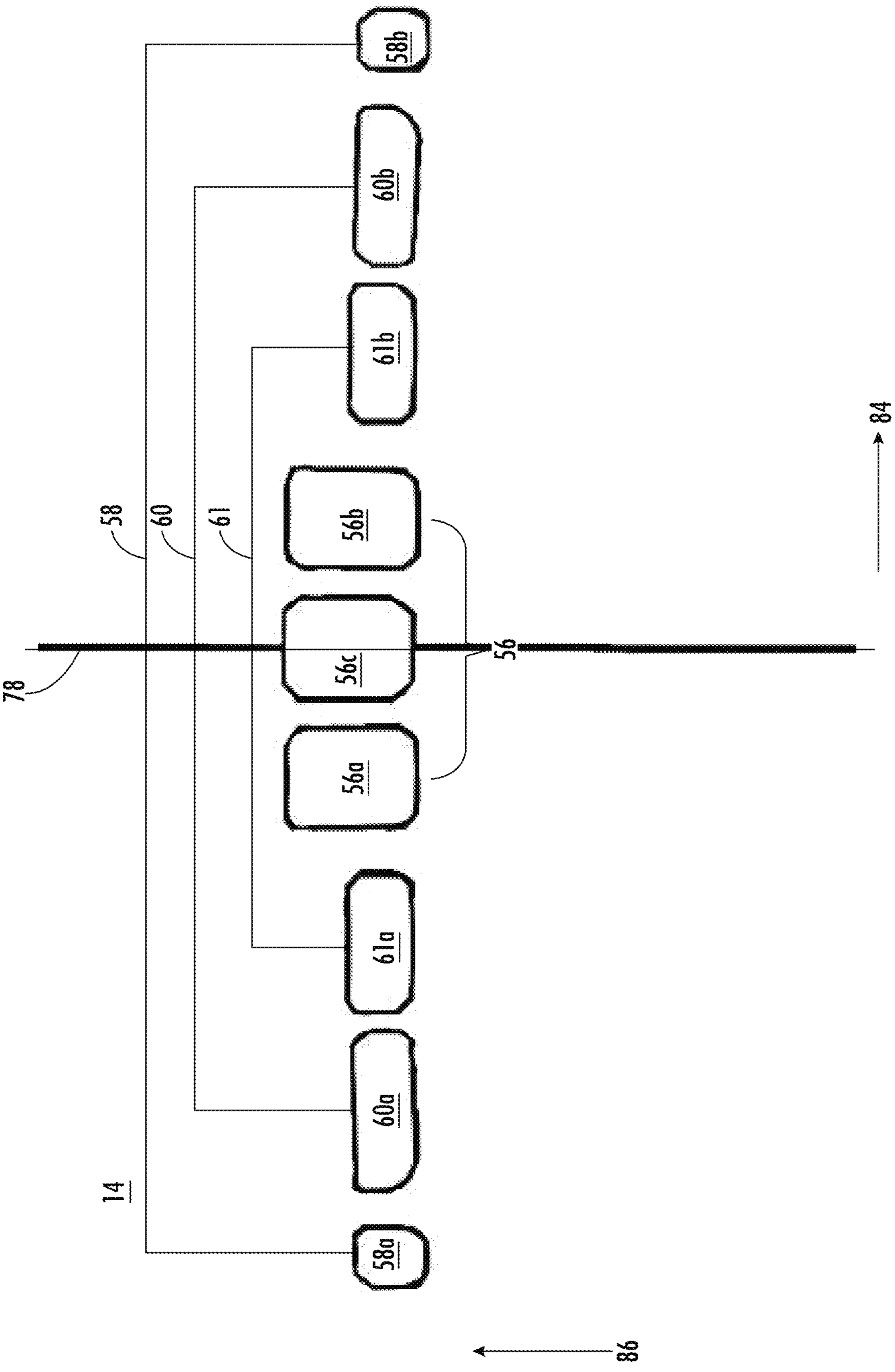
FIG. 7 is a rolled-out view of the cylinder shown in FIG. 4, showing all inlet ports and exhaust ports of the cylinder, according to an exemplary embodiment.

FIG. 7 shows a rolled-out view of the cylinder illustrating the pluralities of first, second, and third inlet ports 58, 60, and 61 and the plurality of exhaust ports 56 formed within cylinder 14. Directional arrow 84 defines a circumferential direction about cylinder 14 and directional arrow 86 represents an axial direction along cylinder 14. The axial direction is perpendicular to the circumferential direction and runs parallel to central axis 80 of cylinder 14.

This view further shows the symmetrical nature of the various pluralities of ports. In specific embodiments, first inlet ports 58*a* and 58*b* have a same or similar first shape, first size, and first area and are symmetric about central plane 78 in the circumferential direction. Second inlet ports 60*a* and 60*b* have a same or similar second shape, second size, and second area and are symmetric about central plane 78 in the circumferential direction. Third inlet ports 61*a* and 61*b* have a same or similar third shape, third size, and third area and are symmetric about central plane 78 in the circumferential direction. Additionally, exhaust ports 56*a*, 56*b*, and 56*c* have a same or similar fourth shape, fourth size, and fourth area. In certain specific embodiments, exhaust port 56*c* has a fifth shape, fifth size, and/or fifth area that varies slightly from exhaust ports 56*a* and 56*b*, as will be described in greater detail below. As used herein, a "similar" size and/or area is equal to or within ±5%, and more specifically within ±2%, and even more specifically within ±1%. In various embodiments, when ports have the same shape, the ports are exact or uniformly scaled mirror images of one another (e.g. two circles with the same diameter, two circles with different diameters, a first rectangle with a 1 to 2 ratio of short leg to long leg dimensions and a second rectangle having a 2 to 4 ratio of short leg to long leg dimensions).

In FIG. 7, exhaust ports 56*a* and 56*b* are again shown to be arranged symmetrically about central plane 78, and exhaust port 56*c* is again shown to be positioned between exhaust port 56*a* and exhaust port 56*b* in the circumferential direction, and to be bisected by central plane 78. In various embodiments, the first, second, and third areas of the respective first, second and third inlet ports are measured at the point of entry, and the fourth areas of the respective exhaust ports are measured at the point of exit.

As further shown in FIG. 7, the two first inlet ports 58*a* and 58*b* are depicted on opposite ends of the rolled-out cylinder 14, meaning when the cylinder 14 is formed into its cylindrical shape, the two first inlet ports 58*a* and 58*b* are adjacent to one another in the circumferential direction. Second inlet ports 60*a* and 60*b* are located on either side of first inlet ports 58*a* and 58*b*, respectively, in the circumferential direction. Further, third inlet ports 61*a* and 61*b* are located on either side of second inlet ports 60*a* and 60*b*, opposite respective first inlet ports 58*a* and 58*b*, in the circumferential direction. Still with reference to the circumferential direction, exhaust ports 56*a* and 56*b* are located on either side of third inlet ports 61*a* and 61*b*, opposite respective second inlet ports 60*a* and 60*b*, respectively, and exhaust port 56*c* is located circumferentially between exhaust ports 56*a* and 56*b*, opposite respective third inlet ports 61*a* and 61*b*.

Figure 8:
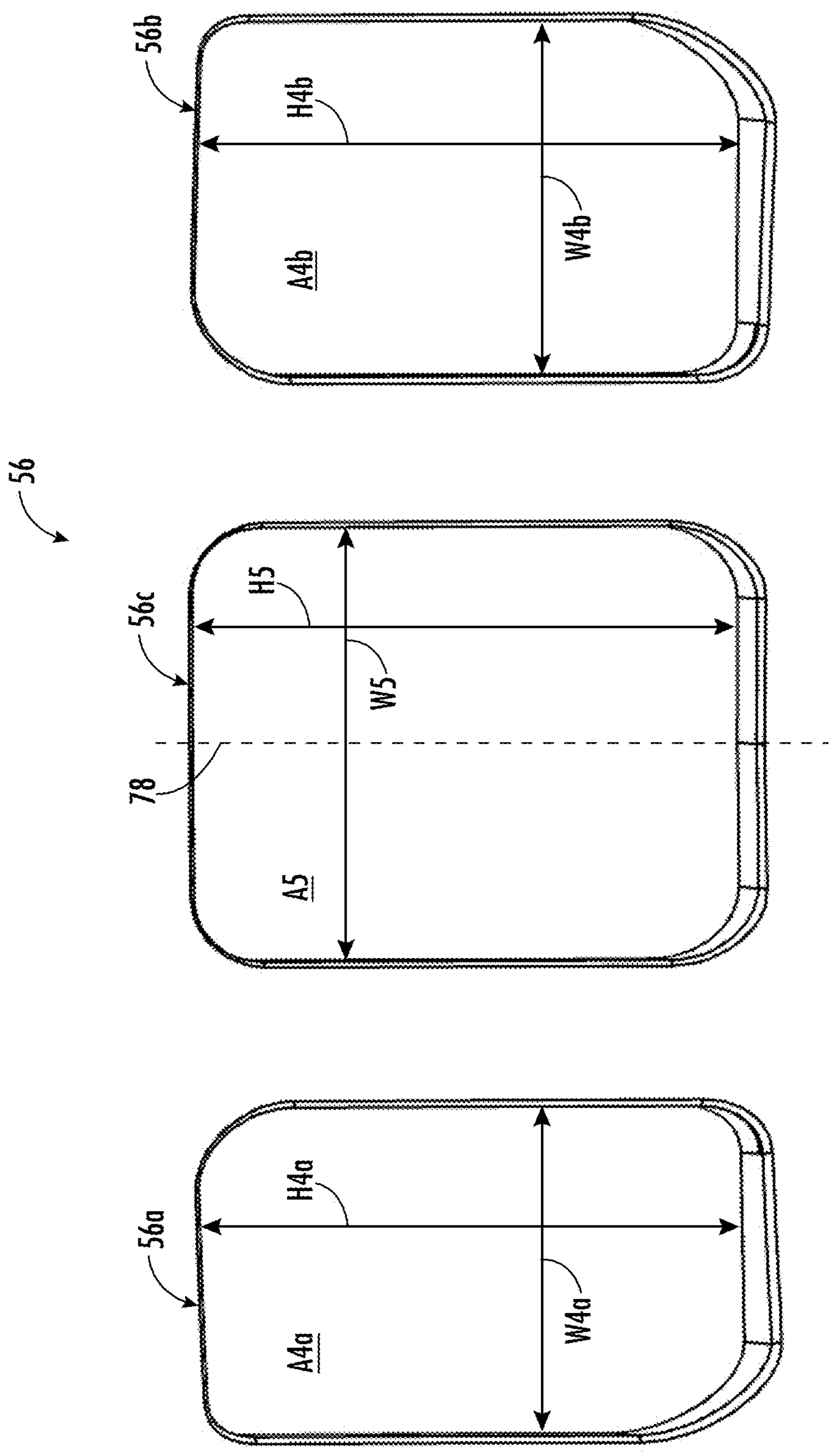
FIG. 8 is a detailed view of the exhaust ports of the cylinder shown in FIG. 4, according to an exemplary embodiment.
Figure 9:
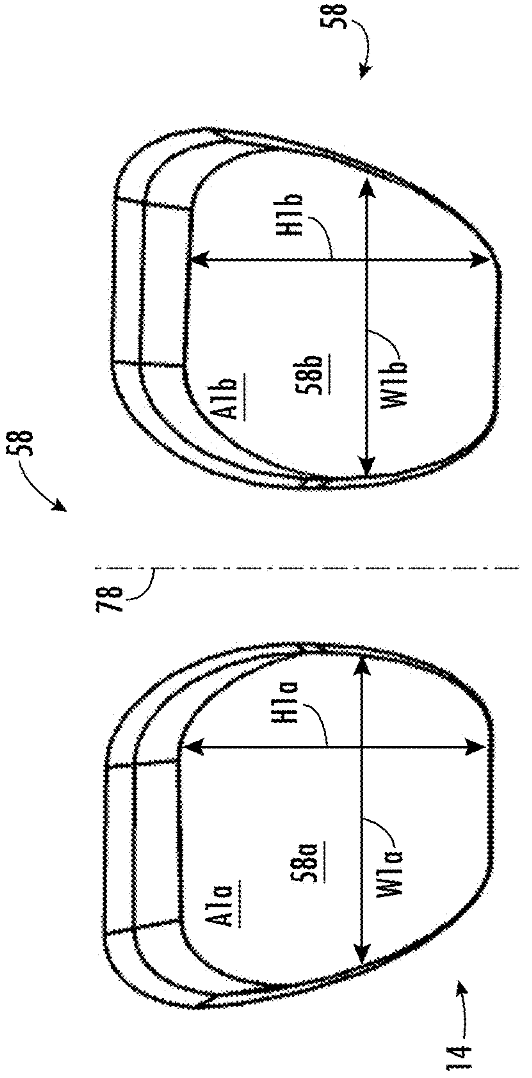
FIG. 9 is a detailed view of a plurality of first inlet ports of the cylinder shown in FIG. 4, according to an exemplary embodiment.
Figure 10:
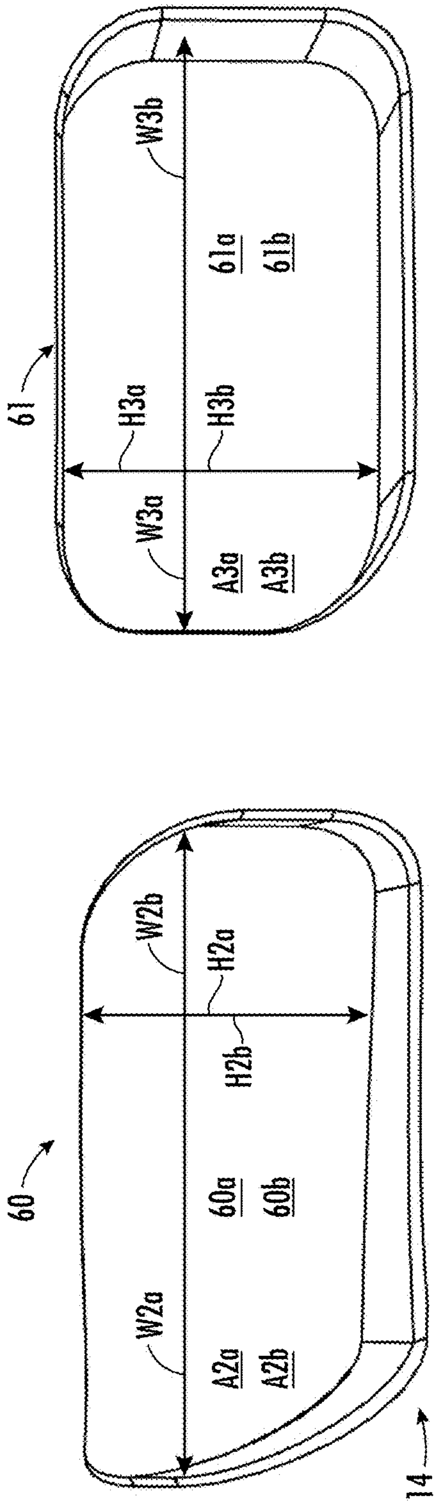
FIG. 10 is a detailed view of a second inlet port and a third inlet port of the cylinder shown in FIG. 4, according to an exemplary embodiment.

FIGS. 8-10 show various dimensions of the plurality of exhaust ports 56, and the pluralities of first, second, and third inlet ports 58, 60 and 61. FIG. 8 is a detailed view of the plurality of exhaust ports 56 that are formed in cylinder 14. As shown in FIG. 8, exhaust ports 56*a* and 56*b* have the same or similar shape, size (e.g., similar height and/or width dimensions), and/or area to one another. Exhaust ports 56*a* and 56*b* define respective heights H4*a* and H4*b* and respective widths W4*a* and W4*b*, which together define respective exhaust port areas A4*a* and A4*b*. Exhaust port 56*c* defines a height H5 and width W5, which together define exhaust port area A5. A total exhaust port area is equal to the sum of exhaust port areas A4*a*, A4*b*, and A5. In specific embodiments, exhaust port area A4*a* is similar to exhaust port area A4*b*, and width W4*a* is similar to width W4*b*. In some embodiments, exhaust port area A5 is also similar to respective exhaust port areas A4*a* and A4*b*, and width W5 is also similar to respective widths W4*a* and W4*b*. In certain specific embodiments, exhaust port area A5 varies from respective exhaust port areas A4*a* and A4*b* by ±0.01 $in^2$. In specific embodiments, heights H4*a*, H4*b*, and H5 are similar to one another. Each of the widths W4*a*, W4*b*, W5, W1*a*, W1*b*, W2*a*, W2*b*, W3*a*, and W3*b* are measured circumferentially.

In various specific embodiments, heights H4*a*, H4*b*, and H5 are each between 1.0 inches and 1.5 inches, specifically between 1.2 inches and 1.35 inches, and, more specifically, 1.28±0.05 inches. In specific embodiments, widths W4*a*, W4*b*, and W5 are each between 0.75 inches and 1.25 inches, specifically within 0.9 inches and 1.1 inches, and more specifically 1±0.05 inches. In some embodiments, the plurality of exhaust ports 56*a*, 56*b*, and 56*c* each have a height between 1.0 inch and 1.5 inches and a width between 0.75 inches and 1.25 inches. In some embodiments, the total exhaust port area, specifically the summation of exhaust port areas A4*a*, A4*b*, and A5 is between 3.5 $in^2$ and 4.0 $in^2$, specifically 3.82±0.05 $in^2$.

FIG. 9 is a detailed view of the plurality of first inlet ports 58 that are formed in cylinder 14. As shown in FIG. 9, first inlet ports 58*a* and 58*b* have the same shape, size, and area. First inlet ports 58*a* and 58*b* define respective heights H1*a* and H1*b* and respective widths W1*a* and W1*b*, which together define respective inlet port areas Ala and Alb. In specific embodiments, first inlet port area Ala is similar to first inlet port area Alb, width W1*a* is similar to width W1*b*, and height H1*a* is similar to height H1*b*. A total first inlet port area is equal to the sum of first inlet port areas Ala and Alb.

In various specific embodiments, respective heights H1*a* and H1*b* are between 0.5 inches and 0.75 inches and respective widths W1*a* and W1*b* are between 0.5 inches and 0.75 inches. The size and shape of first inlet ports 58*a* and 58*b* are substantially the same, such that a total first inlet port area is substantially equal to two times the first inlet port area Ala. In various embodiments, the total first inlet port area is between 0.6 $in^2$ and 0.8 $in^2$. In certain more specific embodiments, the total first inlet port area is 0.754±0.05 $in^2$. In other more specific embodiments, each first inlet port has an area of 0.60515 $in^2$, and the total first inlet port area is 0.30258 $in^2$. In specific embodiments, the total first inlet port area is less than the total exhaust port area, specifically, the total first inlet port area is between 15% and 25% of the total exhaust port area.

FIG. 10 shows a detailed view of the pluralities of second and third inlet ports 60 and 61 that are formed in cylinder 14. As discussed above, second inlet port 60*a* is substantially aligned with second inlet port 60*b* and third inlet port 61*a* is substantially aligned with third inlet port 61*b* on cylinder 14. As such, the plurality of second inlet ports 60 and the plurality of third inlet ports 61 and the dimensions associated therewith are each illustrated in FIG. 10 by a single representative port. As shown in FIG. 10, second inlet ports 60*a* and 60*b* have the same shape, size, and area as one another, and third inlet ports 61*a* and 61*b* have the same shape, size, and area as one another. Second inlet ports 60*a* and 60*b* define respective heights H2*a* and H2*b* and respective widths W2*a* and W2*b*, which together define respective second inlet port areas A2*a* and A2*b*. In specific embodiments, second inlet port area A2*a* is similar to second inlet port area A2*b*, width W2*a* is similar to width W2*b*, and height H2*a* is similar to height H2*b*. A total second inlet port area is equal to the sum of second inlet port areas A2*a* and A2*b*. Third inlet ports 61*a* and 61*b* define respective heights H3*a* and H3*b* and respective widths W3*a* and W3*b*, which together define respective third inlet port areas A3*a* and A3*b*. In specific embodiments, third inlet port area A3*a* is similar to third inlet port area A3*b*, width W3*a* is similar to width W3*b*, and height H3*a* is similar to height H3*b*. A total third inlet port area is equal to the sum of third inlet port areas A3*a* and A3*b*. A combined total area of the total second inlet port area and the total third inlet port area, specifically the summation of second inlet port areas plus the third inlet port areas A2*a*, A2*b*, A3*a*, and A3*b*, is between 75% and 85% of the total exhaust port area.

In various specific embodiments, heights H2*a*, H2*b*, H3*a*, and H3*b* are each between 0.5 and 0.75 inches, and widths W2*a*, W2*b*, W3*a*, and W3*b* are each between 1.0 inch and 1.5 inches. In some embodiments, the total collective second and third inlet port area (i.e., the summation of second and third inlet port areas A2*a*, A2*b*, A3*a*, and A3*b*) is between 2.7 $in^2$ and 3.3 $in^2$. In more specific embodiments, each second inlet port has an area of 0.84054 $in^2$, each third inlet port has an area of 0.60367 $in^2$, and the total collective second and third inlet port area is 2.88842 $in^2$. In certain specific embodiments, widths W2*a* and W2*b* are respectively slightly greater than widths W3*a* and W3*b*. In specific embodiments, widths W2*a* and W2*b* are respectively between 25% and 45% greater than widths W3*a* and W3*b*, specifically between 30% and 45% greater, and more specifically are 35.4%±2% greater. For example, in a specific embodiment, width W2*a* is approximately 1.5±0.2 inches, and width W3*a* is approximately 1.1±0.2 inches.

With reference to FIGS. 8-10, various ratios are defined based on dimensions of the pluralities of first inlet ports 58, second inlet ports 60, third inlet ports 61, and exhaust ports 56. Specifically, widths W1*a*, W1*b*, measured in a circumferential direction of cylinder 14, are respectively between 55% and 65% of widths W4*a*, W4*b* of exhaust ports 56*a*, 56*b*. Widths W2*a*, W2*b* of second inlet ports 60*a*, 60*b*, measured in a circumferential direction of cylinder 14, are respectively between 105% and 152% of widths W4*a*, W4*b* of exhaust ports 56*a*, 56*b*. Similarly, heights H1*a*, H1*b* of first inlet ports 58*a*, 58*b*, measured in an axial direction of cylinder 14, are respectively between 40% and 60% of the heights H4*a*, H4*b*, H5 of exhaust ports 56*a*, 56*b*, 56*c*. Heights H2*a*, H2*b* of second inlet ports 60*a*, 60*b* are respectively between 40% and 60% of the heights H4*a*, H4*b*, H5 of exhaust ports 56*a*, 56*b*, 56*c*.

In specific embodiments, the total inlet port area, specifically the combined total of the total first, second, and third inlet port areas Ala Alb, A2*a*, A2*b*, A3*a*, A3*b*, is greater than the total exhaust port area, specifically the combined total of exhaust port areas A4*a*, A4*b*, and A5. More specifically, in certain embodiments, following initial block casting, the total inlet port area is 108% of the total exhaust port area. Once the liner or sleeve of cylinder 14 is installed during assembly (e.g. as is shown in FIGS. 8-10), the total inlet port area is approximately 93% of the total exhaust port area. Applicant has found that the described orientations and locations of dimensions, areas, and/or sizes of inlets and exhaust ports enhances circulation, which improves efficiency and/or power output during operation of engine 10. Port timing (crank angle degrees BTDC) and port duration (crank angle degrees) are also key metrics in performance considerations. Port timing is controlled by port height within the cylinder relative to TDC. In specific embodiments, port timings are symmetric about cylinder 14 and can be calculated as: 180−(duration/2). In certain specific embodiments, the exhaust duration is 152 degrees, and the intake duration is 100 degrees.

Figure 11:
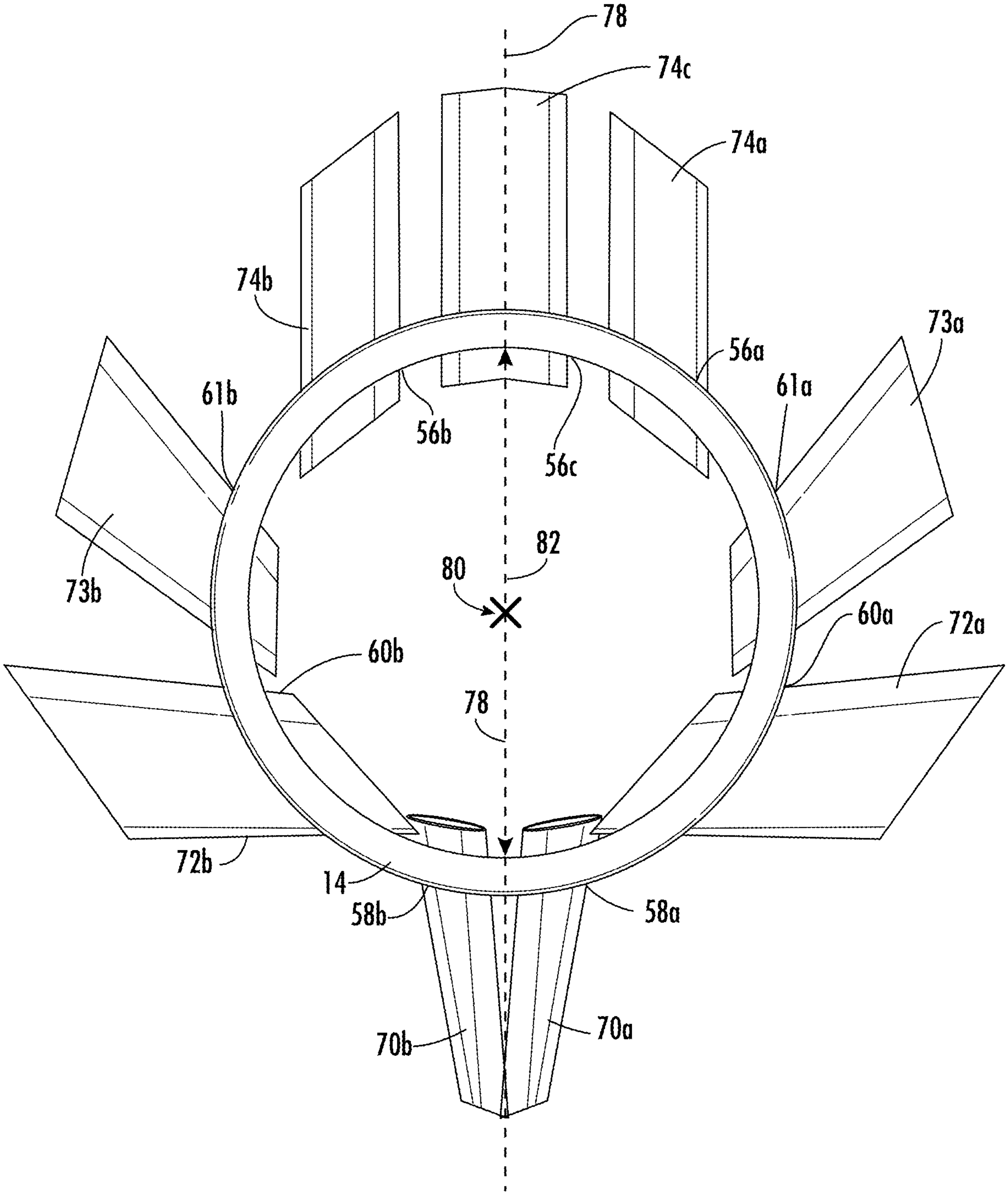
FIG. 11 is a top view of the inlet flow channels and exhaust flow channels leading through the corresponding inlet ports and exhaust ports of the cylinder shown in FIG. 4, according to an exemplary embodiment.

FIG. 11 shows various inlet and exhaust flow channels leading through various ports. Specifically, a plurality of first inlet flow channels 70*a*, 70*b* respectively couple to first inlet ports 58*a*, 58*b*. A plurality of second inlet flow channels 72*a*, 72*b* respectively couple to second inlet ports 60*a*, 60*b*. A plurality of third inlet flow channels 73*a*, 73*b* respectively couple to third inlet ports 61*a*, 61*b*. A plurality of exhaust flow channels 74*a*, 74*b*, and 74*c*, respectively couple to exhaust ports 56*a*, 56*b*, 56*c*. Exhaust flow channels 74*a*, 74*b*, and 74*c* form an exhaust directional angle $\gamma$ that is parallel or equal to zero, relative to transverse axis 82 (see FIGS. 14-17).

Figure 12:
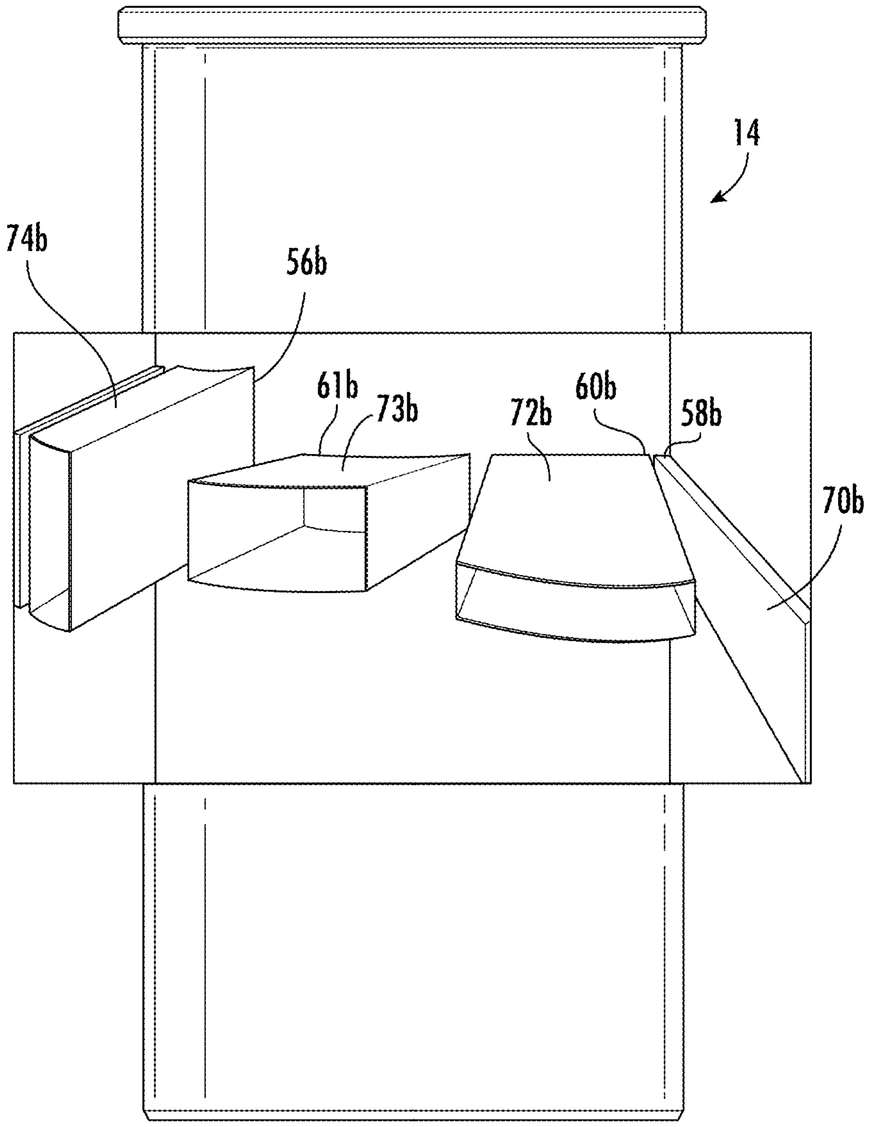
FIG. 12 is a side view of various inlet flow channels and exhaust flow channels leading into the cylinder shown in FIG. 4, according to an exemplary embodiment.
Figure 13:
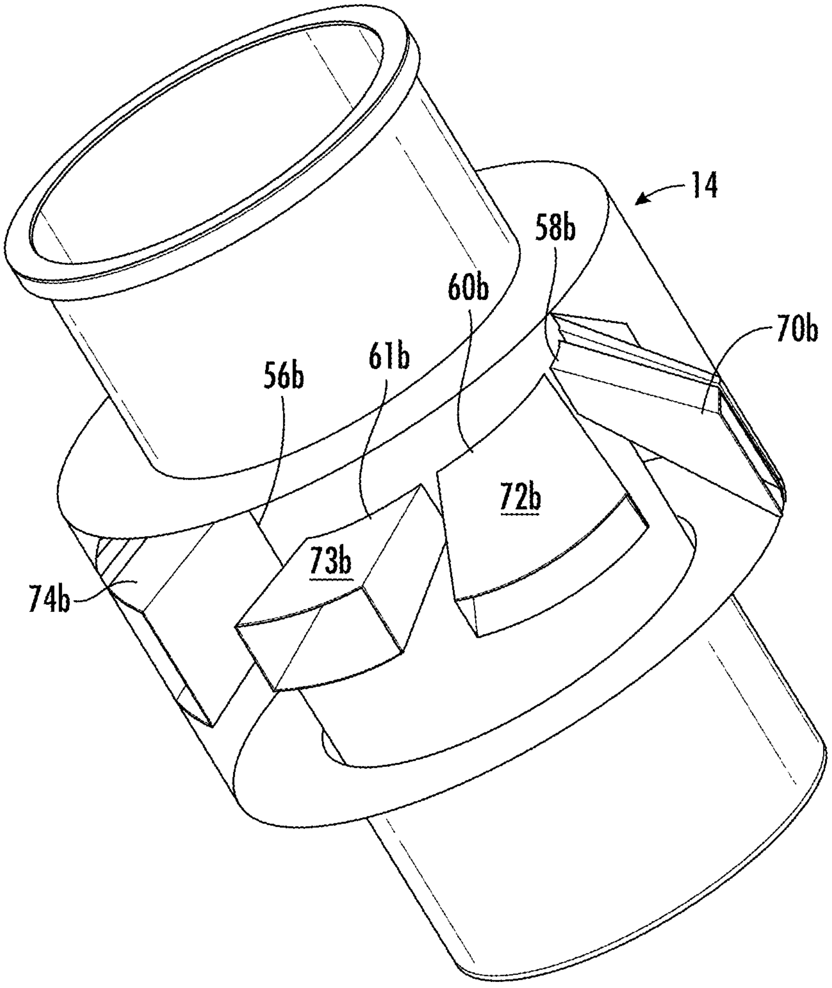
FIG. 13 is a perspective view of the inlet flow channels and exhaust flow channels leading into the cylinder shown in FIG. 12, according to an exemplary embodiment.

FIGS. 12 and 13 show respective first, second, and third inlet flow channels 70*b*, 72*b*, and 73*b* leading into cylinder 14 and exhaust flow channel 74b leading from cylinder 14. Exhaust flow channel 74b communicates exhaust gases expelled from cylinder 14 to exhaust manifold 16. As shown in FIGS. 11-13, the various pluralities of inlet and exhaust flow channels have various angles relative to central axis 80 and transverse axis 82. The angles form a flow or vortex through chamber 54 to enhance the influx of intake air and exhaust of exhaust gases during the scavenging event. Specifically, Applicant has found that by controlling a direction (e.g., angles) of inlet and exhaust flow channels, leading to the corresponding inlet and exhaust ports, such as described herein, this type of porting can enhance engine 10 efficiency.

Figure 14:
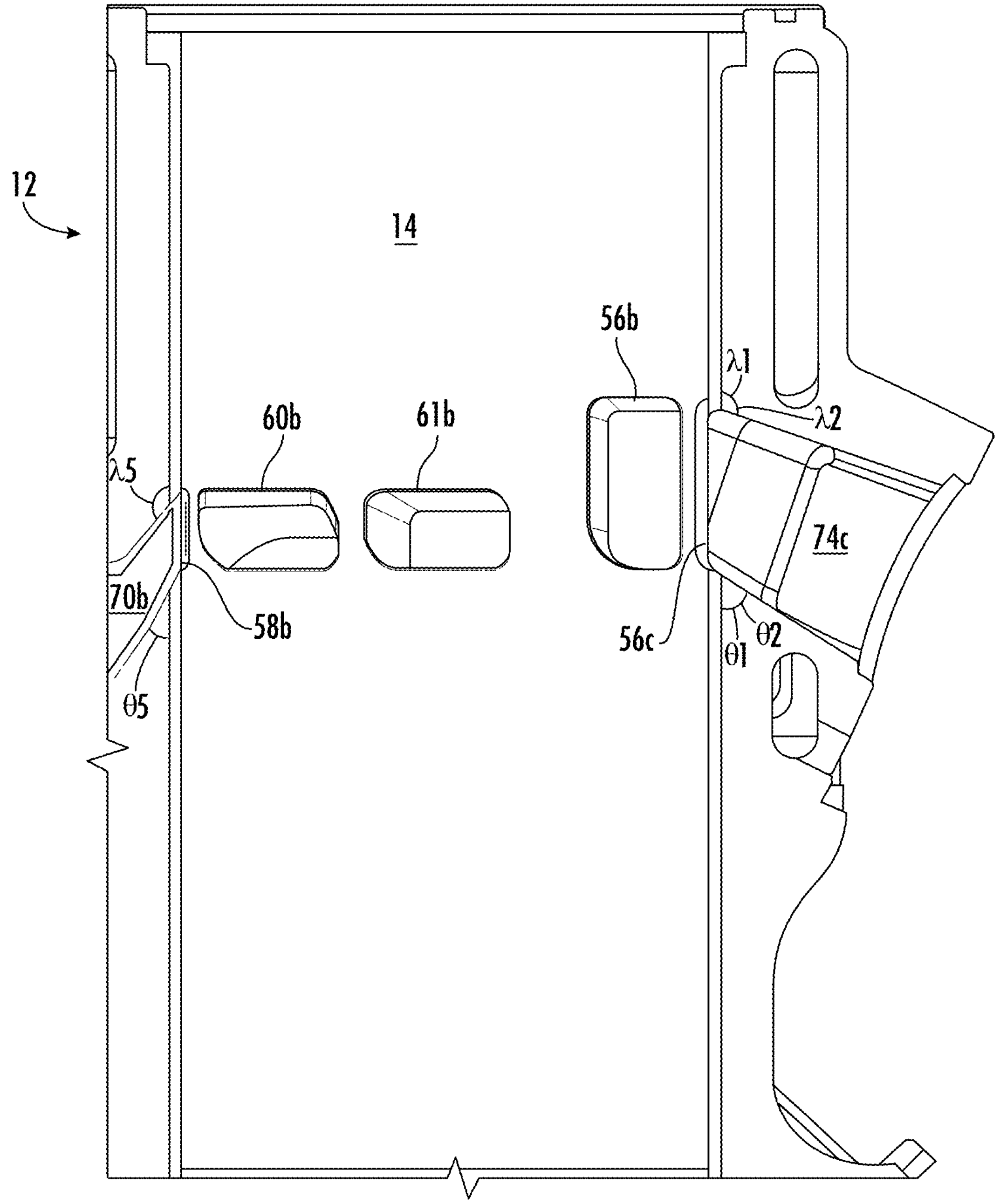
FIG. 14 is a cross-sectional view of the cylinder shown in FIG. 4, showing an exhaust flow channel leading to one of the exhaust ports and an inlet flow channel leading to one of the inlet ports, according to an exemplary embodiment.

FIG. 14 shows first inlet flow channel 70b leading into cylinder 14 and exhaust flow channel 74c leading from cylinder 14. Specifically, first inlet flow channel 70b leads to first inlet port 58b, and exhaust flow channel 74c leads to exhaust port 56c. First inlet flow channel 70b and exhaust flow channel 74c each form respective angles with a wall of cylinder 14 that is parallel to central axis 80 of cylinder 14. Specifically, FIG. 14 shows axial roof angles, indicated by a λ symbol, and axial floor angles, indicated by a θ symbol, for first inlet flow channel 70b and exhaust flow channel 74c.

As shown in FIG. 14, axial roof angle λ1 is defined between central axis 80 and the top of exhaust flow channel 74c. In specific embodiments, axial roof angle λ1 is between 20° and 30°, specifically, is between 22° and 28°, and more specifically, is 25° #1°. Upon full assembly, axial roof angles are also respectively defined between the central axis 80 and the top of exhaust flow channel 74a and the top of exhaust flow channel 74b, such respective axial roof angles having the same angular dimension (e.g., has the same angle) as axial roof angle λ1 in specific embodiments.

Axial floor angle θ1 is defined between central axis 80 and the bottom of exhaust flow channel 74c. In specific embodiments, axial floor angle θ1 is between 25° and 35°, specifically is between 27° and 33°, and more specifically, is 30°±1°. Upon full assembly, axial floor angles are also respectively defined between the central axis 80 and the bottom of exhaust flow channel 74a and the bottom of exhaust flow channel 74b, such respective axial floor angles having the same angular dimension (e.g., has the same angle) as axial floor angle θ1 in specific embodiments. In certain specific embodiments, exhaust flow channels 74a, 74b, and 74c respectively form axial floor angles with cylinder 14 that each respectively measure between 250 and 35.°

Figure 16:
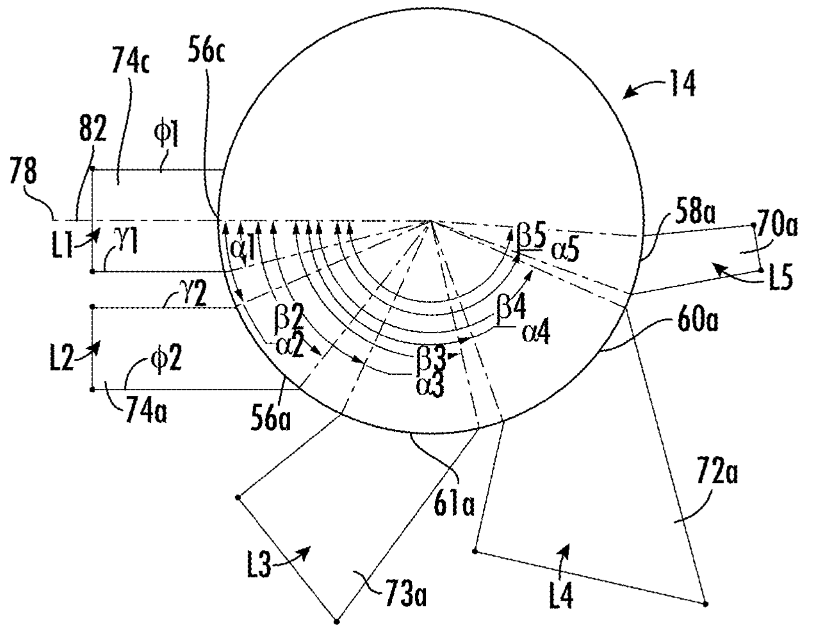
FIG. 16 is a schematic top view of the positional angles formed by various inlet flow channels and exhaust flow channels, according to an exemplary embodiment.
Figure 17:
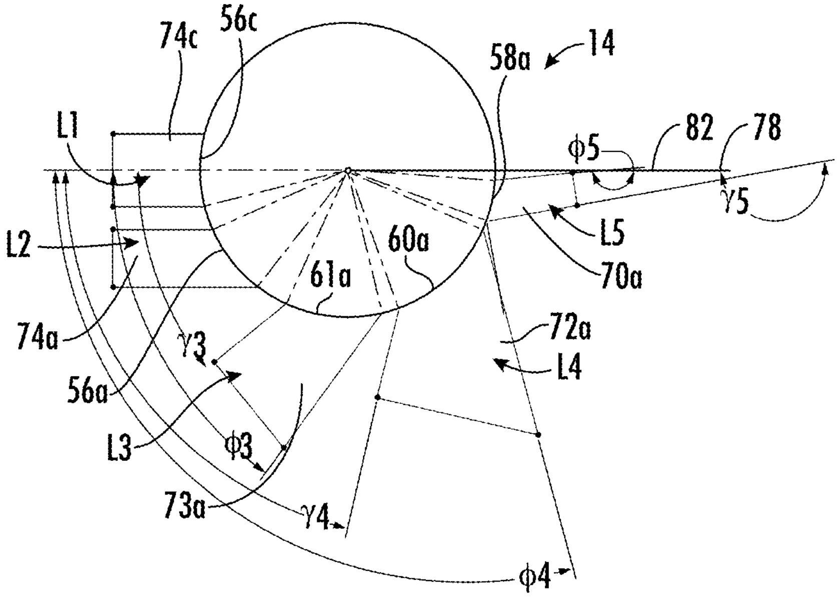
FIG. 17 is a schematic top view of the directional angles formed by various inlet flow channels and exhaust flow channels, according to an exemplary embodiment.

As shown in FIG. 14, first inlet flow channel 70a forms an axial roof angle 25 and axial floor angle θ5 at location 1 (L1) of cylinder 14 (as indicated in FIGS. 16-17). In various embodiments, axial roof angle λ5 is between 43° and 53°, specifically between 45° and 51°, and, more specifically, is 48°±1°. In various embodiments, axial floor angle θ5 is between 55° and 65°, specifically is between 57° and 63°, and, more specifically, is 60°±1°. In specific embodiments, first inlet flow channel 70a also forms axial roof angle 25 and axial floor angle θ5 with central axis 80, such that the axial orientation of first inlet flow channel 70a is the same as the axial orientation of second inlet flow channel 70b with respect to the central axis 80.

Figure 15:
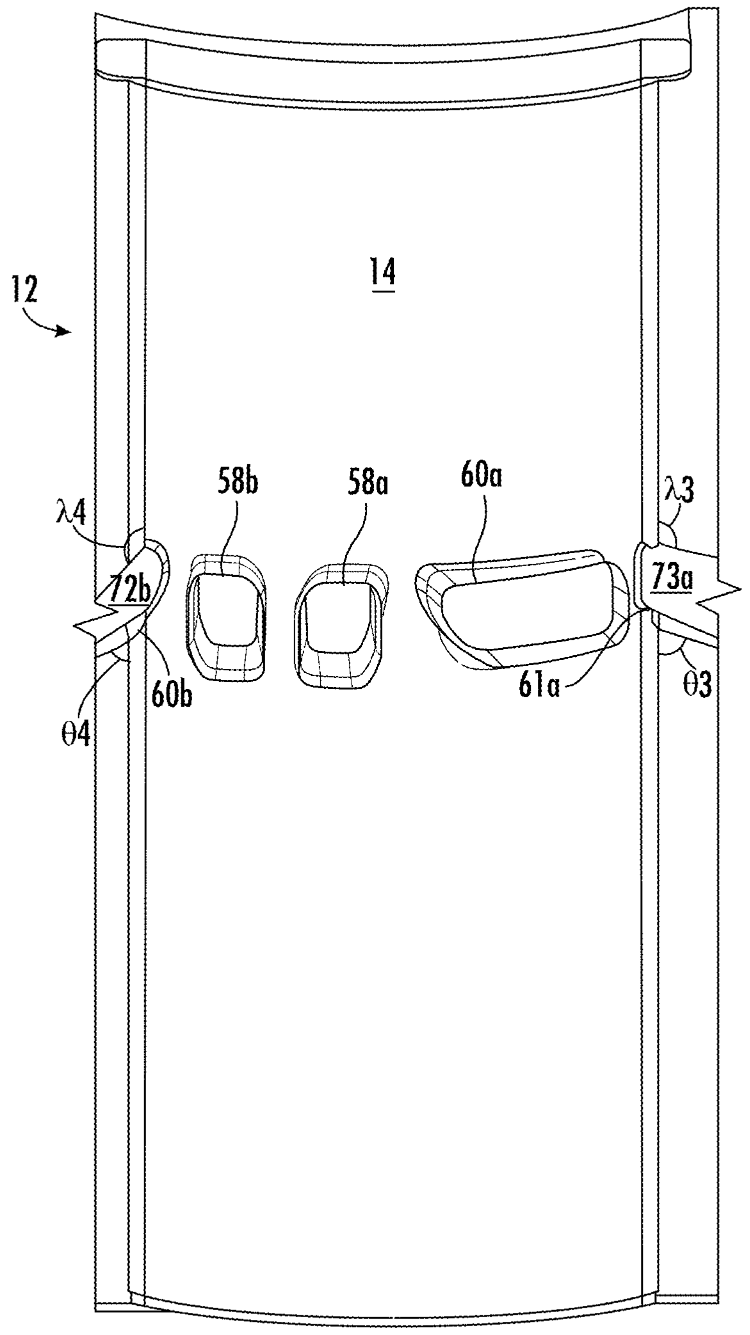
FIG. 15 is another cross-sectional view of the cylinder shown in FIG. 4, showing two inlet flow channels leading to two respective inlet ports, according to an exemplary embodiment.

Referring to FIG. 15, axial roof angles λ and axial floor angles θ are shown for second inlet flow channel 72b and third inlet flow channel 73a, respectively, relative to central axis 80. Axial roof angle 23 defines an angle between central axis 80 and the top of third inlet flow channel 73a. Axial roof angle 24 defines an angle between central axis 80 and the top of second inlet flow channel 72b. Similarly, axial floor angles θ3 and 04 define respective angles between central axis 80 and the bottom of third inlet flow channel 73a and second inlet flow channel 72b, respectively. In specific embodiments, third inlet flow channel 73b also forms axial roof angle 23 and the axial floor angle θ3 with the central axis 80, such that the axial orientation of third inlet flow channel 73b is the same as the axial orientation of third inlet flow channel 73a with respect to the central axis 80. In specific embodiments, second inlet flow channel 72a also forms axial roof angle 24 and the axial floor angle θ4 with the central axis 80, such that the axial orientation of second inlet flow channel 72a is the same as the axial orientation of second inlet flow channel 72b with respect to the central axis 80.

In various embodiments, axial roof angle 23 is between 5° and 15°, specifically is between 7° and 13°, and more specifically is 10°±1°. In various embodiments, axial roof angle 24 is between 30° and 40°, specifically is between 32° and 38°, and more specifically is 35°±1°. In various embodiments, axial floor angle θ3 is between 15° and 25°, specifically is between 17° and 23°, and more specifically is 20°±1°. In various embodiments, axial floor angle θ4 is between 26° and 36°, specifically is between 28° and 34°, and more specifically is 31°±10.

FIGS. 16-17 are schematics for locations L1, L2, L3, L4, and L5 of five respective inlet and exhaust flow channels and five corresponding inlet and exhaust flow ports. As shown in FIGS. 16-17, location L1 corresponds to exhaust flow channel 74c and exhaust port 56c, location L2 corresponds to exhaust flow channel 74a and exhaust port 56a, location L3 corresponds to third inlet flow channel 73a and third inlet port 61a, location L4 corresponds to second inlet flow channel 72a and second inlet port 60a; and location L5 corresponds to first inlet flow channel 70a and port or first inlet port 58a.

Note, only one side of the port assembly of cylinder 14 (including inlet and exhaust ports 56a, 58a, 60a, and 61a and inlet and exhaust flow channels 70a, 72a, 73a, and 74a) is shown and described here. The opposing side (including inlet and exhaust ports 56b, 58b, 60b and 61b and inlet and exhaust flow channels 70b, 72b, 73b, and 74b) is a symmetric reflection of the side shown here about central plane 78. As exhaust port 56c is bisected by central plane 78, both the side of cylinder 14 shown here and the said of cylinder 14 not shown here include a portion of exhaust port 56c and corresponding exhaust flow channel 74c.

FIGS. 16 and 17 show schematic top views of the angles formed between the horizontal and the respective radial leading and trailing edges of various inlet and exhaust ports and inlet and exhaust flow channels, according to an exemplary embodiment. FIGS. 16 and 17 define leading edge (LE) and trailing edge (TE) positional and directional angles relative to horizontal or transverse axis 82. Unless expressly stated otherwise, as described herein, angles measured from transverse axis 82 are measured from the side of cylinder 14 where transverse axis 82 bisects exhaust port 56c (as opposed to the side of cylinder 14 where transverse axis 82 passes between first inlet port 58a and second inlet port 58b).

FIG. 16 shows positional angles that are defined by the location of a leading or trailing edge of a respective inlet or exhaust port with respect to transverse axis 82. LE positional angles, indicated by an α symbol, are defined by the leading edge of a respective inlet or exhaust port, specifically the edge nearest the transverse axis 82. TE positional angles, indicated by a β symbol, are defined by the trailing edge of a respective inlet or exhaust port, specifically the edge farthest from the transverse axis 82. As exhaust port 56*c*, at location L1, is bisected by transverse axis 82, both edges of exhaust port 56*c* are equidistant from transverse axis 82, and as such, LE positional angle α1 is the same as TE positional angle β1.

For example, with respect to location L2, LE positional angle α2 is defined between the leading edge of exhaust port 56*a* and transverse axis 82, and positional angle β2 is defined between the trailing edge of exhaust port 56*a* and transverse axis 82. With respect to location L3, LE positional angle α3 is defined between the leading edge of third inlet port 61*a* and transverse axis 82, and positional angle β3 is defined between the trailing edge of third inlet port 61*a* and transverse axis 82. With respect to location L4, LE positional angle α4 is defined between the leading edge of second inlet port 60*a* and transverse axis 82, and positional angle β4 is defined between the trailing edge of second inlet port 60*a* and transverse axis 82. With respect to location L5, LE positional angle α5 is defined between the leading edge of first inlet port 58*a* and transverse axis 82, and positional angle β5 is defined between the trailing edge of first inlet port 58*a* and transverse axis 82.

In various embodiments, LE positional angle α1 is between 9° and 19°, specifically is between 11° and 17°, and more specifically is 14°±1°. LE positional angle α2 is between 19° and 29°, is specifically between 21° and 27°, and more specifically is 24°±1°. LE positional angle α3 is between 60° and 70°, specifically is between 62° and 68°, and more specifically is 65°±1°. LE positional angle α4 is between 105° and 115°, specifically is between 107° and 113°, and more specifically is 110°±1°. LE positional angle α5 is between 155° and 165°, specifically is between 157° and 163°, and more specifically is 160°±10.

In various embodiments, TE positional angle β1 is between −9° and −19°, specifically is between −11° and −17°, and more specifically is-14°±1°. TE positional angle β2 is between 47° and 57°, specifically is between 49° and 55°, and more specifically is 52°±1°. TE positional angle β3 is between 98° and 108°, specifically is between 100° and 106°, and more specifically is 103°±1°. TE positional angle β4 is between 151° and 161°, specifically is between 153° and 1590, and more specifically is 156°±1°. TE positional angle β5 is between 171° and 181°, specifically is between 173° and 1790, and more specifically is 176°±1°.

FIG. 17 shows directional angles that are defined by the location of a leading or trailing edge of a respective inlet or exhaust flow channel with respect to transverse axis 82. Directional angles define the location of a leading or trailing edge of a respective inlet or exhaust flow channel with respect to transverse axis 82. LE directions angles, indicated by an γ symbol, are defined by the leading edge of a respective inlet or exhaust flow channel, specifically the edge nearest the transverse axis 82. TE positional angles, indicated by a φ symbol, are defined by the trailing edge of a respective inlet or exhaust flow channel, specifically the edge farthest from the transverse axis 82. As exhaust flow channel 74*c*, at location L1, is bisected by transverse axis 82, both edges of exhaust flow channel 74*c* are equidistant from transverse axis 82, and as such, LE directional angle γ1 is the same as TE directional angle φ1.

In various embodiments, LE directional angles γ1 and γ2 are each between −5° and 5°, specifically are each between −3° and 3°, and more specifically are each 00±1°. In other words, in some embodiments, the leading edges of exhaust flow channels 74*a* and 74*c* are each parallel to transverse axis 82. In various embodiments, LE directional angle γ3 is between 34° and 44°, specifically is between 36° and 42°, and more specifically is 39°±1°. LE directional angle γ4 is between 72° and 82°, specifically is between 74° and 80°, and more specifically is 77°±1°. LE directional angle γ5 is between 185° and 195°, specifically is between 187° and 193°, and more specifically is 190°±1°.

In various embodiments, TE directional angles φ1 and φ2 are each between −5° and 5°, specifically are each between −3° and 3°, and more specifically are each 0°±1°. In other words, in some embodiments, the trailing edges of exhaust flow channels 74*a* and 74*c* are each parallel to transverse axis 82. In various embodiments, TE directional angle φ3 is between 49° and 59°, specifically is between 51° and 57°, and more specifically is 54°±1°. TE directional angle φ4 is between 100° and 110°, specifically is between 102° and 108°, and more specifically is 105°±1°. TE directional angle φ5 is between 180° and 190°, specifically is between 182° and 188°, and more specifically is 185°±10.

FIG. 18 is a table showing various ranges of dimensions for various angles described above at the five locations L1-L5 shown in FIGS. 14-17. As described above, the dimensions of the positional angles α and β, directional angles γ and φ, and axial roof and floor angles λ and θ generate air jet streams that create vector sums that result in efficient intake and exhaust of chamber 54 during a scavenging event. Thus, Applicant has found that the placement, orientation, and/or direction of the inlet and exhaust ports and the inlet and exhaust flow channels improves the efficiency of the 2-stroke diesel engine 10.

Figure 19:
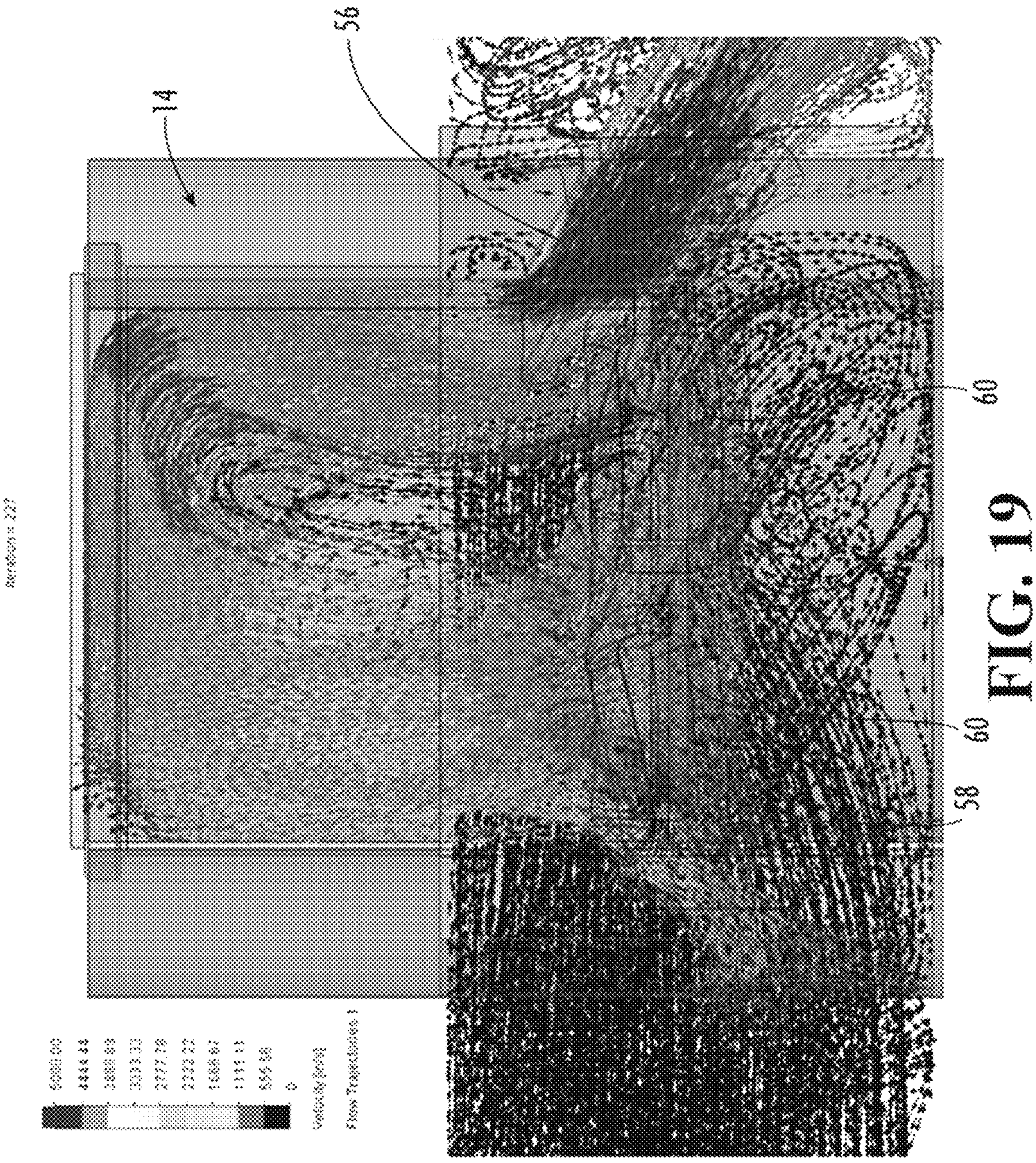
FIG. 19 is a model showing values of the velocity in inches/see of the flow trajectory of intake air passing through a plurality of inlet ports and of exhaust air passing through an exhaust port during the engine's combustion cycle, according to an exemplary embodiment.

FIG. 19 is a model of the velocities of the flow trajectory of intake air through the first, second, and third inlet ports 58*b*, 60*b*, and 61*b* and exhaust air through exhaust port 56*b* during the scavenging event of a combustion cycle. As indicated by the flow of exhaust air through exhaust port 56*b*, velocities reach a maximum in or near the exhaust ports. The combined effect of the vector sums is to create efficient exhaust ports 56*a*, 56*b*, 56*c* due to the high velocity that helps circulate the intake air infiltrating cylinder 14 through the pluralities of first, second, and third inlet ports 58, 60, 61. In particular, second and third inlet ports 60*a* and 61*a* vector sum with second and third inlet ports 60*b* and 61*b* to input air that enhances the circular flow and distribution of intake air entering at first inlet ports 58*a* and 58*b*. This combination of vectors through chamber 54 of cylinder 14 creates a convergence point 88 of maximum upward axial flow velocity at the cylinder head plane (See FIG. 20), where the air in chamber 54 begins a circular flow through cylinder 14. The circular flow pattern provides at least two purposes: (1) to increase the amount of fresh air that enters chamber 54 and (2) to increase the exhaust and waste products from the previous cycle that exits chamber 54. In the embodiments of FIGS. 14-17, the location, size, angles, and/or relative orientation of the plurality of first inlet ports 58, the plurality of second inlet ports 60, the plurality of third inlet ports 61, and the plurality of exhaust ports 56 improves the porting process to enhance venting and circulation of chamber 54, which enhances power and/or efficiency of piston 26 within chamber 54 and thus improves overall engine 10 performance.

FIG. F 19 shows scaled values of velocity in inches/sec of the flow trajectory. Intake air fed through the pluralities of first, second, and third inlet ports 58, 60, and 61 forms airstreams or jets, which create a vector sum of inlet air that circulates through chamber 54 and forces exhaust air to escape through the plurality of exhaust ports 56. A high-pressure region develops in the center of chamber 54 to force circulation of intake air around chamber 54 and force exhaust gases through the plurality of exhaust ports 56. FIG.

19 shows a velocity that approaches 5,000 inches/see at exhaust ports 56*b*. Similarly, FIG. 19 shows a velocity that approaches 4,444 inches/see at first inlet port 58*b* to form a jet stream on convergence point 88 (see FIGS. 20-21). The pluralities of second and third inlet ports 60, 61 contribute high-velocity jet streams to convergence point 88. In some embodiments, the flow in and through the pluralities of first, second and third inlet ports 58, 60, 61 is generally laminar or in a laminar-turbulent transition and the flow out and through the plurality of exhaust ports 56 is generally turbulent with Reynolds numbers exceeding 2,900.

Figure 20:
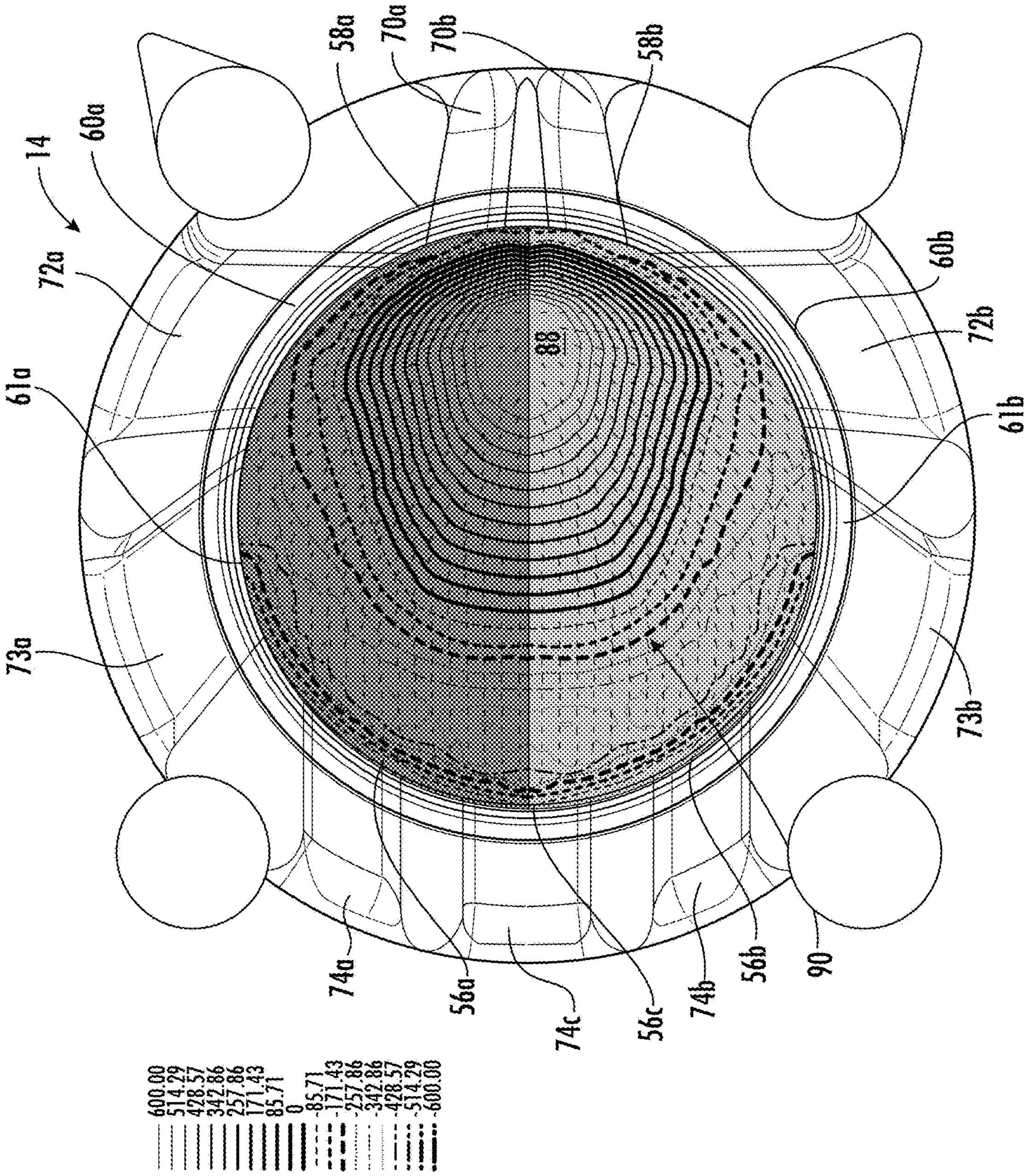
FIG. 20 shows the model represented in FIG. 19 from above, showing the normal velocity and pressure differentials of intake and exhaust air during the engine's combustion cycle, according to an exemplary embodiment.
Figure 21:
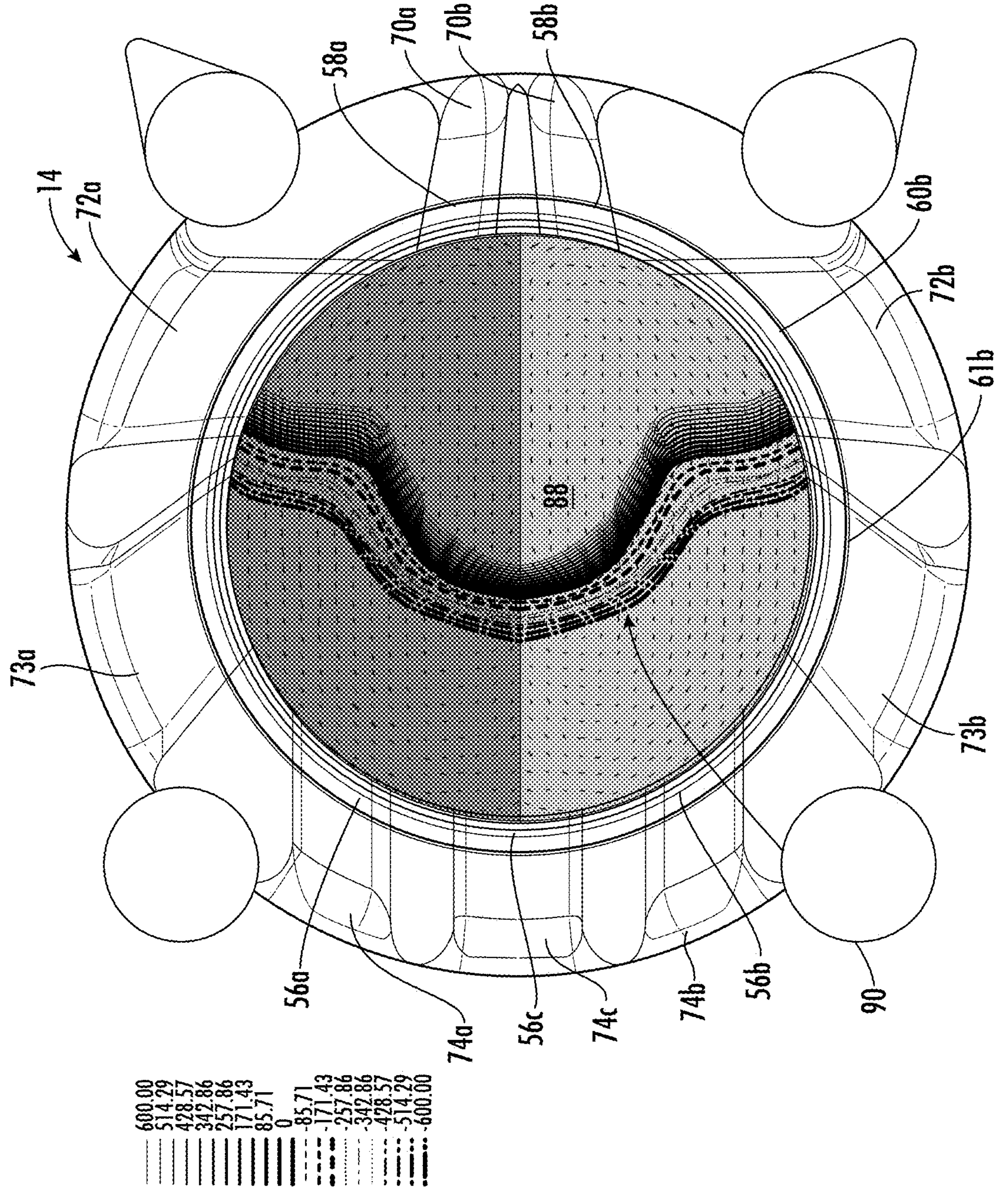
FIG. 21 is a model showing the wave propagation of air during the engine combustion cycle, according to an exemplary embodiment.

FIG. 20 is a top view of the model shown in FIG. 19 showing the normal velocity and pressure differentials at the cylinder head plane during the engine intake before combustion. The angles and directions of first inlet flow channels 70*a* and 70*b* force towards convergence point 88 to create a circular vector sum of the intake fresh air and force exhausted gases through exhaust ports 56*a*, 56*b*, 56*c*. FIG. 21 shows a cut plot of the upward axial flow velocity contours in a cut plane through the center of cylinder 14, illustrating a divide 90 in the velocity contours. In other words, FIG. 21 shows areas in chamber 54 that are flowing upwards out of the page (oriented to the right of divide 90) and areas in chamber 54 that are flowing downwards into the page (oriented to the left of divide 90). Divide 90 develops near and partially surrounds convergence point 88 on intake during the scavenging event of the combustion cycle and forces exhaust out of exhaust ports 56*a*, 56*b*, 56*c*.

Figure 22:
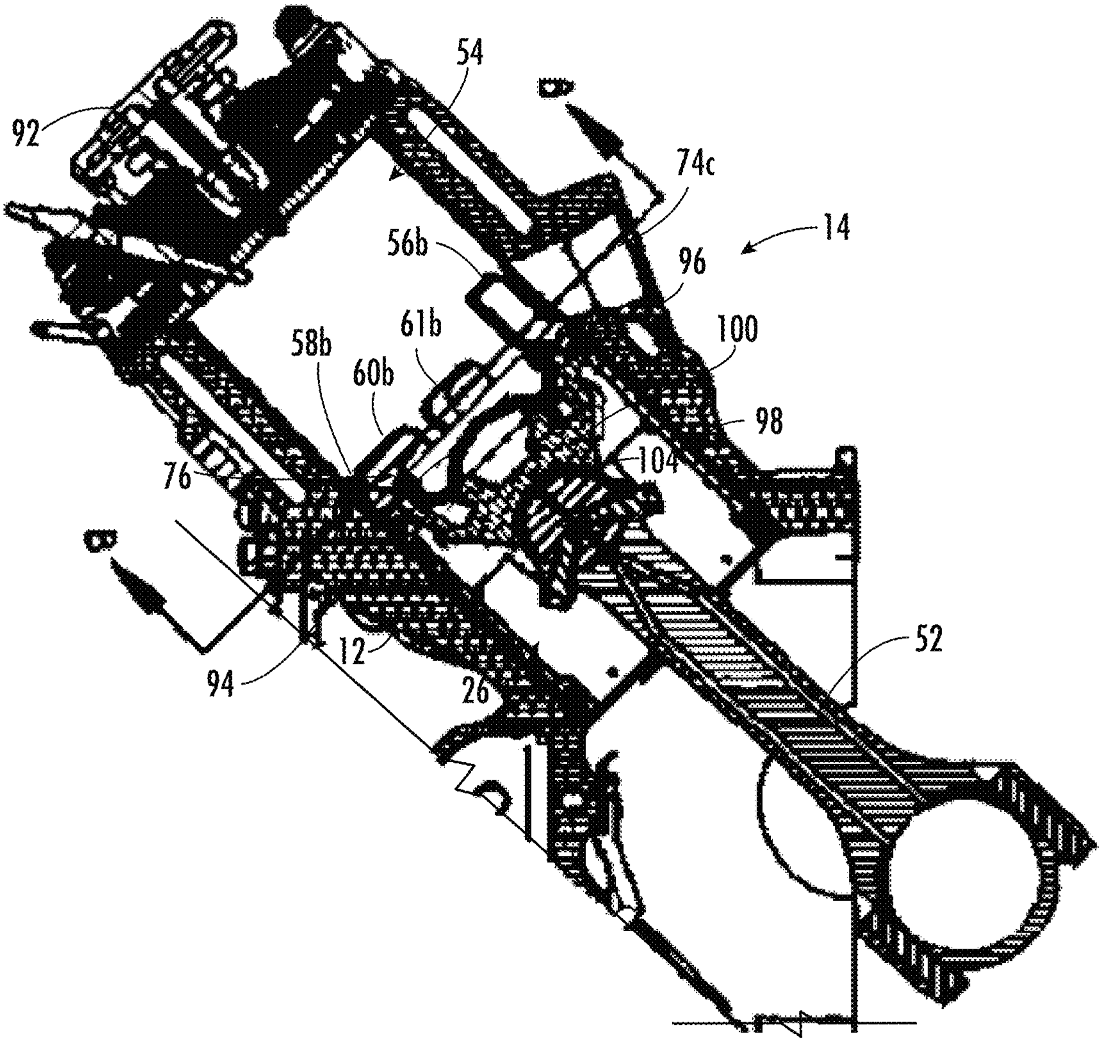
FIG. 22 is a cross-sectional view of a cylinder including a piston, according to an exemplary embodiment.

FIG. 22 is a cross-sectional view of cylinder 14 with a four-piece piston 26 positioned inside a chamber 54. FIG. 22 shows a fuel injector 92 and first inlet port 58*a*, second inlet port 60*b*, third inlet port 61*b*, and exhaust port 56*b*. Though not all inlet and exhaust ports of cylinder 14 are visible in the cross-sectional view shown here, cylinder 14 ultimately includes the plurality of exhaust ports 56 and the pluralities of first, second, and third inlet ports 58, 60, and 61 described above. The pluralities of first, second, and third inlet ports 58, 60, 61 cooperate to intake fuel and air respectively inside chamber 54.

At the start of a piston cycle, rod 52 forces piston 26 upwards into chamber 54 to compress the air within the chamber 54. Once the temperature and pressure reach a critical point, e.g., when piston 26 compresses the air to the top of chamber 54, the fuel ignites and forces piston 26 down. In a two-stroke engine, the air is drawn in and waste gases are exhausted with each cycle of piston 26. Each time piston 26 traverses through chamber 54, it adds fresh air and exhausts waste gases in a scavenging event. As discussed above, in specific embodiments, cylinder 14 is applied to an A-block, i.e. an inverted V-block, engine, such as engine 10 shown in FIGS. 1-2 and 53-54. In such A-block embodiments, the piston 26 and chamber 54 would likewise be generally vertically inverted from the image shown in FIG. 22, such that piston 26 is positioned at a lower end of rod 52 and configured to move in a generally downward direction when moving toward fuel injector 92 (e.g., see position of rod 52 and piston 26 in FIG. 2).

In specific embodiments, fuel is direct injected into the chamber 54 of cylinder 14 just before the piston 26 reaches top dead center (TDC), i.e. just before the piston reaches the highest point along its compression stroke. The temperature and pressure conditions within the chamber 54 at the time of direct injection causes the fuel to auto ignite (i.e. combust) rapidly. In other specific embodiments, air that is pre-mixed with fuel vapor is passed into a chamber through one or more inlet ports. In such embodiments, the piston compresses the combination of the air and fuel vapors within the chamber as the piston approaches TDC.

In specific embodiments, each time piston 26 travels down cylinder 14, the waste gases are exhaled or exhausted through the plurality of exhaust ports 56 and the chamber 54 receives new fresh air through the pluralities of first, second, and third inlet ports 58, 60, and 61. As such, the scavenging event is time-limited. Thus, a well-structured and rapid influx of fresh air and exhaust of waste gases/expended fuel increases the efficiency and performance of engine 10. Applicant has found that the selection of dimensions including orientation, angle, and/or size, of the pluralities of first, second, and third inlet ports 58, 60, and 61, and the plurality of exhaust ports 56 enriches the air intake into chamber 54 and increases (e.g., maximizes) the exhaust that exits chamber 54 during a scavenging event to enhance engine efficiency and performance.

FIG. 23-46 show various views of a four-piece piston 26. In specific embodiments, piston 26 couples to a rod and is configured to engage a crankshaft 28 of the engine (see FIG. 2). As shown in FIGS. 23-46, piston 26 has four parts or pieces that include a piston bowl 94, a piston ring retainer 96, a skirt 98, and a wrist-pin bearing 100. Piston ring retainer 96 provides a compressive force on the piston bowl 94 and/or skirt 98. The compressive force maintains the designed relationship of piston ring retainer 96, piston bowl 94, and/or skirt 98 during high temperatures, e.g. while operating engine 10. Wrist-pin bearing 100 extends transversely through a pin opening or pin bore 102 formed in skirt 98 and supports a gudgeon or wrist pin 104 such that wrist pin 104 is rotatable with respect to wrist-pin bearing 100. In specific embodiments, wrist pin 104 couples piston 26 to rod 52 and ultimately to crankshaft 28. In specific embodiments, the wrist-pin bearing 100 is integrally formed with the skirt 98.

In specific embodiments, piston bowl 94 is threaded and formed from a first material including a titanium material or alloy, piston ring retainer 96 is threaded and formed from a second material including a steel material, skirt 98 is formed from a third material including an aluminum material or alloy, and wrist-pin bearing 100 is formed from a fourth material including a bronze alloy material. In specific embodiments, piston ring retainer 96 provides a compressive force on skirt 98 and piston bowl 94. Skirt 98 couples to piston bowl 94 and extends axially through cylinder 14.

Figure 23:
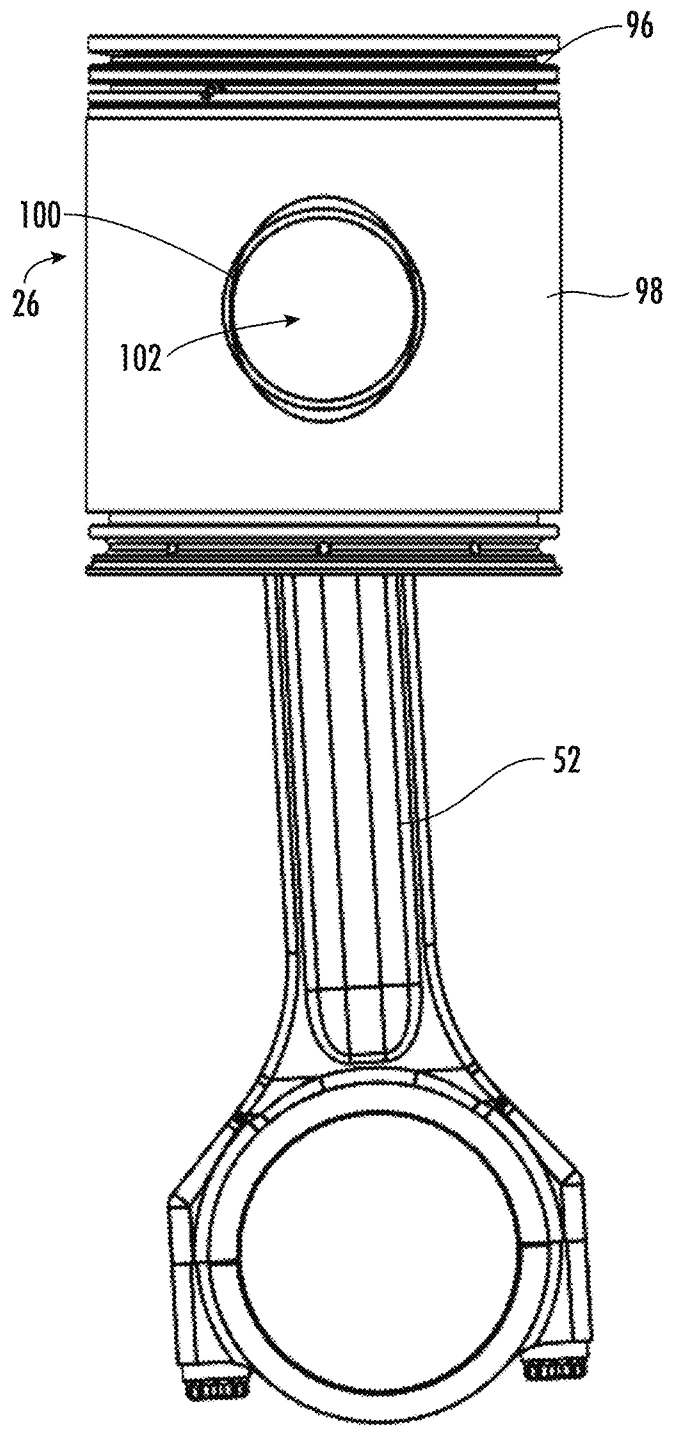
FIG. 23 is a side view of a rod positioned within a piston, according to an exemplary embodiment.
Figure 24:
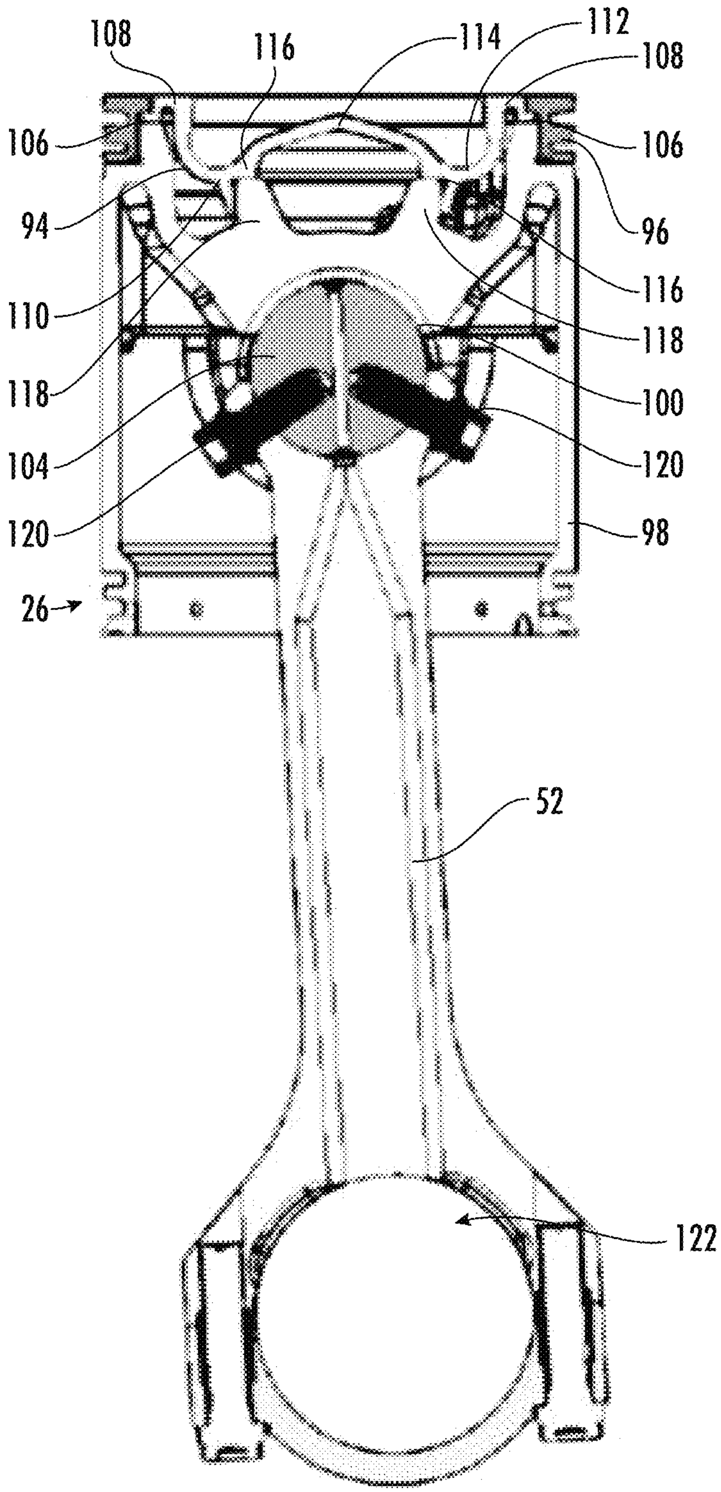
FIG. 24 is a cross-sectional view of the piston and rod shown in FIG. 23 with a wrist-pin coupling the rod to the piston, according to an exemplary embodiment.

FIG. 24 is a cross-sectional view of the four-piece piston shown in FIG. 23. Piston bowl 94 is compressed against skirt 98 by piston ring retainer 96. Rod 52 couples to wrist pin 104, through wrist-pin bearing 100, e.g., to form a fully floating piston 26. Piston bowl 94 has two lips or edges 106 that couple to piston ring retainer 96. Edges 106 form a perimeter of piston bowl 94 and have a top surface 108 that forms along the top of piston bowl 94 and the composite piston 26. Viewed from top surface 108, the junction of piston ring retainer 96 on edges 106 form top surface 108 on piston crown 76. Piston bowl 94 has a non-linear cross-sectional shape that forms a concave, circular combustion bowl 110 within edges 106. Combustion bowl 110 includes an undulating, depressed circular channel 112 that encircles a raised conical center 114. In specific embodiments, combustion bowl 110 and circular channel 112 are respectively depressed a greater distance than the convex or raised formation of conical center 114. The combustion bowl 110 and circular channel 112 enable fuel injectors 92 to fit inside and inject fuel into piston bowl 94, such that the forces generated during combustion distribute on circular channel 112 of piston 26.

A bottom of circular channel 112 includes a base 116. Base 116 is a structural step or formation that captures and/or couples to a protrusion 118 of skirt 98 to transfer the force to rod 52 through wrist pin 104. Bolts 120 secure rod 52 to wrist pin 104 and skirt 98 and transfer the force distributed on circular channel 112 of combustion bowl 110 onto rod cap 122 to rotate crankshaft 28 (shown in FIG. 2).

The non-linear piston bowl shape forms the depressed circular channel 112 and raised conical center 114 that creates a concave cavity or combustion bowl 110. During an engine firing event, combustion bowl 110 moves piston 26 through its mechanical stroke within chamber 54. Base 116 of combustion bowl 110 transfers the combustion energy onto protrusions 118 of skirt 98. In this way, Applicant has found that combustion bowl 110 enhances the combustion event of engine 10 and improves the reliability and efficiency of engine 10 by focusing the compression and combustion pressures in cylinder 14 onto a focal point of piston 26 (e.g., near the center point or conical center 114). The pressure at conical center 114 is more evenly distributed to circular channel 112 to enhance the distribution of forces on piston bowl 94 during the expansion of piston 26 within cylinder 14. Applicant has found that this configuration improves reliability and enhances efficiency.

Figure 25:
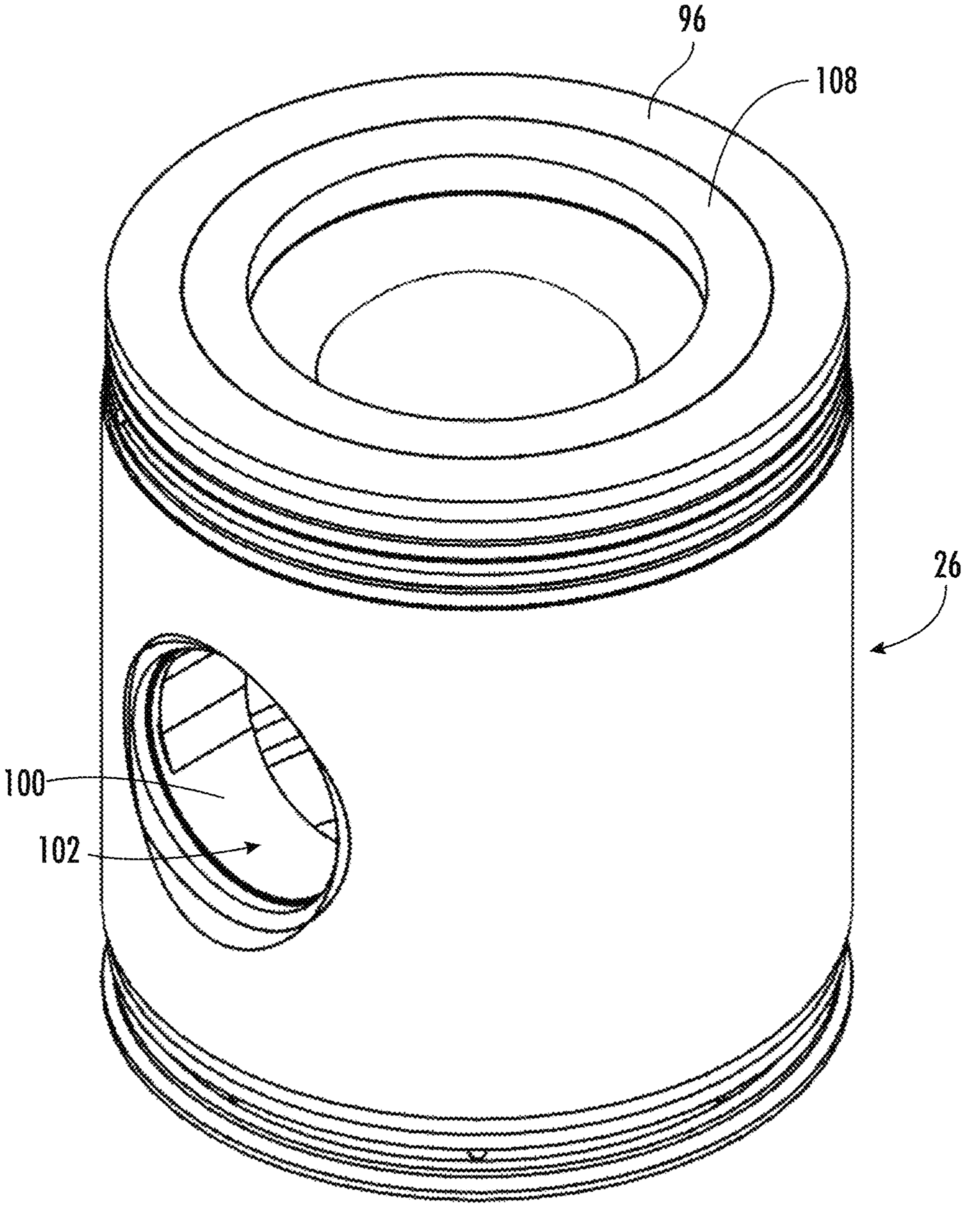
FIG. 25 is a perspective view of the piston shown in FIG. 23, according to an exemplary embodiment.
Figure 26:
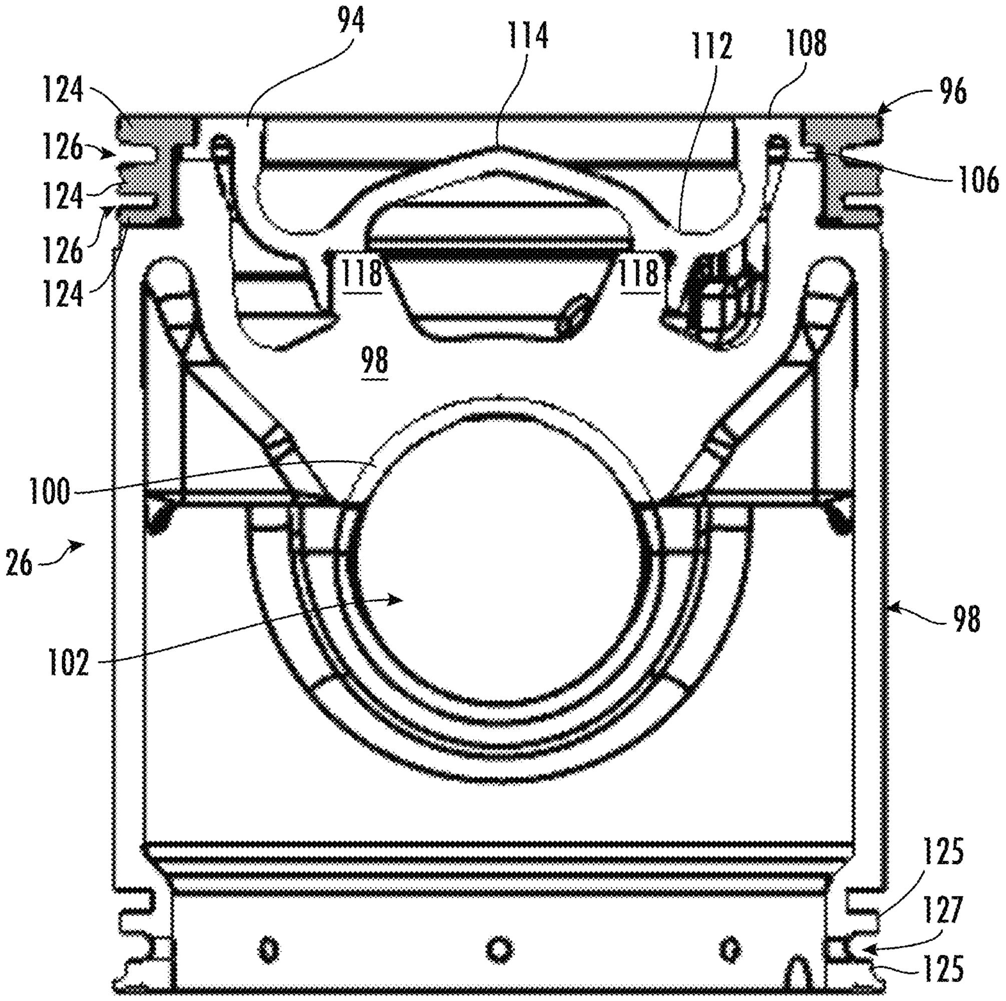
FIG. 26 is a cross-sectional view of the piston shown in FIG. 25, according to an exemplary embodiment.

FIG. 25-29 show various views of piston 26. In some embodiments, piston bowl 94 forms an inverted cone-shape or "w" shaped cross-section. FIGS. 25 and 26 show details of a "w" shaped undulating piston bowl 94. A cross-section of piston bowl 94 shows a symmetric undulating pattern with a maximum on top surface 108 nearest edges 106 and a minimum at the bottom of circular channels 112. A conical center 114 of piston bowl 94 is a local but recessed maxima, such that conical center 114 is less than the maximum that defines top surface 108 but greater than the minimum or bottom of circular channels 112.

In some embodiments, piston bowl 94 is threaded and surrounded by a piston ring retainer 96 that applies a compressive force to the threaded titanium piston bowl, e.g., to retain edges 106 of piston bowl 94 and form a concave cavity on the bowl. In some embodiments, threaded titanium piston bowl 94 has an inverted cone-shape. The conical center 114 forms a partially hollow top, concave cavity, or combustion bowl 110 on piston bowl 94 and has a convex bottom near conical center 114. In some embodiments, piston bowl 94 includes angled sides or edges 106 that couple with threads of a threaded piston ring retainer 96.

Figure 27:
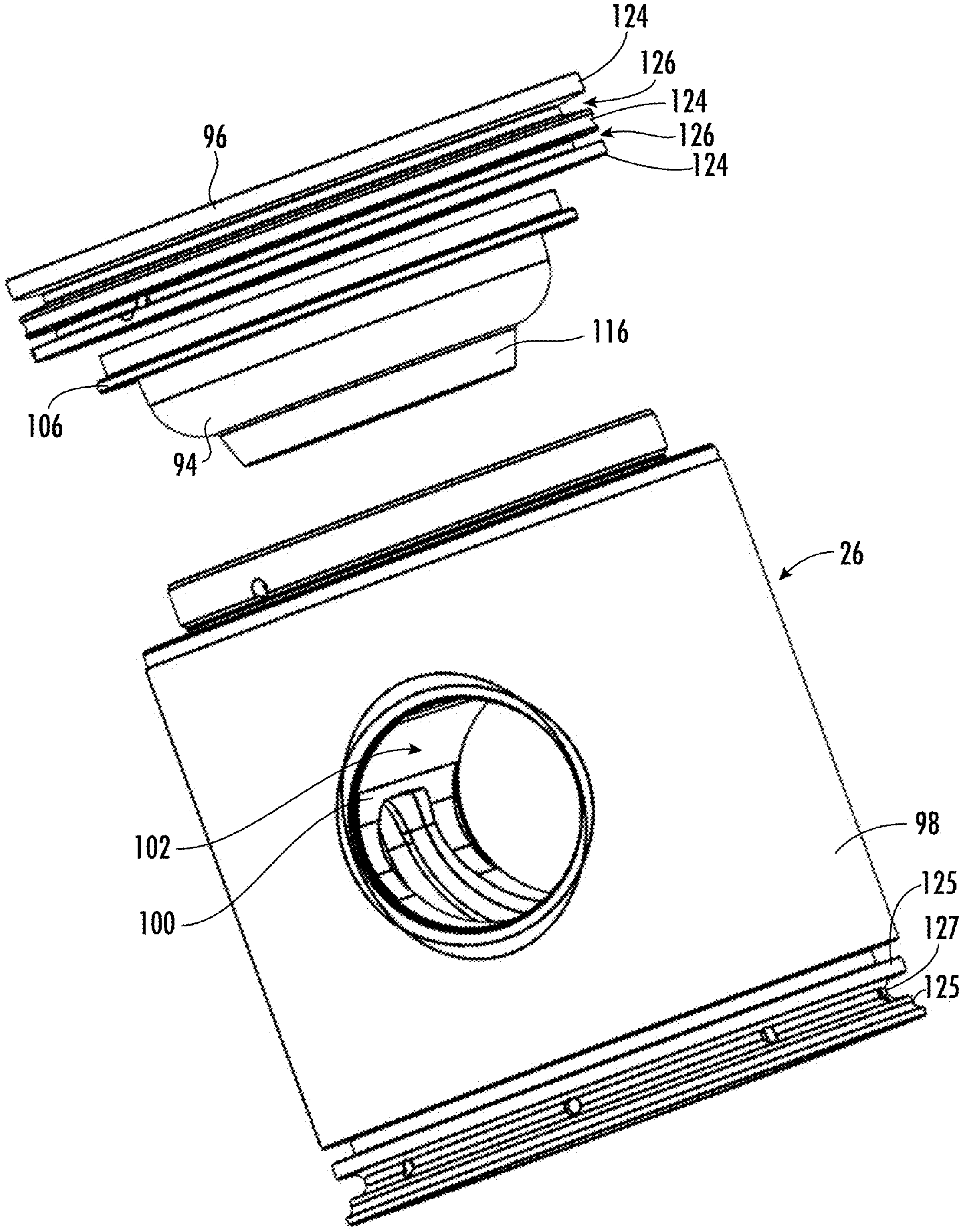
FIG. 27 is an exploded perspective view of the piston shown in FIG. 25.
Figure 28:
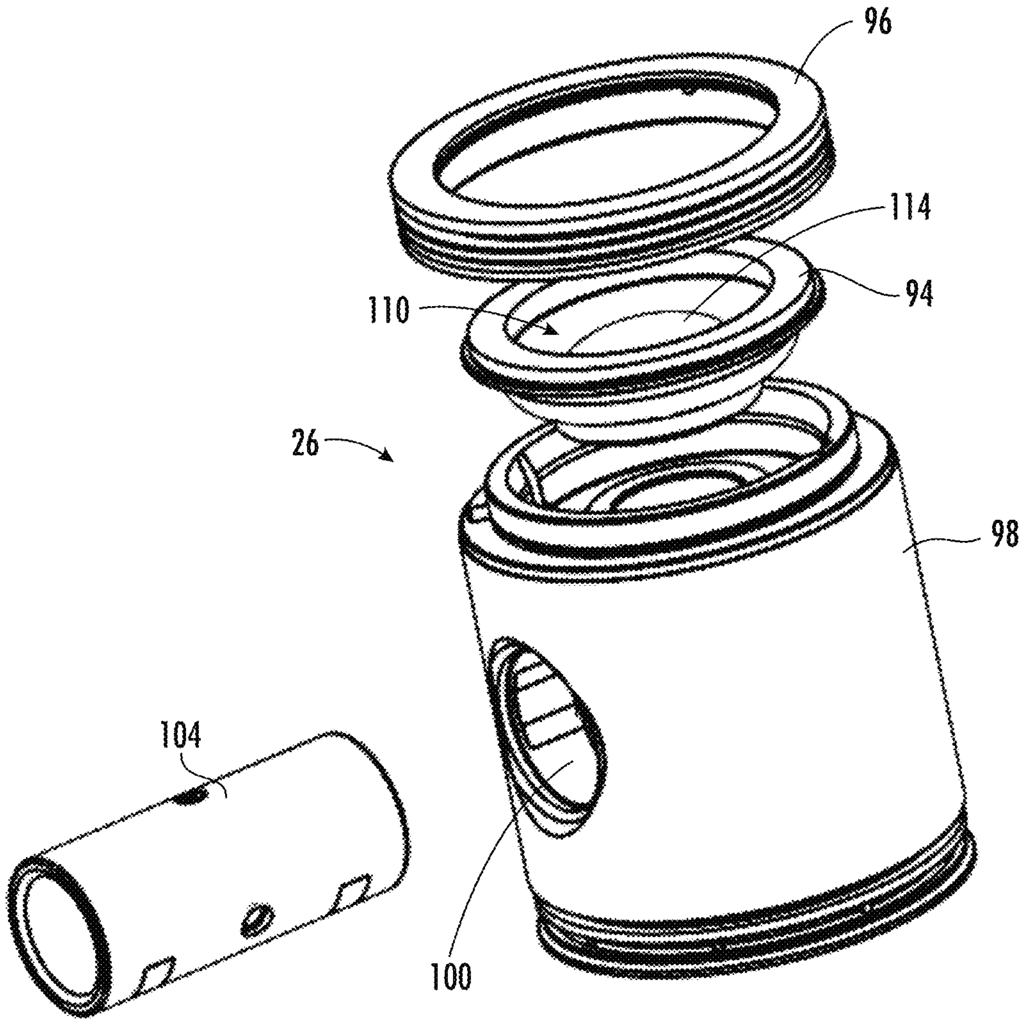
FIG. 28 is another exploded perspective view of the piston shown in FIG. 25 and a corresponding wrist pin.
Figure 29:
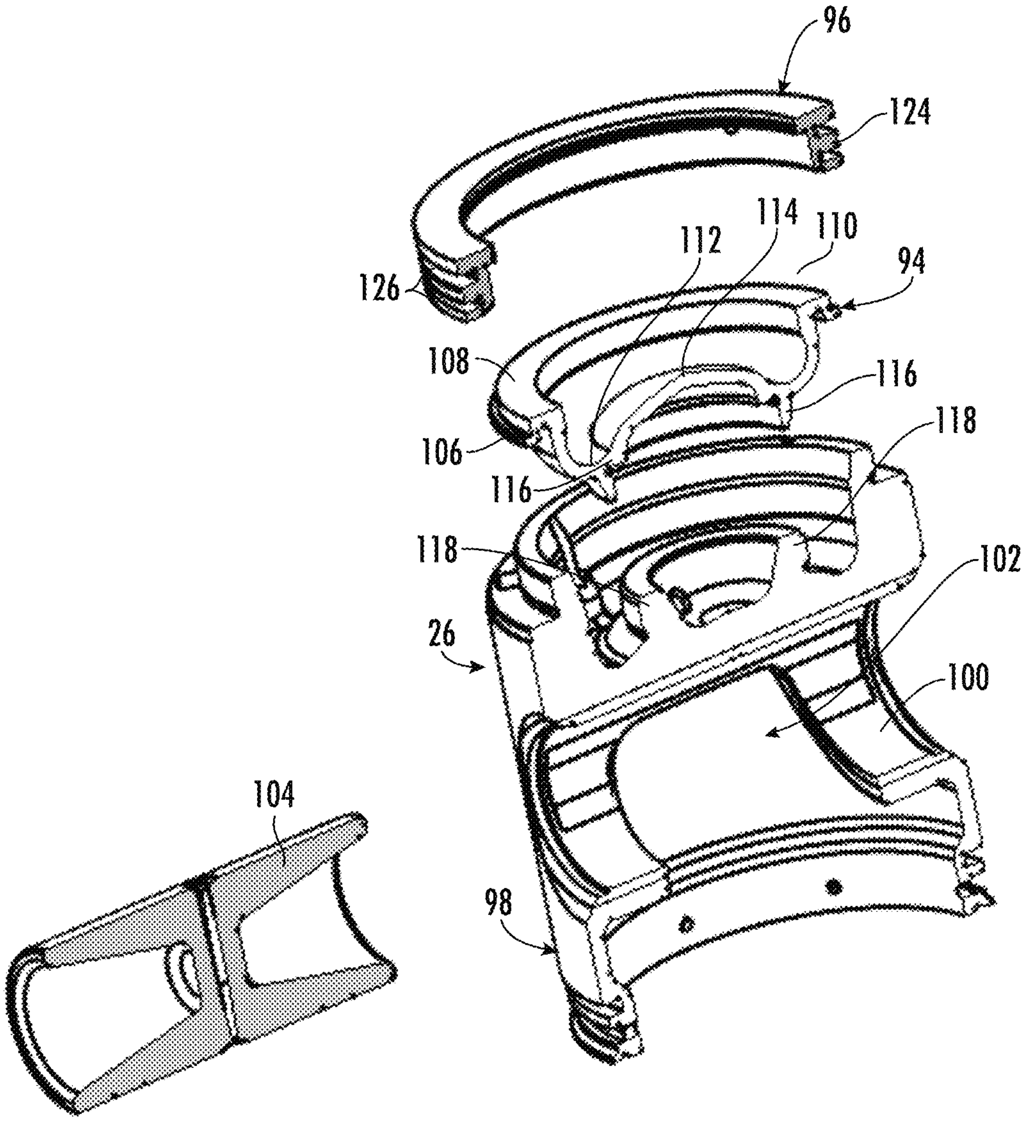
FIG. 29 is a cross-sectional view of the exploded piston and corresponding wrist pin shown in FIG. 28.
Figure 30:
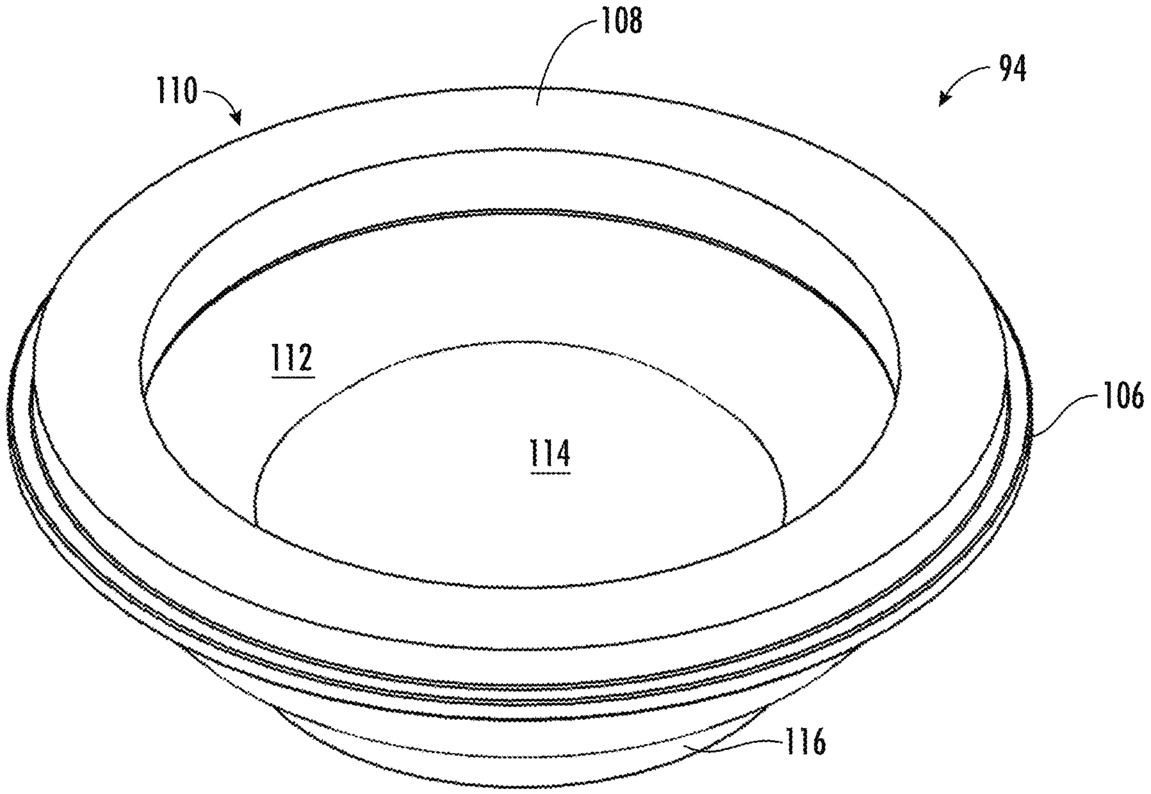
FIG. 30 is a perspective view of the piston bowl shown in FIG. 28, according to an exemplary embodiment.
Figure 31:
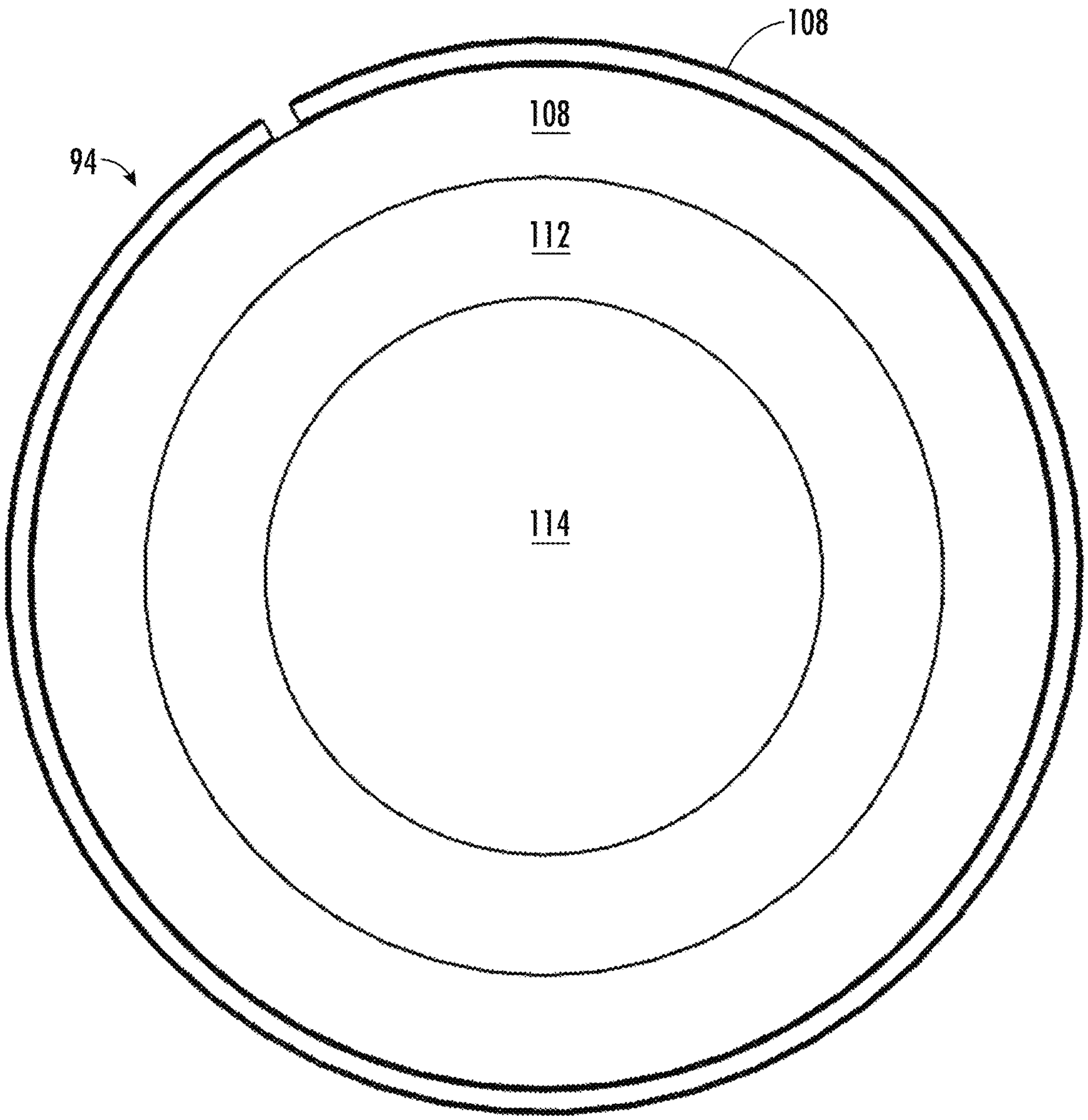
FIG. 31 is a top view of the piston bowl shown in FIG. 30, according to an exemplary embodiment.
Figure 32:
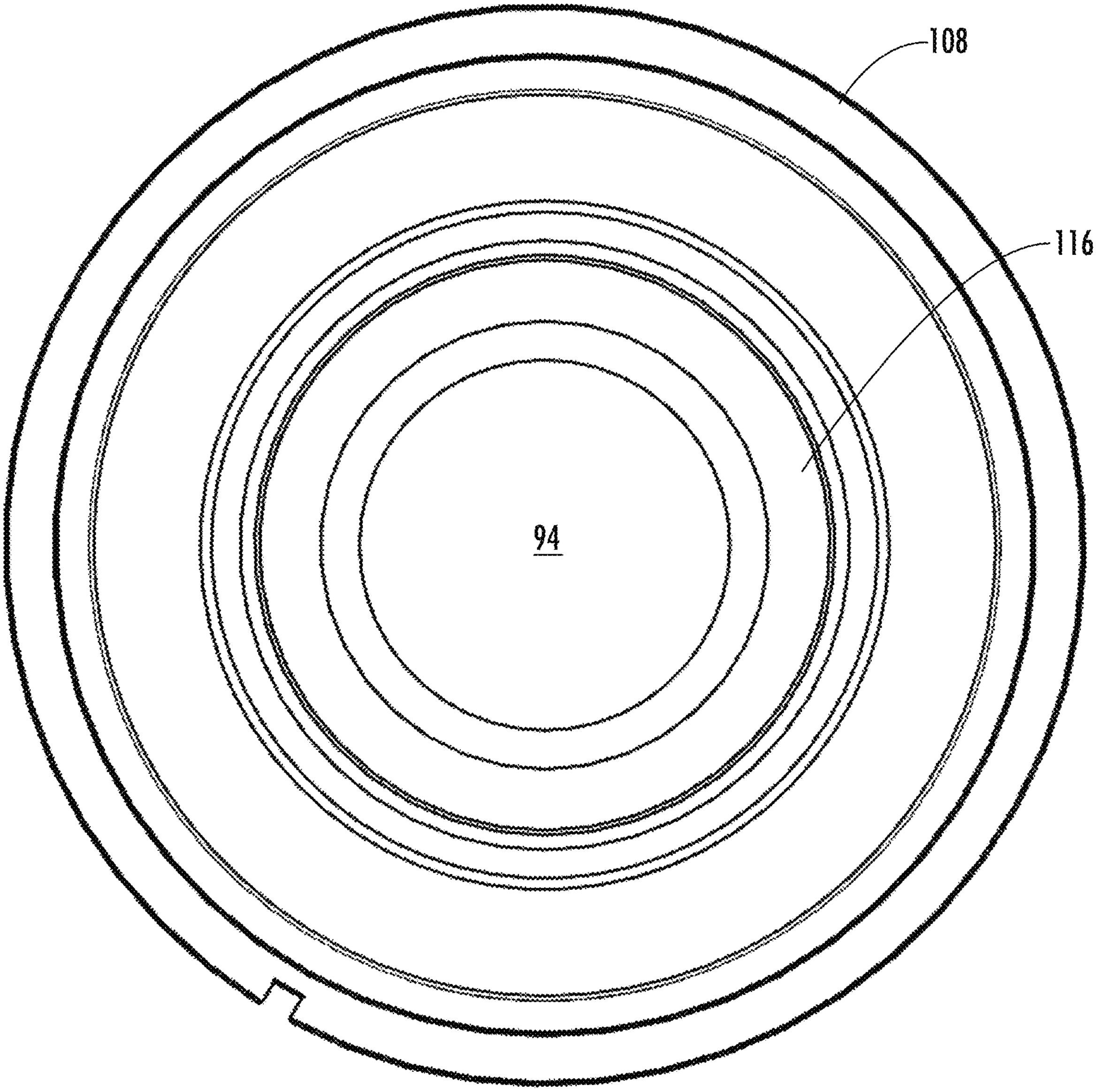
FIG. 32 is a bottom view of the piston bowl shown in FIG. 30, according to an exemplary embodiment.
Figure 33:
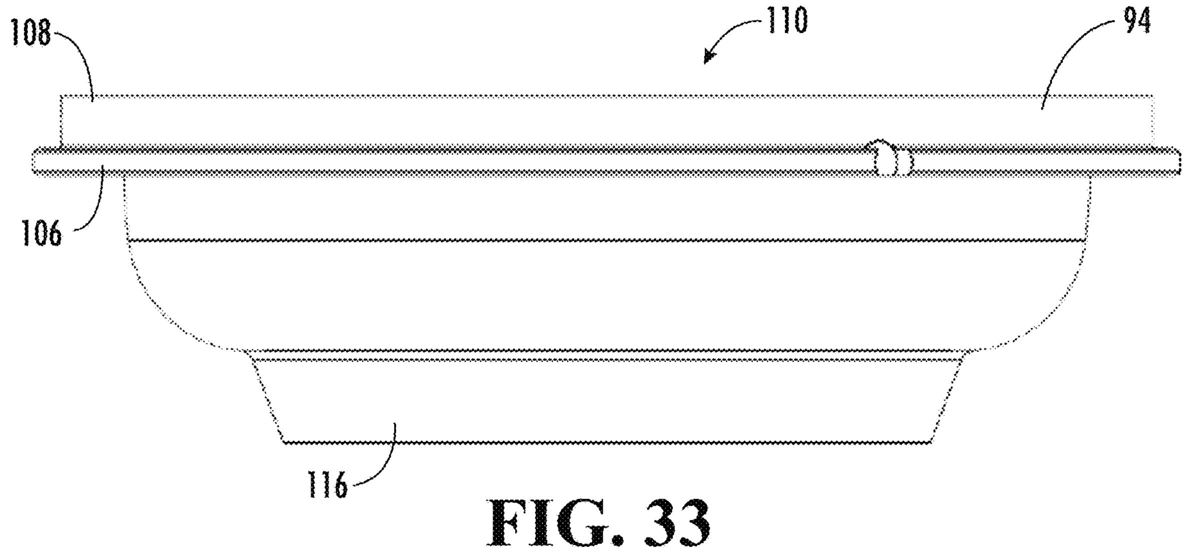
FIG. 33 is a side view of the piston bowl shown in FIG. 30, according to an exemplary embodiment.
Figure 34:
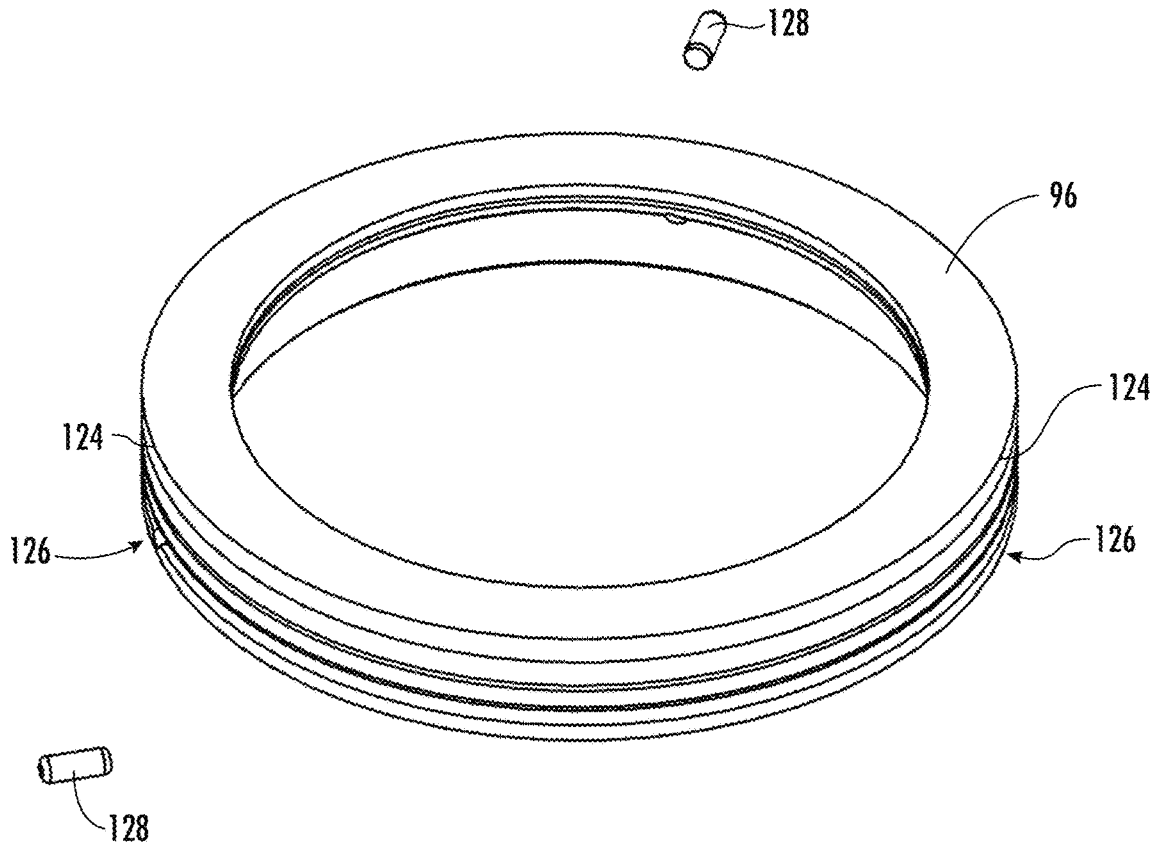
FIG. 34 is a perspective view of the piston ring retainer shown in FIG. 28 and a plurality of corresponding pins, according to an exemplary embodiment.
Figure 35:
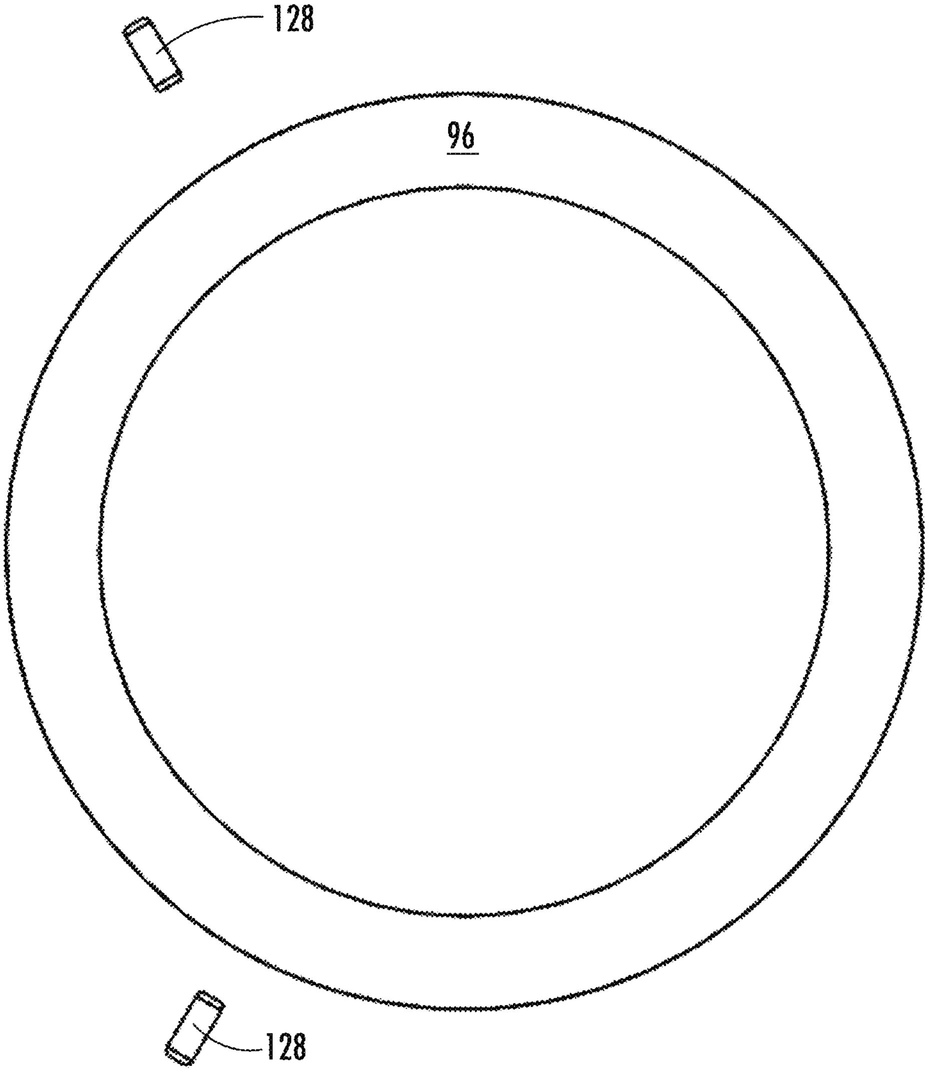
FIG. 35 is a top view of the piston ring retainer and corresponding pins shown in FIG. 34, according to an exemplary embodiment.
Figure 36:
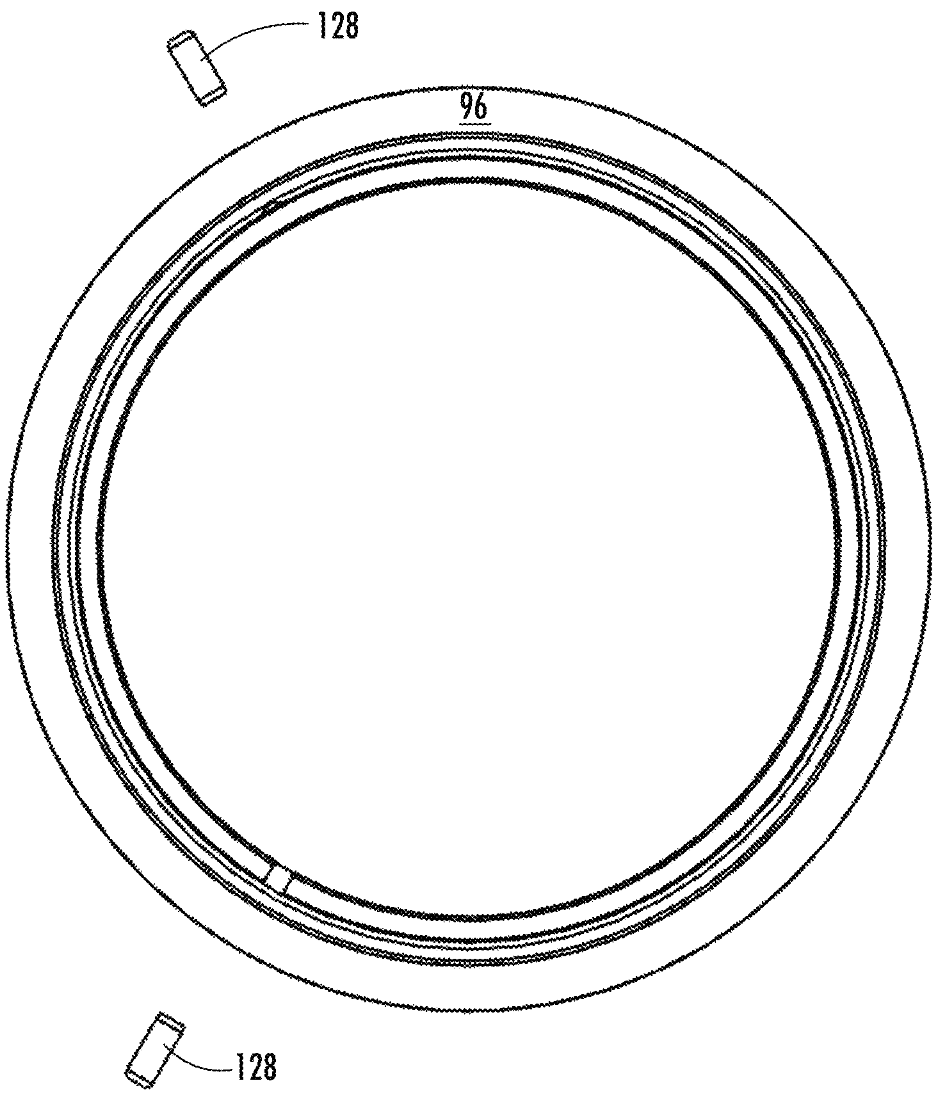
FIG. 36 is a bottom view of the piston ring retainer and corresponding pins shown in FIG. 34, according to an exemplary embodiment.
Figure 37:
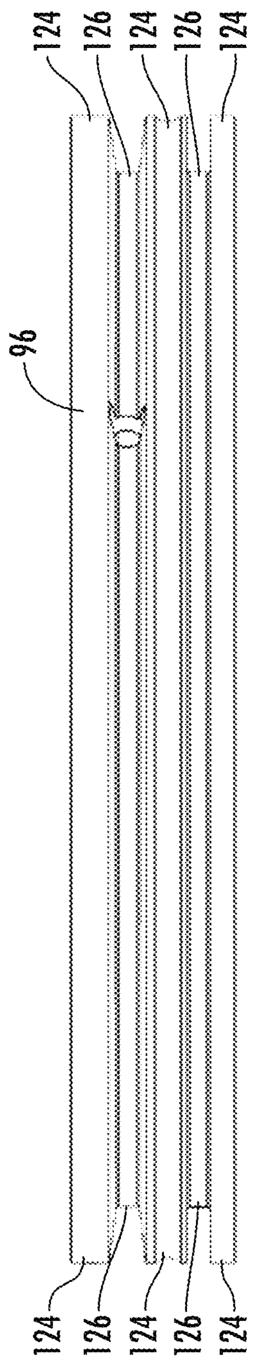
FIG. 37 is a side view of the piston ring retainer shown in FIG. 34, according to an exemplary embodiment.
Figure 38:
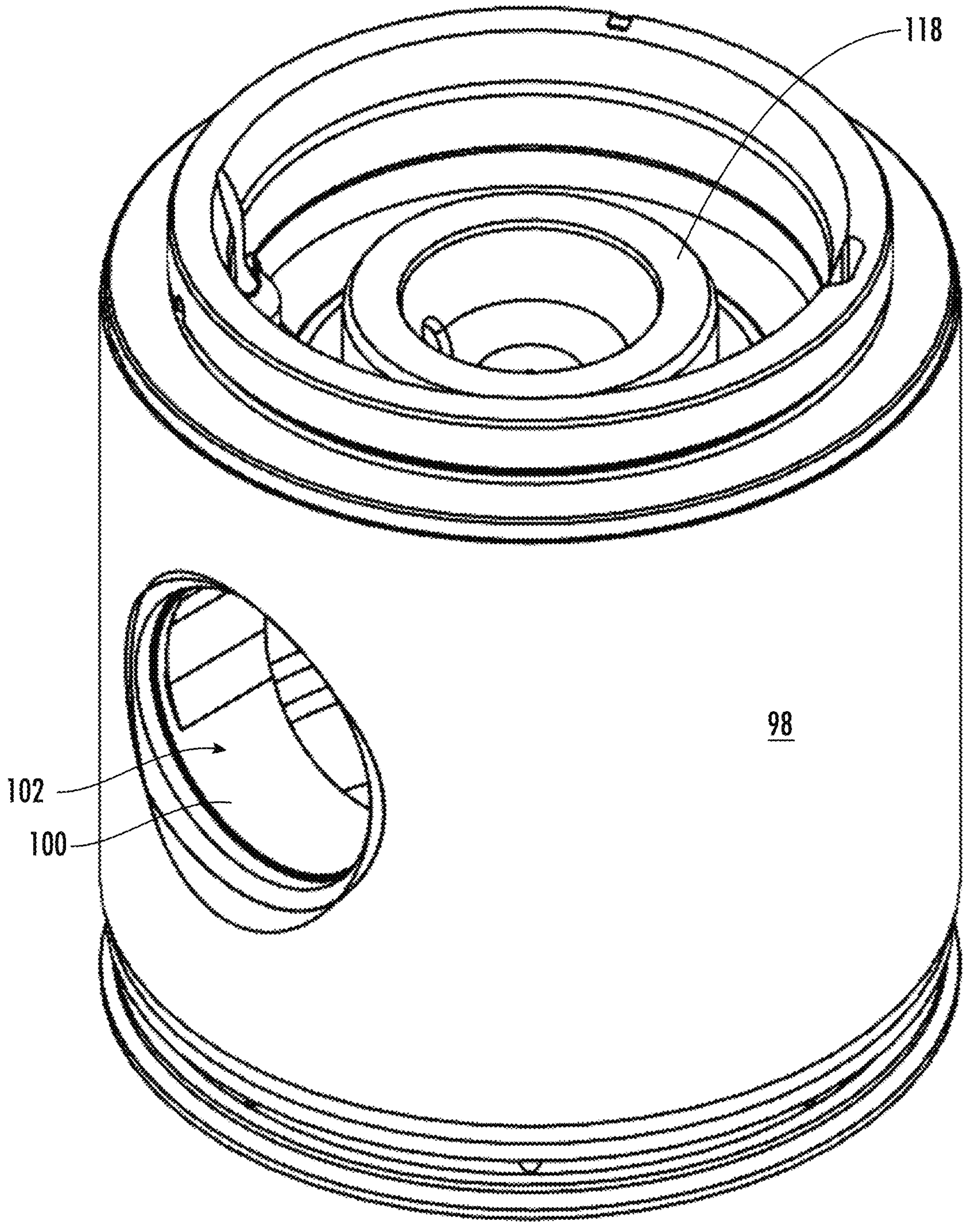
FIG. 38 is a perspective view of the skirt shown in FIG. 28, according to an exemplary embodiment.
Figure 39:
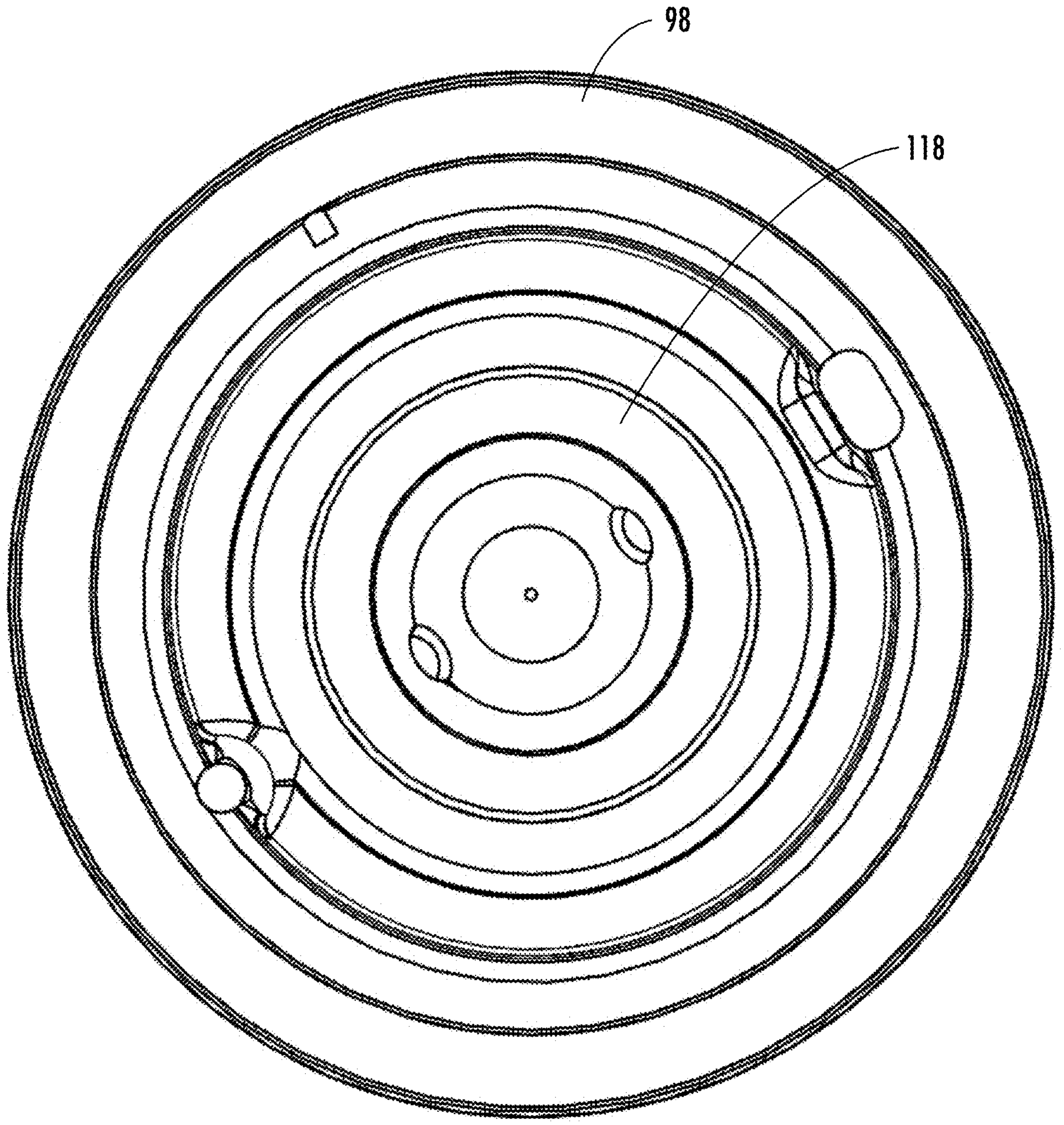
FIG. 39 is a top view of the skirt shown in FIG. 38, according to an exemplary embodiment.
Figure 40:
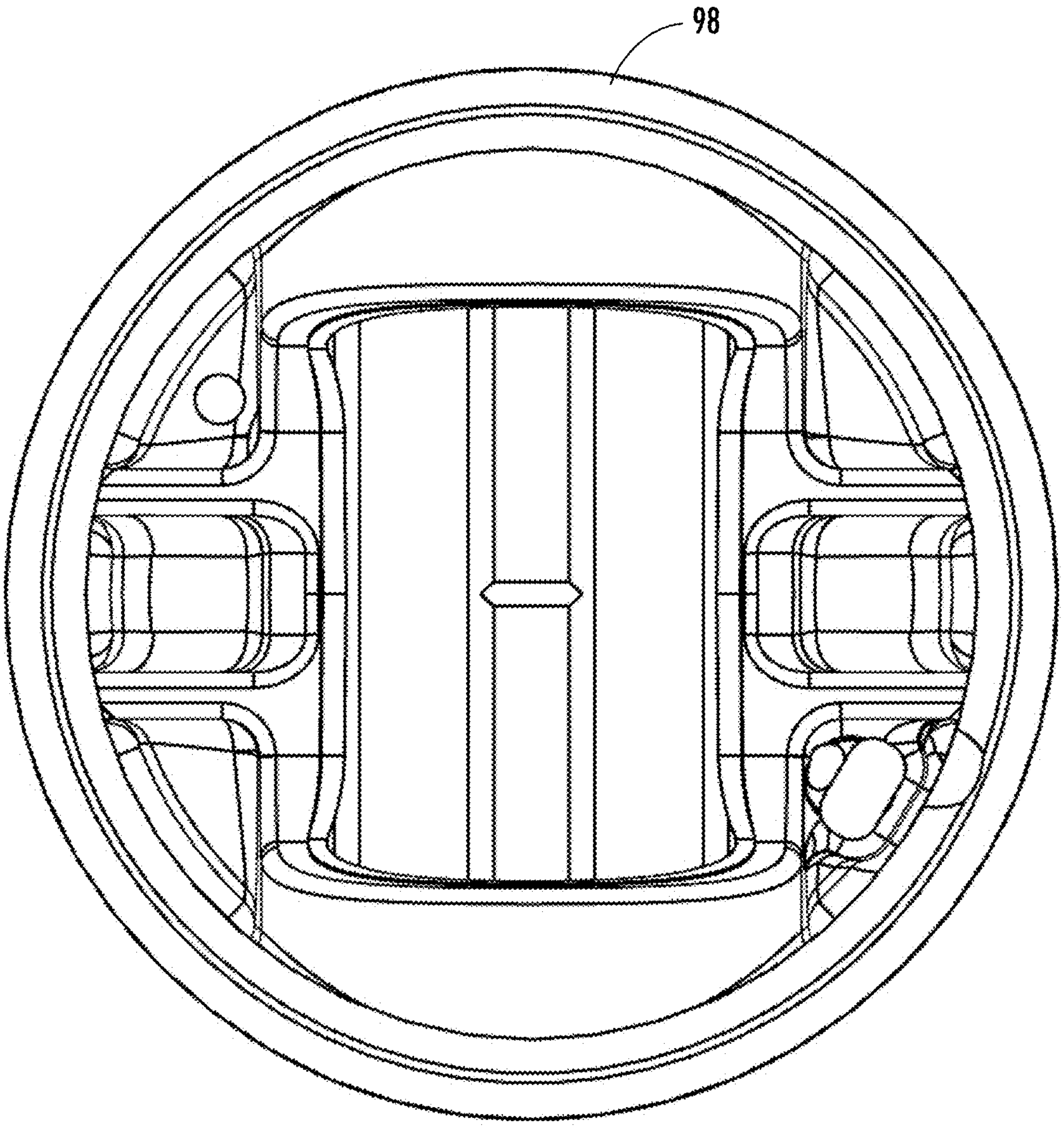
FIG. 40 is a bottom view of the skirt shown in FIG. 38, according to an exemplary embodiment.
Figure 41:
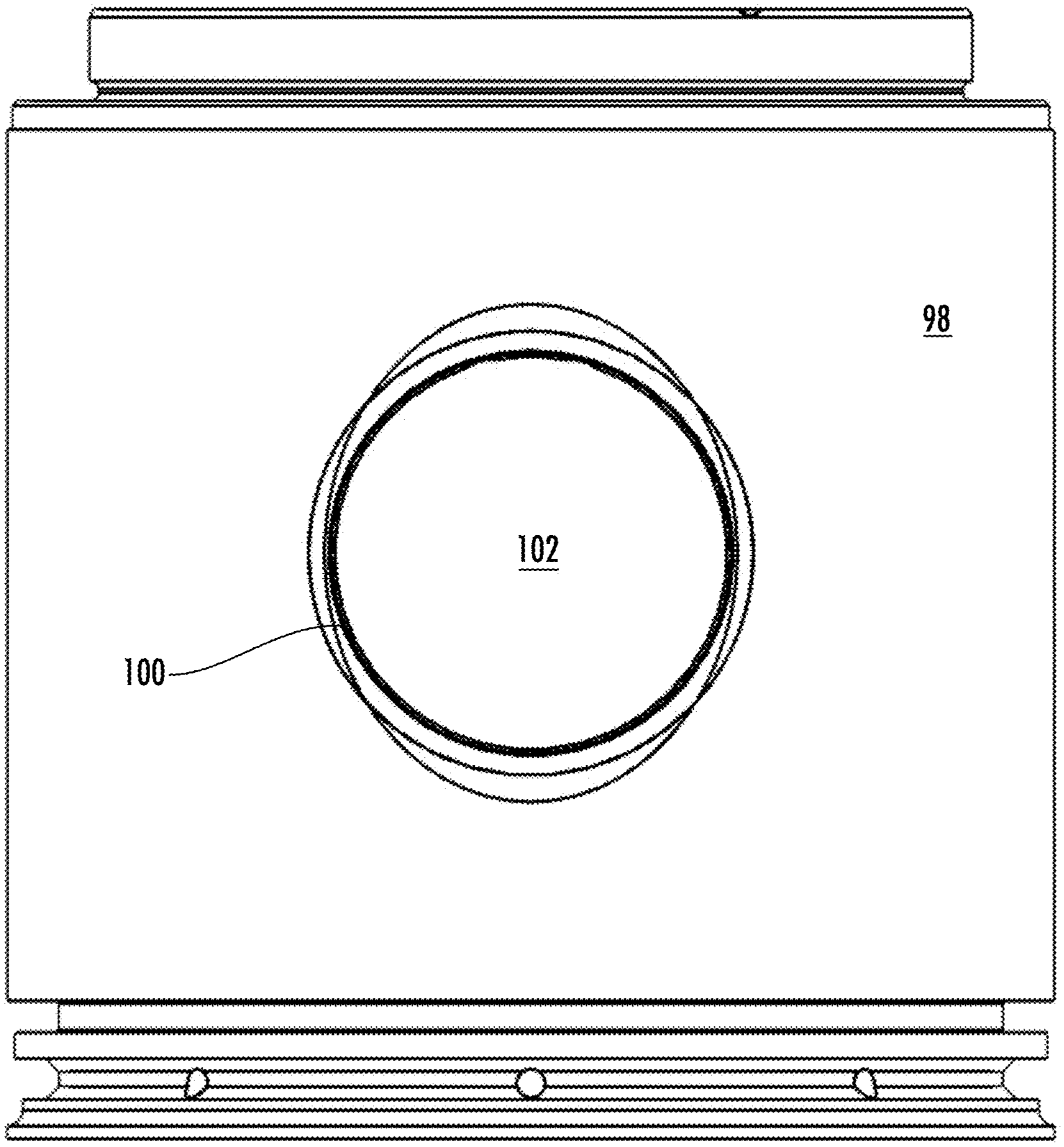
FIG. 41 is a front view of the skirt shown in FIG. 38, according to an exemplary embodiment.
Figure 42:
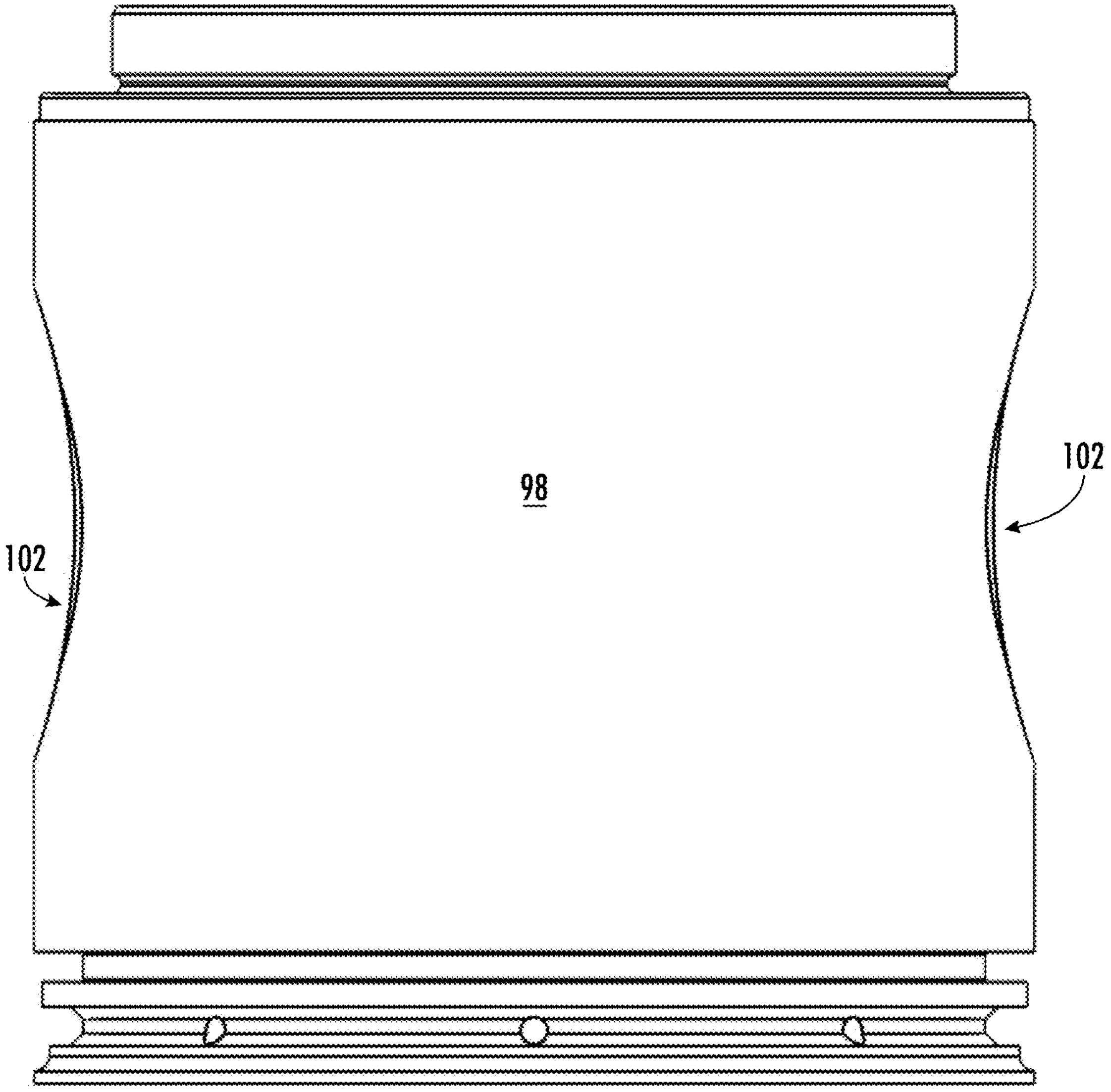
FIG. 42 is a side view of the skirt shown in FIG. 38, according to an exemplary embodiment.

Referring to FIG. 27, piston ring retainer 96 includes ring projections or ring lands 124 and ring grooves 126. Ring lands 124 and ring grooves 126 cooperate to seal piston 26 against cylinder 14 and conduct heat. Skirt 98 also includes ring projections 125 that define channel 127, which together work to circulate lubricant (e.g., oil) through piston 26. FIGS. 27-29 show greater detail as to how four-piece piston 26 is assembled. Piston ring retainer 96 couples to edges 106 of piston bowl 94. Protrusions 118 formed on skirt 98 couple to supports or base 116 on piston bowl 94. Pins 128 (FIGS. 34-35) pass through piston ring retainer 96, piston bowl 94, and/or skirt 98 to secure the four-piece piston 26 assembly. Finally, wrist-pin bearing 100 is compression fit within pin bore 102 of skirt and configured to reduce the friction between wrist pin 104 and piston 26.

FIGS. 30-33 show various views of piston bowl 94. As described above, piston bowl 94 has a concave cavity or combustion bowl 110 on top surface 108 formed by an undulating inner surface of piston bowl 94. Piston bowl 94 is "w" shaped with a maximum located on top surface 108 and a minimum located in circular channels 112 towards pin bore 102 when piston 26 is assembled. Piston bowl 94 has a local maximum at conical center 114 that is recessed (e.g., does not extend past the top plane formed by edges 106). Conical center 114 forms a local maximum but remains recessed from the maximum of top surface 108 such that conical center 114 is between edges 106 and the minimum.

The views shown in FIGS. 30-33 show the inverted conical shape of piston bowl 94. Base 116 on piston bowl 94 extends under edges 106 to fit within or under piston ring retainer 96. Base 116 is configured to be supported by protrusions 118 (see FIGS. 38-39) of skirt 98. Base 116 and protrusions 118 provide support at an operating temperature of engine 10 such that the thermal expansion of piston bowl 94 relative to skirt 98 and/or piston ring retainer 96 produces a piston 26 that seals cylinder 14 at an operating temperature of engine 10. In some embodiments, piston bowl 94 includes a titanium alloy, piston ring retainer 96 includes a steel alloy, skirt 98 includes an aluminum alloy, and wrist-pin bearing 100 includes a bronze alloy. The shape and design of the various alloys cooperate to control the overall or finished dimensions of piston 26 within cylinder 14. Similarly, lengthening or shortening base 116 and protrusions 118 changes the heat transfer characteristics of the design at-temperature and facilitates assembling a four-piece piston that properly seals and cooperates with cylinder 14 to produce a high-efficiency engine 10.

FIG. 34-37 show various views of piston ring retainer 96. Piston ring retainer 96 includes ring lands 124 and/or ring grooves 126. Ring lands 124 and ring grooves 126 are disposed about piston ring retainer 96 to form a heat dam. As described above, ring lands 124 form seals between piston ring retainer 96 and cylinder 14.

FIGS. 38-42 show various views of skirt 98. With reference to FIGS. 38-42, skirt 98 forms a body of piston 26 that interconnects or couples piston 26 to rod 52 and crankshaft 28. In some embodiments, skirt 98 is made from an aluminum material or alloy and held in place with threads that mesh with threads of piston ring retainer 96. Piston ring retainer 96 compresses skirt 98 and/or piston bowl 94 (in some embodiments made from a titanium alloy) to create a piston 26 that seals cylinder 14. As described above, protrusions 118 of skirt 98 couple to base 116 of piston bowl 94 during assembly of piston 26. Piston 26 extends axially through cylinder 14 and distributes the combustion forces on cylinder 14 through rod 52 and onto crankshaft 28 to rotate crankshaft 28 and power engine 10.

Figure 43:
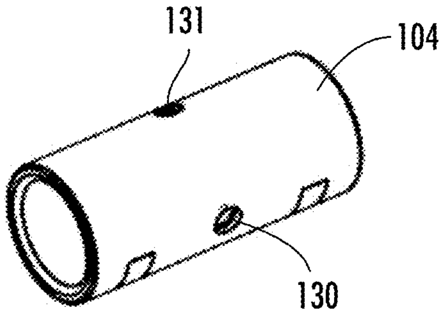
FIG. 43 is a perspective view of the wrist pin shown in FIG. 28, according to an exemplary embodiment.
Figure 44:
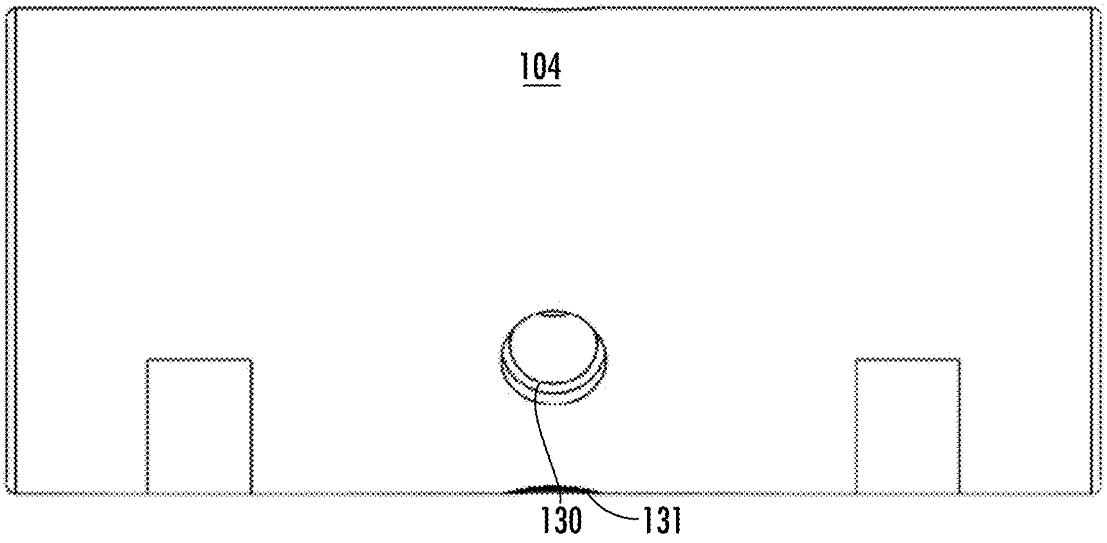
FIG. 44 is a side view of the wrist pin shown in FIG. 43, according to an exemplary embodiment.
Figure 45:
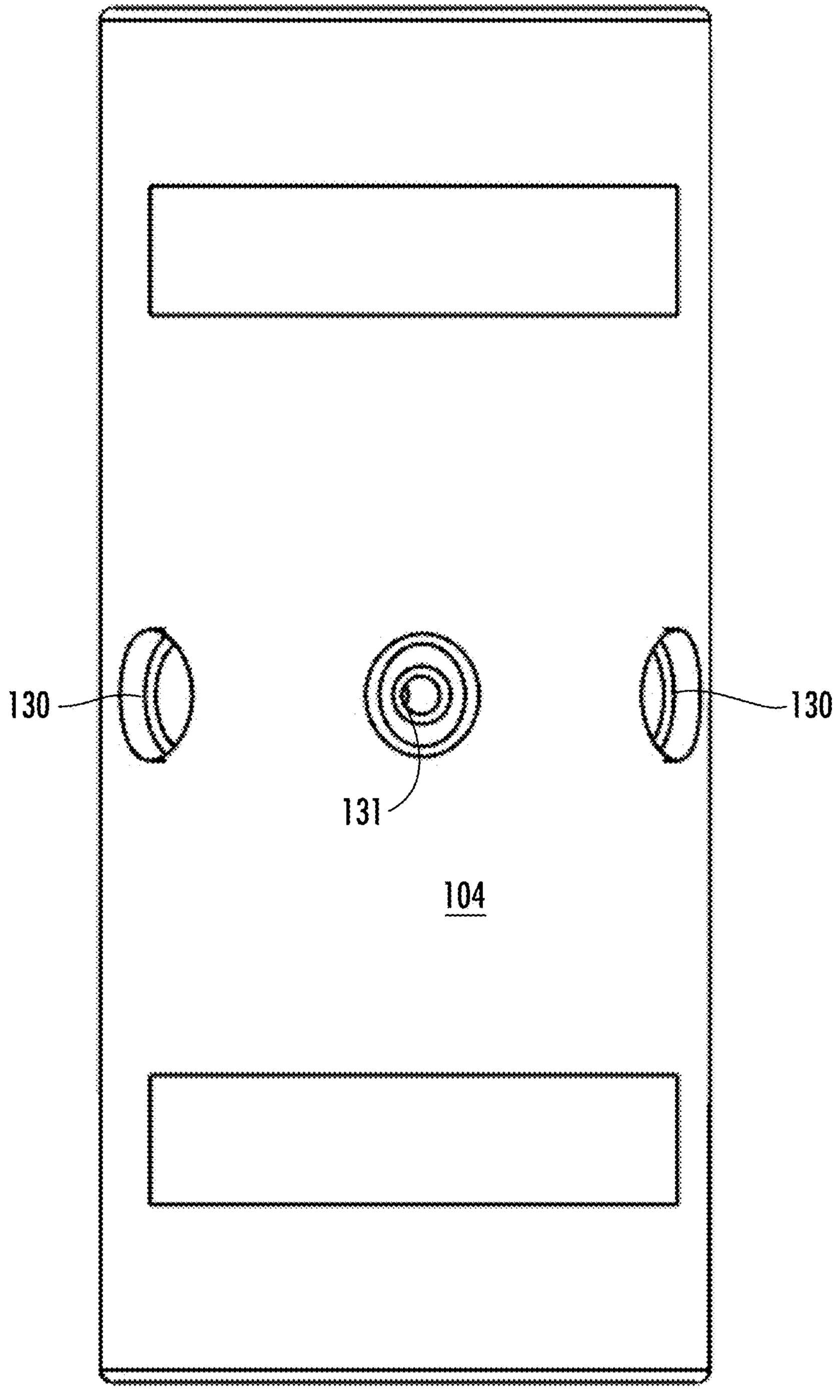
FIG. 45 is a bottom view of the wrist pin shown in FIG. 43, according to an exemplary embodiment.
Figure 46:
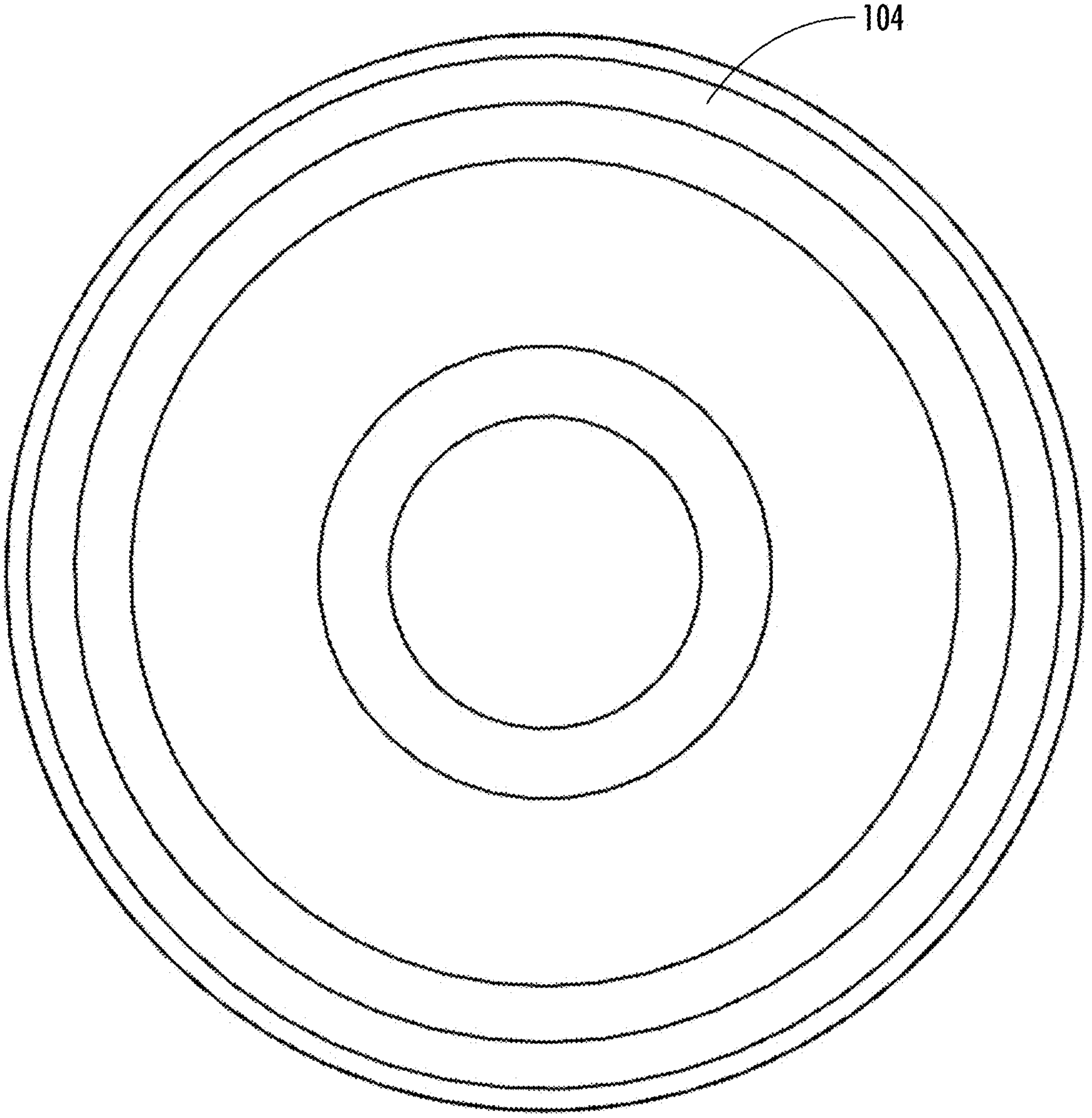
FIG. 46 is a front view of the wrist pin shown in FIG. 43, according to an exemplary embodiment.

FIGS. 43-46 show various views of wrist pin 104. When piston 26 is assembled, wrist pin 104 extends transversely (e.g., along transverse axis 82 of cylinder 14) through skirt 98. While in certain specific embodiments (e.g., as shown in FIGS. 28-29), wrist pin 104 passes through wrist-pin bearing 100, in other specific embodiments, the wrist-pin bearing is a gudgeon or wrist pin. In specific embodiments, various threaded holes 130 pass through wrist pin 104 to receive bolts 120. As shown in FIGS. 43-45, an unthreaded oil hole 131 additionally passes through wrist pin 104 to receive oil, which is supplied to wrist pin 104 via passages in rod 52. Rod 52 in turn receives oil from the journal of crankshaft 28. During operation of engine 10, linear movement of piston 26 is transformed into cyclical rotation of crankshaft 28.

Referring to FIGS. 47-52, various aspects of a fuel pump assembly 22 are shown. As discussed above, in specific embodiments, fuel pump assembly 22 is applied to an A-block, i.e. an inverted V-block, engine, such as engine 10 shown in FIGS. 1-2 and 53-54. In such A-block embodiments, the orientations of fuel pump assembly 22 and its related components would likewise be generally vertically inverted from the images shown in FIGS. 47-52. For example, FIG. 47 would reflect the bottom, rather than the top, of fuel pump assembly 22 in the context of an A-block engine.

Figure 47:
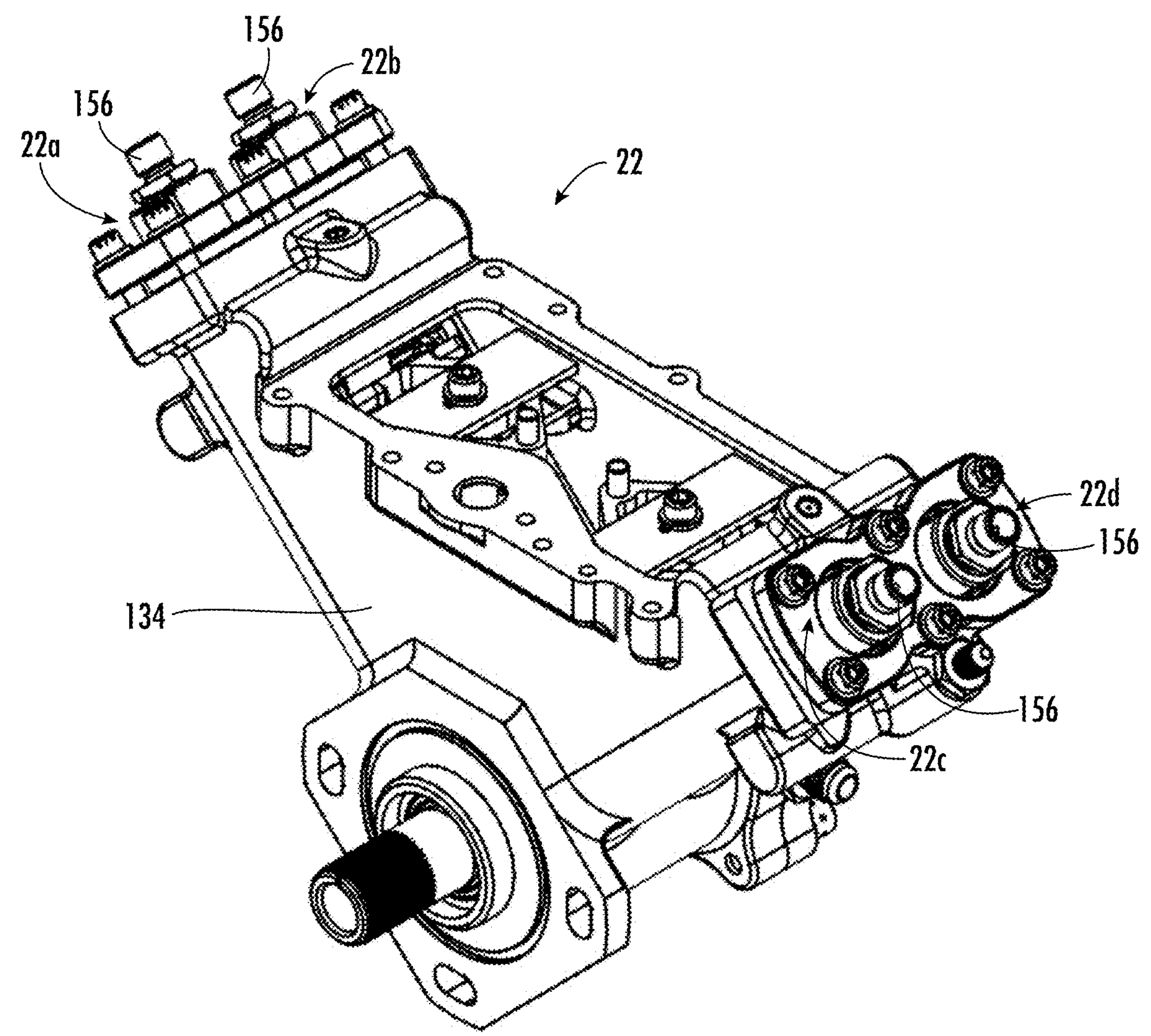
FIG. 47 is a perspective view from above of a fuel pump assembly, according to an exemplary embodiment.
Figure 48A:
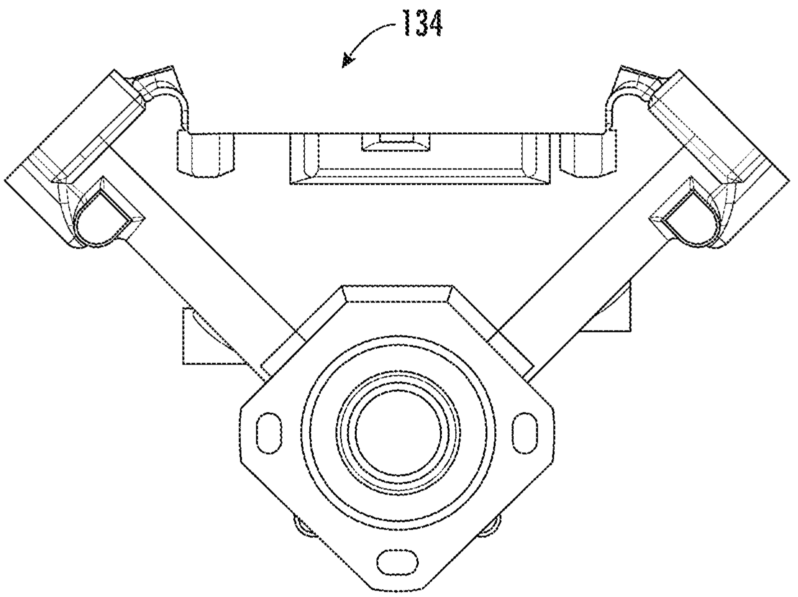
FIG. 48A is a front view of the housing of the fuel pump assembly shown in FIG. 47, according to an exemplary embodiment.

Referring to FIG. 47, fuel pump assembly 22 includes fuel pumps 22*a*, 22*b*, 22*c*, and 22*d*, as well as a fuel pump housing 134 that surrounds fuel pumps 22*a*, 22*b*, 22*c*, and 22*d*. A front view of fuel pump housing 134 is shown in FIG. 48A.

Figure 48B:
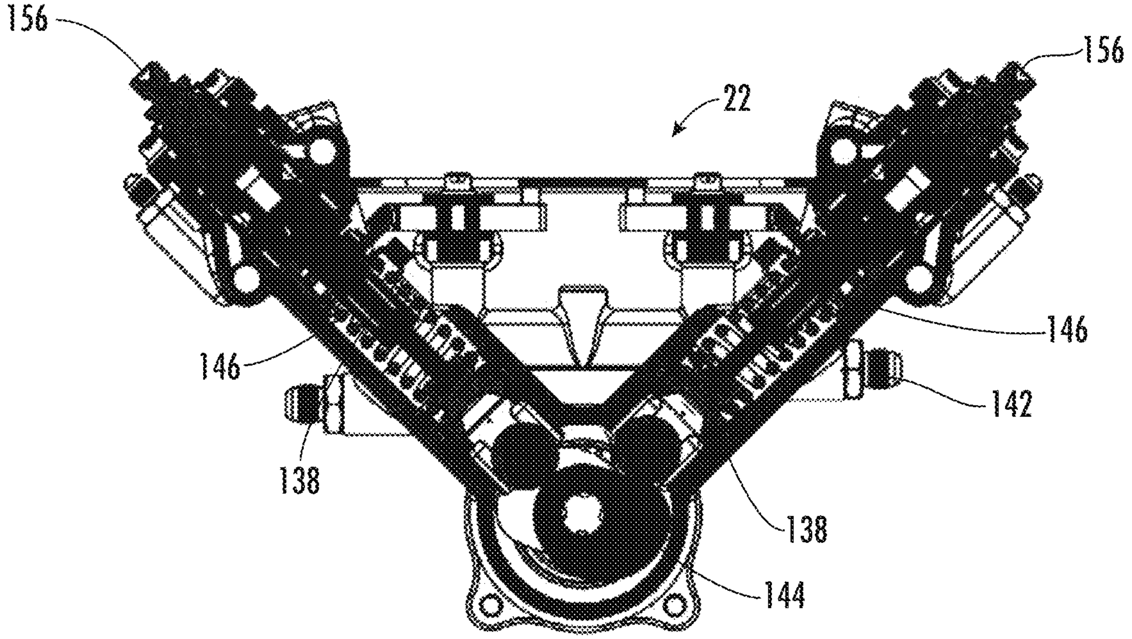
FIG. 48B is a front cross-sectional view of the fuel pump assembly shown in FIG. 47, taken through an outer set of fluid pump pistons and the fluid pump chamber, according to an exemplary embodiment.
Figure 48C:
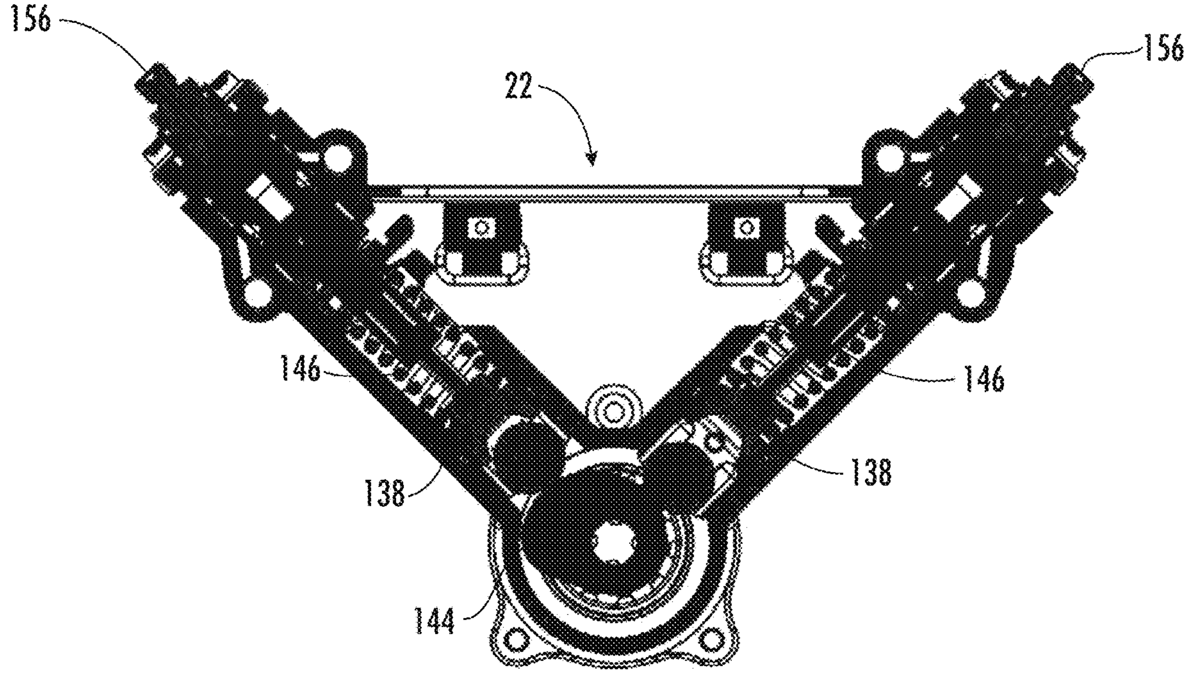
FIG. 48C is a front cross-sectional view of the fuel pump assembly shown in FIG. 47, taken through an inner set of fluid pump pistons and the fluid pump chamber, according to an exemplary embodiment.
Figure 49:
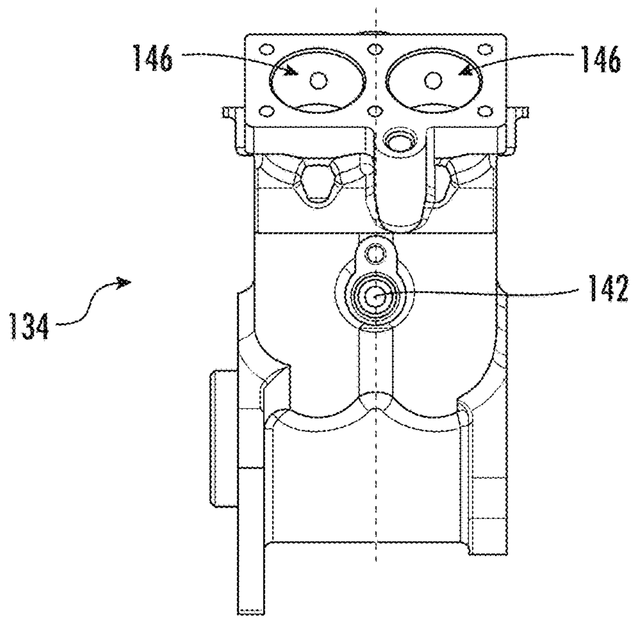
FIG. 49 is a side view of the housing shown in FIG. 48A, according to an exemplary embodiment.
Figure 50:
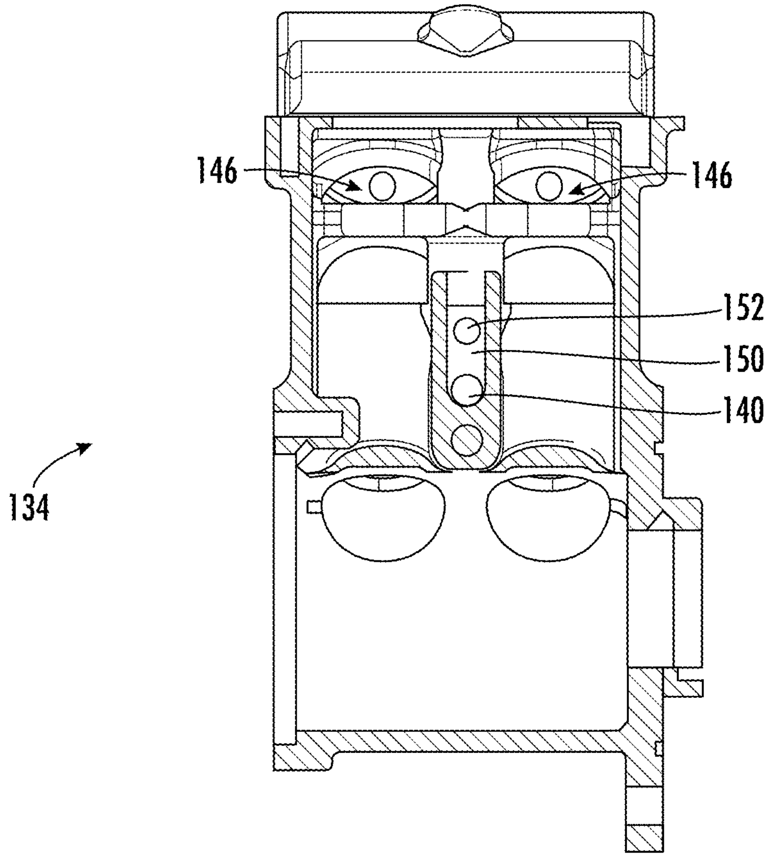
FIG. 50 is a side cross-sectional view of the housing shown in FIG. 49, according to an exemplary embodiment.
Figure 51:
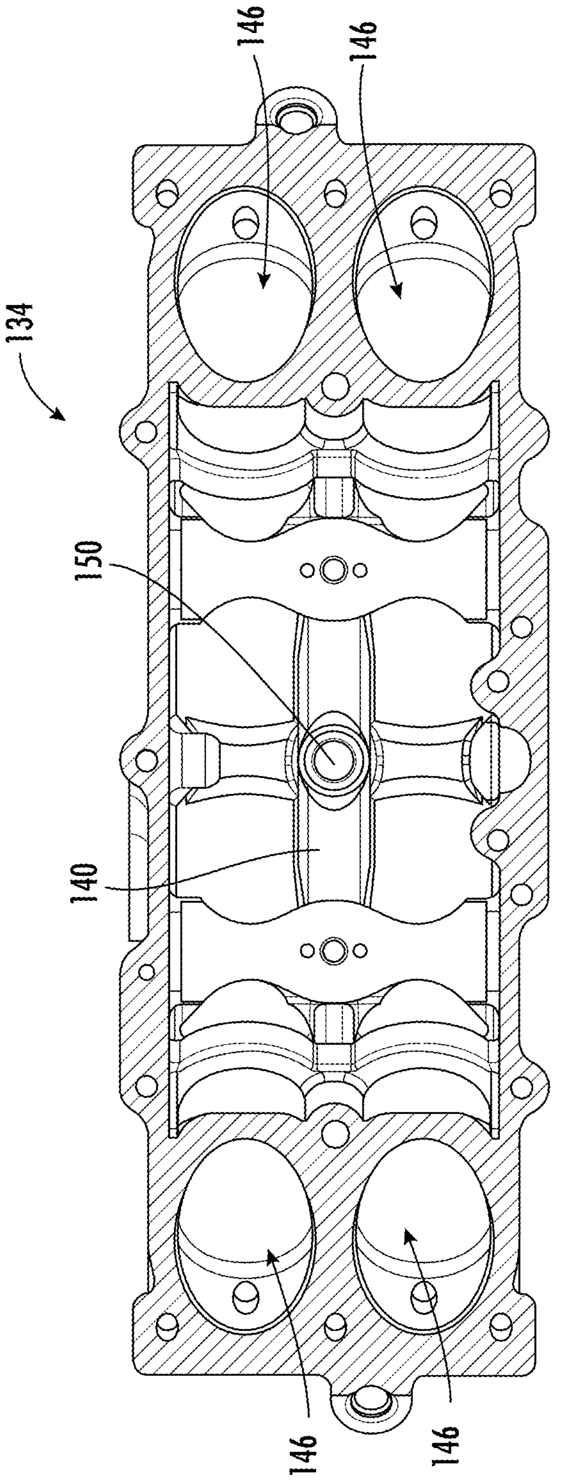
FIG. 51 is a top cross-sectional view of the housing shown in FIG. 49, according to an exemplary embodiment.

Referring to FIGS. 48B-48C, fuel pump assembly 22 further includes four fuel pump cylinders 146. A rotating cam 144 (see FIG. 48B) rotates within fuel pump assembly 22 to individually pressurize each fuel pump cylinder 146. Specifically, each fuel pump cylinder 146 includes a plunger barrel assembly with an internal piston 138 that pressurizes the fuel that exits fuel pump assembly 22 through each outlet 156. In specific embodiments, each fuel pump cylinder 146 is associated with a cylinder 14 of engine 10. Specifically, from each outlet 156, pressurized fuel is communicated to a corresponding external line 136, also known as a fuel supply channel, which delivers the pressurized fuel to a corresponding cylinder 14 (see FIGS. 1 and 53). Each cylinder 14 draws pressurized fuel as needed from the corresponding external line 136, and fuel pump cylinders 146 maintain constant high-pressure fuel in external lines 136.

Figure 53:
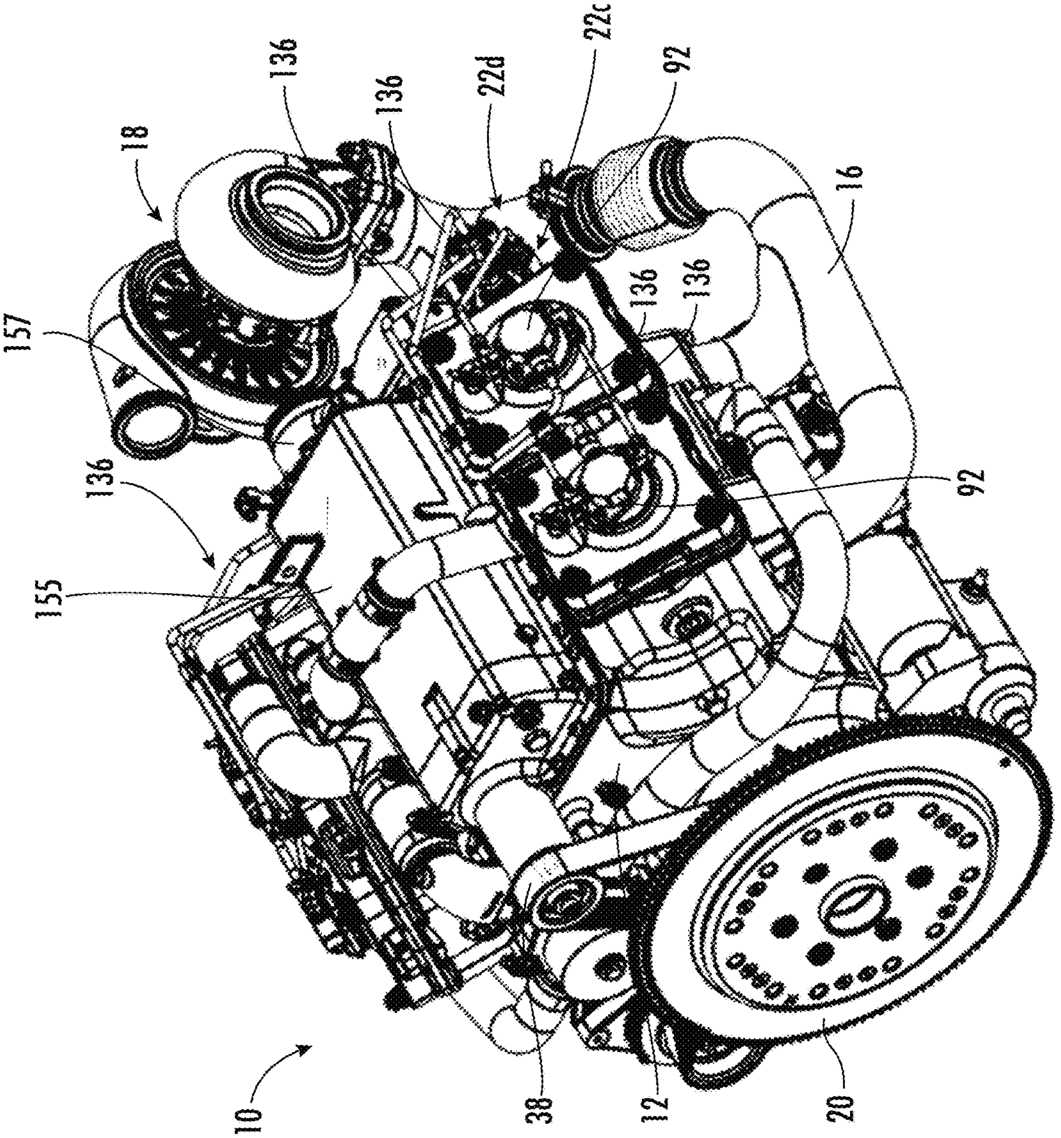
FIG. 53 is a perspective view of the bottom of two-stroke diesel engine shown in FIG. 1, according to an exemplary embodiment.

Referring briefly to FIGS. 1 and 53, external lines 136 are shown coupled to each fuel pump 22*a*, 22*b*, 22*c*, 22*d*. In specific embodiments, external lines 136 transfer fluid fuel from fuel pump assembly 22 to fuel injectors 92 at the end of each cylinder 14, and fuel injectors 92 inject the fuel into the cylinder. As shown in FIGS. 1 and 53, the four external lines 136, supply fuel to each of the four cylinders 14 of engine 10. In specific embodiments, each external line 136 has the same or a substantially similar (e.g., ±0.1-3%, and preferably ±0.1%) length as one another. For example, each external line 136 has the same length or distance from fuel pump assembly 22 to fuel injectors 92, specifically, from each fuel pump 22*a*, 22*b*, 22*c*, 22*d* of fuel pump assembly 22 to each corresponding fuel injector 92, within ±0.1%.

Figure 52:
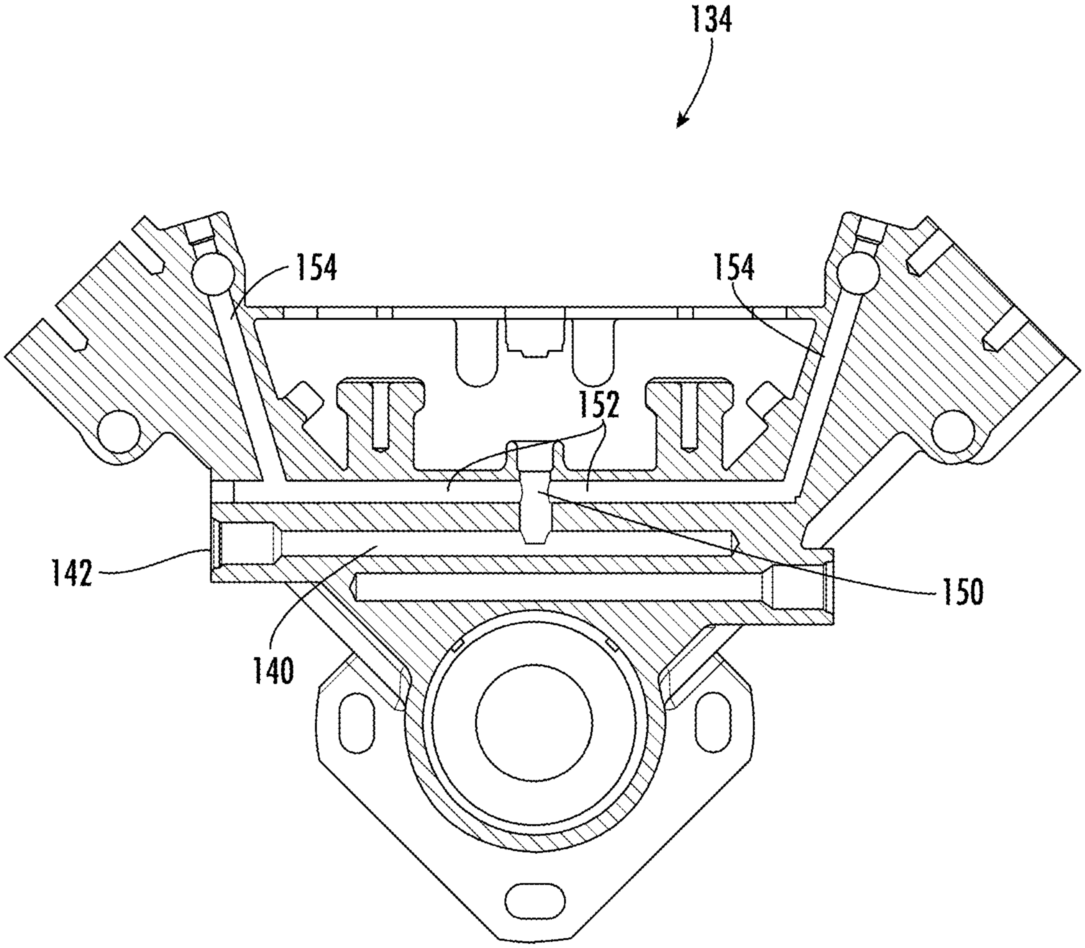
FIG. 52 is a front cross-sectional view of the fuel pump housing shown in FIG. 48A, according to an exemplary embodiment.

Referring again to FIGS. 47-52, fuel pump assembly 22 additionally includes a common channel 140. In specific embodiments, common channel 140 maintains a reserve of low-pressure fuel for all four fuel pumps 22*a*, 22*b*, 22*c*, 22*d* that is then pressurized in fuel pump cylinders 146 before being communicated to external lines 136. Referring to FIG. 52, common channel 140 is shown as a first horizontal channel (see, e.g. FIG. 52) with an inlet 142. Inlet 142 receives fuel from a filtered fuel supply source or fuel storage tank. In specific embodiments, fuel travels from the fuel tank, through a 30 um filter, then through a delivery fuel pump, and then through a 2 um filter before ultimately entering fuel pump assembly 22 through inlet 142.

From common channel 140, fuel is communicated via a bridge channel 150 to a second horizontal channel 152. From second horizontal channel 152, the fuel then passes through a pair of angled channels or vertical risers 154 to each internal piston 138 (see FIGS. 48B-C) where the fuel is pressurized within each fuel pump cylinder 146. High-pressure fuel is then communicated at a constant pressure through each outlet 156 to each corresponding external line 136.

Balancing fuel pump assembly 22 so that flow rates out of each plunger barrel assembly are similar within a specified range contributes to achieving similar injection pressures between cylinders 14. In specific embodiments, utilizing injector nozzles that are similarly sized can also contribute to achieving similar injection pressures. The use of similarly sized injector nozzles produces similar nozzle flow rates within a specified range. In specific embodiments, the range of nozzle flow rates is between 55-60 liters per hour, and the flow rates out each plunger barrel assembly are calibrated within 5 mm3/stroke of one another.

Figure 54:
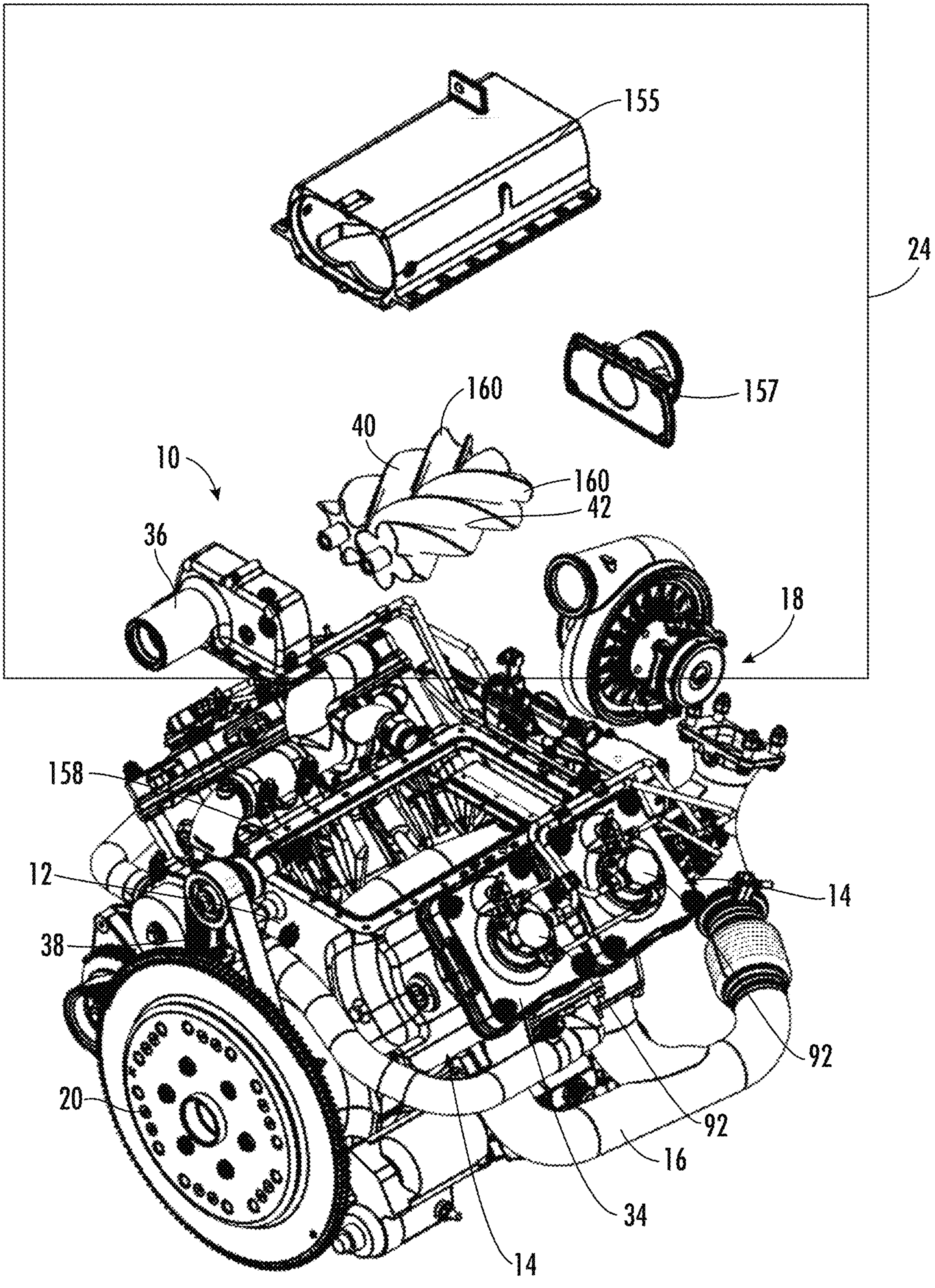
FIG. 54 is a partially exploded perspective view of the engine shown in FIG. 53, showing exploded components related to the super charger, according to an exemplary embodiment.

Referring to FIG. 53, the bottom side of two-stroke diesel engine 10 is shown. FIG. 54 shows an exploded view of the bottom of engine 10, including various components of supercharger 24. In some embodiments, supercharger 24 includes an inlet port or air inlet 157 and complementary screws with mating gears, specifically, thin-blade screw 40 and thick-blade screw 42. A housing 155 couples to power source 36 and intake manifold 44 (see FIG. 2) of engine 10. Thin-blade screw 40 is coupled to and/or powered by power source 36 to rotate in a first direction (e.g., clockwise or counter-clockwise). Thick-blade screw 42 is enmeshed with thin-blade screw 40 via mating gears and rotates in a second direction, e.g., opposite the clockwise or counter-clockwise rotation of thin-blade screw 40. For example, in certain embodiments, power source 36 couples to and rotates thin-blade screw 40 in a clockwise direction that is complementary to the counterclockwise rotation of thick-blade screw 42. The clockwise rotation of thin-blade screw 40 cooperates with counterclockwise rotation of thick blade-screw 42 to force air from the environment to travel through air inlet 157, through supercharger 24 and into intake manifold 44 of engine 10 at elevated pressure.

In other words, complementary screws 40 and 42 are driven via mating gears by power source 36 (e.g., an engine return source or belt) to force air through screws 40 and 42 into intake manifold 44 at an increased or elevated internal operating pressure. At low engine speeds, before there is enough energy for turbocharger 18 to begin operating, supercharger 24 elevates the operating pressure of the air intake to a pressure greater than the atmospheric pressure. As engine speeds increase, the supercharger 24 boosts the outlet presser of the turbocharger 18.

In some embodiments, a bottom or base 158 of supercharger 24 is open to intake manifold 44. Base 158 couples directly to the opening on intake manifold 44. Power source 36 may be an engine return (e.g., belt 38). In other words, power source 36 can return energy generated by engine 10 to screws 40 and/or 42 via belt 38.

Figure 55:
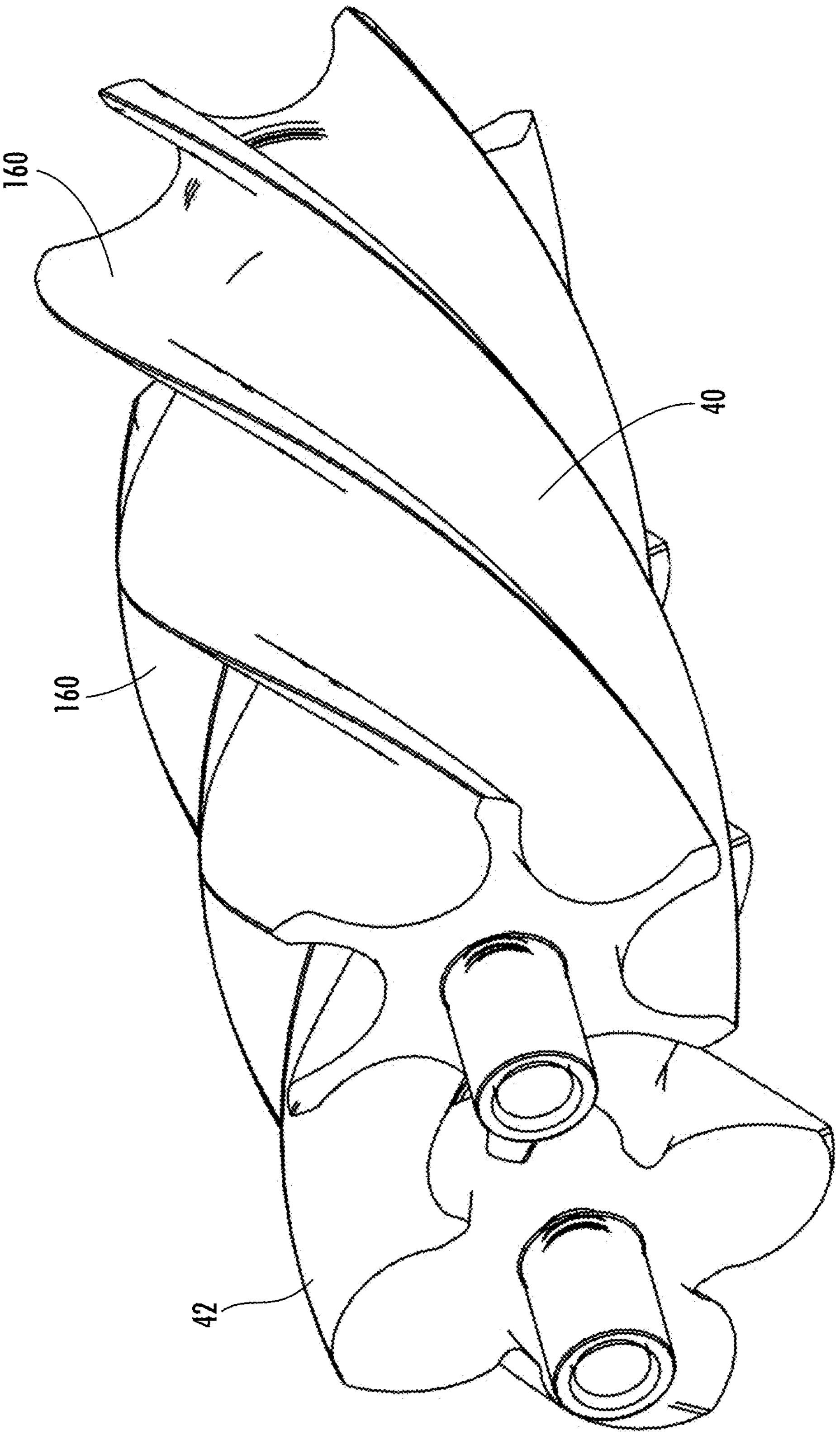
FIG. 55 is a detailed perspective view of two complementary screws of the supercharger, a thin-blade screw and a thick-blade screw, according to an exemplary embodiment.
Figure 56:
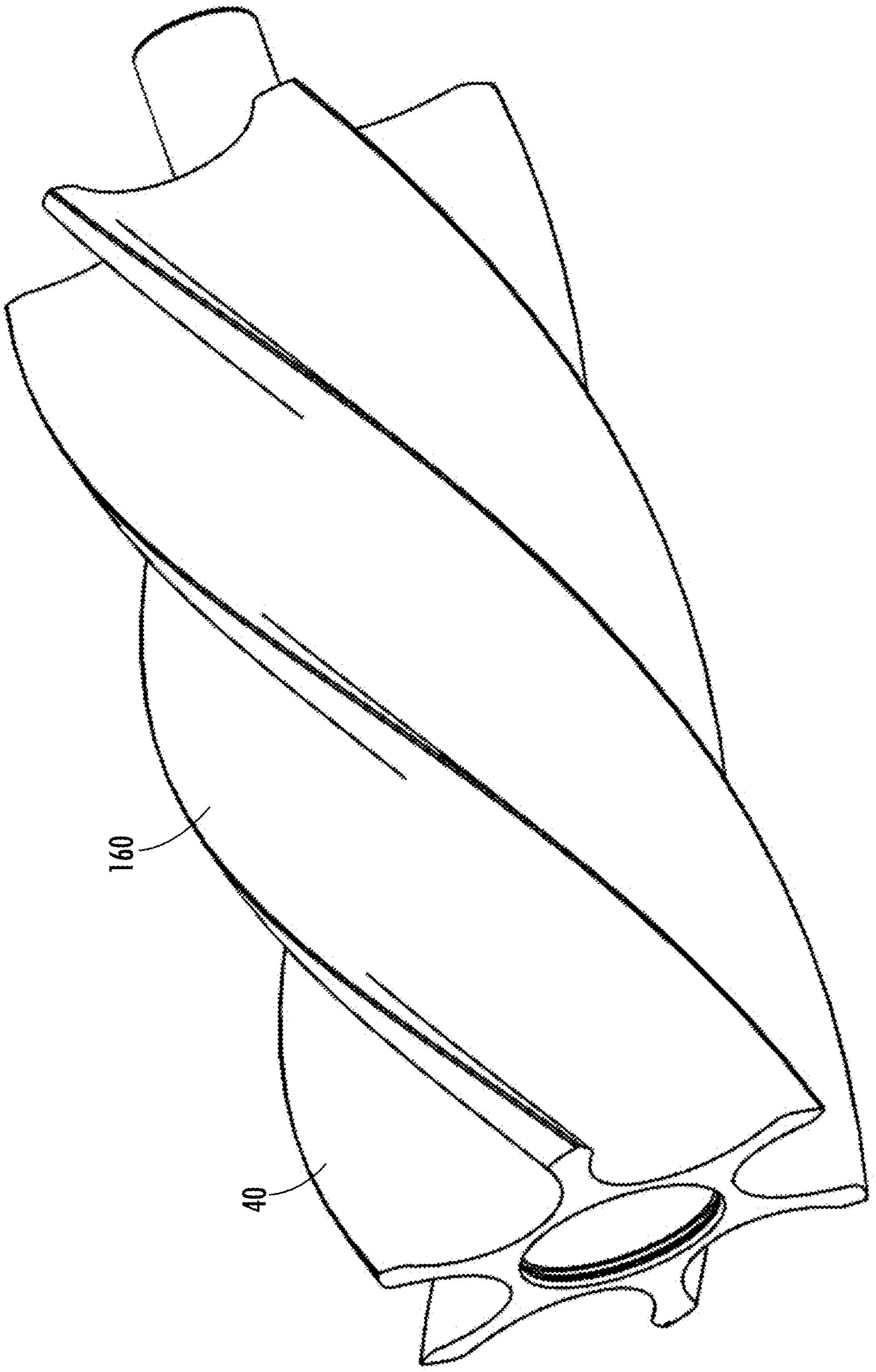
FIG. 56 is a detailed perspective view of the thin-blade screw shown in FIG. 55, according to an exemplary embodiment.
Figure 57:
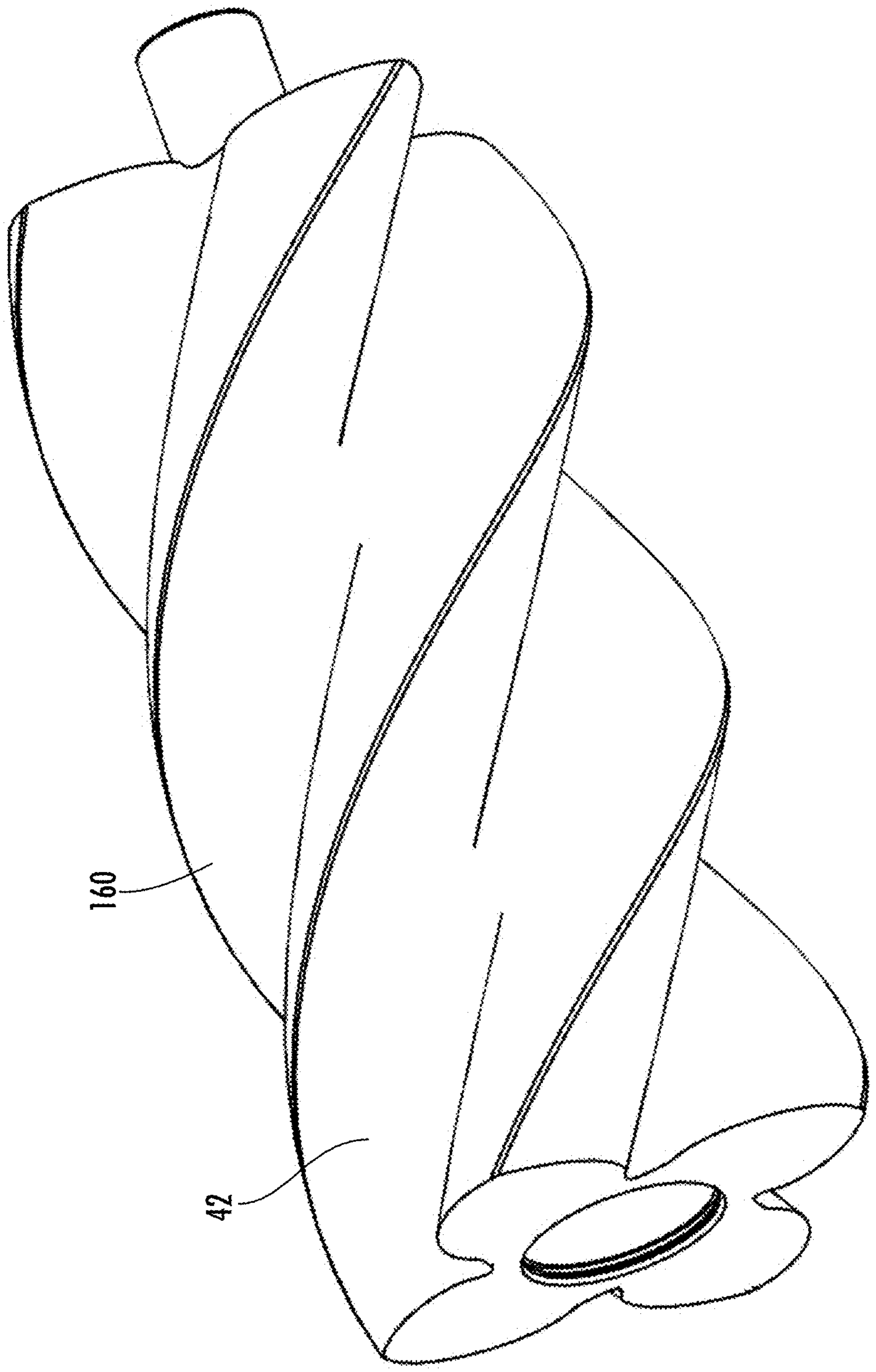
FIG. 57 is a detailed perspective view of the thick-blade screw shown in FIG. 55, according to an exemplary embodiment.

FIGS. 55-57 show detailed perspective views of the two complementary screws, specifically thin-blade screw 40 and thick-blade screw 42 of supercharger 24. FIG. 55 shows the thin-blade screw 40 enmeshed with the thick-blade screw 42. FIG. 56 is a detailed perspective view of thin-blade screw 40, and FIG. 57 is a detailed perspective view of thick-blade screw 42.

In some embodiments, thin-blade screw 40 has a different number of blades or lobes 160 than thick-blade screw 42. As shown in FIGS. 55-57, thin-blade screw 40 has six lobes 160, and thick-blade screw has four lobes 160. In this configuration, when supercharger 24 operates, an angular velocity of thin-blade screw 40 is different from an angular velocity of thick-blade screw 42. For example, a four lobe to six lobe ratio results in a ⅔ angular velocity, such that the thin-blade screw 40 travels ⅔rds as fast as thick-blade screw 42 in the illustrated embodiment. Stated differently, thick-blade screw 42 must travel 1.5 times around its axis for every rotation of thin-blade screw 40.

Various other features of lobes 160 can be used to enhance the intake pressure of air at intake manifold 44. For example, the screws are complementary, such that when lobes 160 of screws 40 and 42 are enmeshed, supercharger 24 forces gas (e.g., air) along lobes 160 and up the axis of screws 40 and 42. In some embodiments, thin-blade screw 40 has a concave pattern such that lobes 160 form an inward radius on thin-blade screw 40. Similarly, thick-blade screw 42 has a convex pattern, such that lobes 160 form an outward radius on thick-blade screw 42. It should be understood that the figures illustrate the exemplary embodiments in detail, and it should be understood that the present application is not limited to the details or methodology set forth in the description or illustrated in the figures. It should also be understood that the terminology is for the purpose of description only and should not be regarded as limiting.

Further modifications and alternative embodiments of various aspects of the invention will be apparent to those skilled in the art in view of this description. Accordingly, this description is to be construed as illustrative only. The construction and arrangements, shown in the various exemplary embodiments, are illustrative only. Although only a few embodiments have been described in detail in this disclosure, many modifications are possible (e.g., variations in sizes, dimensions, structures, shapes and proportions of the various elements, values of parameters, mounting arrangements, use of materials, colors, orientations, etc.) without materially departing from the novel teachings and advantages of the subject matter described herein. Some elements shown as integrally formed may be constructed of multiple parts or elements, the position of elements may be reversed or otherwise varied, and the nature or number of discrete elements or positions may be altered or varied. The order or sequence of any process, logical algorithm, or method steps may be varied or re-sequenced according to alternative embodiments. Other substitutions, modifications, changes, and omissions may also be made in the design, operating conditions, and arrangement of the various exemplary embodiments without departing from the scope of the present invention.

For purposes of this disclosure, the term "coupled" means the joining of two components directly or indirectly to one another. Such joining may be stationary in nature or movable in nature. Such joining may be achieved with the two members and any additional intermediate members being integrally formed as a single unitary body with one another or with the two members or the two members and any additional member being attached to one another. Such joining may be permanent in nature or alternatively may be removable or releasable in nature.

The use of the terms "a" and "an" and "the" and similar referents in the context of describing the invention (especially in the context of the following claims) is to be construed to cover both the singular and the plural, unless otherwise indicated herein or clearly contradicted by context. The terms "comprising," "having," "including," and "containing" are to be construed as open-ended terms (i.e., meaning "including, but not limited to,") unless otherwise noted. Recitation of ranges of values herein are merely intended to serve as a shorthand method of referring individually to each separate value falling within the range, unless otherwise indicated herein, and each separate value is incorporated into the specification as if it were individually recited herein. All methods described herein can be performed in any suitable order unless otherwise indicated herein or otherwise clearly contradicted by context. The use of any and all examples, or exemplary language (e.g., "such as") provided herein, is intended merely to better illuminate the invention and does not pose a limitation on the scope of the invention unless otherwise claimed. No language in the specification should be construed as indicating any non-claimed element as essential to the practice of the invention.

Further modifications and alternative embodiments of various aspects of the invention will be apparent to those skilled in the art in view of this description. Accordingly, this description is to be construed as illustrative only. The construction and arrangements, shown in the various exemplary embodiments, are illustrative only. Although only a few embodiments have been described in detail in this disclosure, many modifications are possible (e.g., variations in sizes, dimensions, structures, shapes and proportions of the various elements, values of parameters, mounting arrangements, use of materials, colors, orientations, etc.) without materially departing from the novel teachings and advantages of the subject matter described herein. Some elements shown as integrally formed may be constructed of multiple parts or elements, the position of elements may be reversed or otherwise varied, and the nature or number of discrete elements or positions may be altered or varied. The order or sequence of any process, logical algorithm, or method steps may be varied or re-sequenced according to alternative embodiments. Other substitutions, modifications, changes and omissions may also be made in the design, operating conditions and arrangement of the various exemplary embodiments without departing from the scope of the present invention.

What is claimed is:

1. A two-stroke, diesel engine, comprising:

an engine block, comprising:

a cylinder, comprising:

a plurality of first inlet ports, each of the first inlet ports having a first area, the first areas being similar to each other;

a plurality of second inlet ports, each of the second inlet ports having a second area, the second areas being similar to each other;

a plurality of third inlet ports, each of the third inlet ports having a third area, the third areas being similar to each other; and a plurality of exhaust ports, each of the exhaust ports having a fourth area, the fourth areas being similar to each other;

wherein the summation of the first areas is between 15% to 25% of the summation of the fourth areas; and wherein the summation of the second areas plus the third areas is between 75% and 85% of the summation of the fourth areas.

2. The two-stroke, diesel engine of claim 1, wherein each of the first inlet ports have the same shape as each other, wherein each of the second inlet ports have the same shape as each other, wherein each of the third inlet ports have the same shape as each other, and wherein each of the exhaust ports have the same shape as each other.

3. The two-stroke, diesel engine of claim 1, further comprising a piston positioned and configured to translate within the cylinder, the piston comprising:

a threaded piston bowl;

a skirt coupled to the threaded piston bowl and extending axially through the cylinder;

a threaded piston ring retainer that provides a compressive force on the skirt and on the threaded piston bowl; and a wrist-pin bearing that extends transversely through an opening formed in the skirt, the wrist-pin bearing configured to support a wrist pin such that the wrist pin is rotatable with respect to the wrist-pin bearing.

4. The two-stroke, diesel engine of claim 3, wherein the threaded piston bowl is formed from a first material comprising titanium, wherein the skirt is formed from a second material comprising aluminum, wherein the threaded piston ring retainer is formed from a third material comprising steel, and wherein the wrist-pin bearing is formed from a fourth material comprising bronze.

5. The two-stroke, diesel engine of claim 1, wherein the summation of the fourth areas is between 3.5 $in^2$ and 4.0 $in^2$, wherein the summation of the first areas is between 0.6 $in^2$ and 0.8 $in^2$, and wherein the summation of the second areas plus the third areas is between 2.7 $in^2$ and 3.3 $in^2$.

6. The two-stroke, diesel engine of claim 1, wherein a width of at least one of the first inlet ports measured in a circumferential direction of the cylinder is between 55% and 65% of a width of at least one of the exhaust ports measured in the circumferential direction of the cylinder, and wherein a width of at least one of the second inlet ports measured in the circumferential direction of the cylinder is between 105% and 152% of the width of at least one of the exhaust ports measured in the circumferential direction of the cylinder.

7. The two-stroke, diesel engine of claim 1, wherein a height of at least one of the first inlet ports measured in an axial direction of the cylinder is between 40% and 60% a height of at least one of the exhaust ports measured in the axial direction of the cylinder, and wherein a height of at least one of the second inlet ports measured in the axial direction of the cylinder is between 40% and 60% of a height of at least one of the exhaust ports measured in the axial direction of the cylinder.

8. The two-stroke, diesel engine of claim 1, wherein the plurality of first inlet ports includes two first inlet ports adjacent to one another circumferentially with respect to the cylinder, the plurality of second inlet ports includes two second inlet ports on opposing circumferential sides of the first inlet ports, the plurality of third inlet ports includes two third inlet ports on opposing circumferential sides of the two second inlet ports, the two third inlet ports on opposing sides of the two second inlet ports with respect to the two first inlet ports, and the plurality of exhaust ports includes three exhaust ports positioned circumferentially between the two third inlet ports such that the three exhaust ports are positioned on an opposite side of the cylinder from the plurality of first inlet ports.

9. The two-stroke, diesel engine of claim 1, further comprising a plurality of first inlet flow channels, a plurality of second inlet flow channels, and a plurality of third inlet flow channels, wherein each first inlet flow channel of the plurality of first inlet flow channels is coupled to a respective first inlet port of the plurality of first inlet ports, wherein each second inlet flow channel of the plurality of second inlet flow channels is coupled to a respective second inlet port of the plurality of second inlet ports, and wherein each third inlet flow channel of the plurality of third inlet flow channels is coupled to a respective third inlet port of the plurality of third inlet ports.

10. The two-stroke, diesel engine of claim 9, further comprising a plurality of exhaust flow channels, wherein each of the first inlet flow channels forms a first axial floor angle with the cylinder, wherein each of the second inlet flow channels forms a second axial floor angle with the cylinder, wherein each of the third inlet flow channels forms a third axial floor angle with the cylinder, wherein each of the plurality of exhaust flow channels forms a fourth axial floor angle with the cylinder, wherein the first axial floor angle is between 55° and 65°, wherein the second axial floor angle is between 26° and 36°, wherein the third axial floor angle is between 15° and 25°, and wherein the fourth axial floor angle is between 25° and 35°.

11. The two-stroke, diesel engine of claim 1, wherein the cylinder is a first cylinder;

wherein the engine block further comprises a second cylinder, a third cylinder, a fourth cylinder, a first fuel pump, a first fuel supply channel in fluid communication with the first cylinder, a first fuel injector, a second fuel pump, a second fuel supply channel in fluid communication with the second cylinder, a second fuel injector, a third fuel pump, a third fuel supply channel in fluid communication with the third cylinder, a third fuel injector, a fourth fuel pump, a fourth fuel supply channel in fluid communication with the fourth cylinder, and a fourth fuel injector;

wherein the first fuel supply channel transfers fuel from the first fuel pump to the first fuel injector and the first fuel injector injects fuel from the first fuel supply channel to the first cylinder;

wherein the second fuel supply channel transfers fuel from the second fuel pump to the second fuel injector and the second fuel injector injects fuel from the second fuel supply channel to the second cylinder;

wherein the third fuel supply channel transfers fuel from the third fuel pump to the third fuel injector and the third fuel injector injects fuel from the third fuel supply channel to the third cylinder;

wherein the fourth fuel supply channel transfers fuel from the fourth fuel pump to the fourth fuel injector and the fourth fuel injector injects fuel from the fourth fuel supply channel to the fourth cylinder; and wherein the length of the first fuel supply channel from the first fuel pump to the first fuel injector, the length of the second fuel supply channel from the second fuel pump to the second fuel injector, the length of the third fuel supply channel from the third fuel pump to the third fuel injector, and the length of the fourth fuel supply channel from the fourth fuel pump to the fourth fuel injector are equal.

12. The two-stroke, diesel engine of claim 11, further comprising a first horizontal channel, a bridge channel, a second horizontal channel, and a plurality of vertical risers, wherein the first horizontal channel further comprises an inlet that receives fuel from a fuel supply source, and wherein fuel that is received by the inlet is communicated through the first horizontal channel to the bridge channel, through the bridge channel to the second horizontal channel, through the second horizontal channel to the plurality of vertical risers, and up the plurality of vertical risers.

* * * * *